(12) United States Patent
Lee et al.

(10) Patent No.: US 10,107,546 B2
(45) Date of Patent: Oct. 23, 2018

(54) REFRIGERATOR AND METHOD OF CONTROLLING THE SAME

(71) Applicant: Samsung Electronics Co., Ltd., Gyeonggi-do (KR)

(72) Inventors: Sang Hoon Lee, Gyeonggi-do (KR); Sang Min Park, Gyeonggi-do (KR); Boo-Keun Yoon, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 24 days.

(21) Appl. No.: 15/087,731

(22) Filed: Mar. 31, 2016

(65) Prior Publication Data
US 2016/0290710 A1  Oct. 6, 2016

(30) Foreign Application Priority Data
Mar. 31, 2015  (KR) .................. 10-2015-0045780

(51) Int. Cl.
*F25D 23/12* (2006.01)
*F25D 11/02* (2006.01)
(Continued)

(52) U.S. Cl.
CPC ........ *F25D 23/126* (2013.01); *B01F 3/04808* (2013.01); *B01F 3/04815* (2013.01);
(Continued)

(58) Field of Classification Search
CPC ...... F25D 23/126; F25D 23/028; F25D 11/02; F25D 29/005; F25D 2400/22;
(Continued)

(56) References Cited

U.S. PATENT DOCUMENTS

| | | | | |
|---|---|---|---|---|
| 6,536,224 B2 * | 3/2003 | Frank | ..................... | A23G 9/045 |
| | | | | 251/253 |
| 8,756,950 B2 * | 6/2014 | Brunner | .................. | F25C 1/147 |
| | | | | 62/344 |

(Continued)

FOREIGN PATENT DOCUMENTS

DE  10 2009 0287779 A1  2/2011
DE  10 2011 077367 A1  12/2012
(Continued)

OTHER PUBLICATIONS

European Search Report dated Aug. 2, 2016 in connection with European Patent Application No. EP 16163130.4.
(Continued)

*Primary Examiner* — Frederick C Nicolas

(57) ABSTRACT

This disclosure is related to a refrigerator and a method of controlling the same. The refrigerator includes a dispenser passage, a water supplier for supplying sterilizing water or rinsing water to the dispenser passage, a drain for draining the sterilizing water or the rinsing water that is supplied to the dispenser passage, and a controller for performing a sterilization cycle and controlling the water supplier and the drain to perform a rinsing cycle after completing the sterilization cycle, wherein the sterilization cycle is a cycle of keeping the sterilizing water in the dispenser passage and then draining the sterilizing water, and the rinsing cycle is a cycle of supplying the rinsing water to the dispenser passage and draining the rinsing water therefrom.

19 Claims, 62 Drawing Sheets

(51) Int. Cl.
- *F25D 29/00* (2006.01)
- *F25D 23/02* (2006.01)
- *B01F 3/04* (2006.01)
- *C02F 1/467* (2006.01)
- *F25C 5/00* (2018.01)
- *B08B 1/00* (2006.01)
- *F25C 5/20* (2018.01)

(52) U.S. Cl.
CPC .............. *B08B 1/00* (2013.01); *C02F 1/4674* (2013.01); *F25C 5/22* (2018.01); *F25D 11/02* (2013.01); *F25D 23/028* (2013.01); *F25D 29/005* (2013.01); *C02F 2307/14* (2013.01); *F25C 2400/10* (2013.01); *F25D 2323/121* (2013.01); *F25D 2323/122* (2013.01); *F25D 2400/22* (2013.01); *F25D 2400/361* (2013.01); *F25D 2600/00* (2013.01); *F25D 2600/02* (2013.01)

(58) Field of Classification Search
CPC ........... F25D 2600/02; F25D 2400/361; F25D 2323/121; F25D 2323/122; F25D 2600/00; F25C 5/005; F25C 2400/10; F25C 5/22; C02F 2307/14; C02F 1/4614; C02F 1/4674; B01F 3/04815; B01F 3/04808; B08B 1/00
See application file for complete search history.

(56) References Cited

U.S. PATENT DOCUMENTS

| | | | |
|---|---|---|---|
| 9,506,683 B2 * | 11/2016 | Katoh | B60H 1/00342 |
| 2011/0041542 A1 | 2/2011 | Brunner et al. | |
| 2014/0230481 A1 * | 8/2014 | Yun | F25D 23/126 62/340 |
| 2016/0025406 A1 * | 1/2016 | An | F25D 23/126 222/143 |

FOREIGN PATENT DOCUMENTS

| | | |
|---|---|---|
| EP | 2 770 280 A2 | 8/2014 |
| KR | 10-2003-0036384 A | 5/2003 |
| KR | 10-2005-0031485 A | 4/2005 |
| KR | 10-2005-0097601 A | 10/2005 |
| KR | 10-2007-0088412 A | 8/2007 |
| KR | 10-2009-0076384 A | 7/2009 |
| KR | 10-2010-0085688 A | 7/2010 |
| KR | 10-2011-0000160 A | 1/2011 |
| KR | 10-2011-0085099 A | 7/2011 |

OTHER PUBLICATIONS

Foreign Communication from Related Counterpart Application; European Patent Application No. 16163130.4; Invitation Pursuant to Article 94(3) and Rule 71(1) EPC dated Jun. 6, 2017; 4 pages.
European Patent Office Communication under Rule 71(3) EPC regarding Application No. 16163130.4, dated Jul. 18, 2018, 164 pages.

* cited by examiner

REFRIGERATOR AND METHOD OF CONTROLLING THE SAME

CROSS-REFERENCE TO RELATED APPLICATION AND CLAIM OF PRIORITY

This application claims the benefit of Korean Patent Application No. 10-2015-0045780, filed on Mar. 31, 2015 in the Korean Intellectual Property Office, the disclosure of which is incorporated herein by reference.

FIELD

Embodiments disclosed herein relate to a refrigerator for cleaning passages supplying purified water, sparkling water, and the like, and a method of controlling the same.

BACKGROUND

Generally, a refrigerator is a home electric appliance equipped with a storage compartment for storing food and drinks and a cold air supplier for supplying cold air to the storage compartment to keep the food and drinks more fresh. To satisfy demands from users, a refrigerator may be equipped with an ice-making machine for making ice and a dispenser for dispensing purified water, ice, sparkling water, or the like at an external side without a door of the refrigerator being opened.

As time goes by, due to various causes including repetitive use, foreign materials and germs may accumulate in such a dispenser and a passage for supplying water. Therefore, it is recommended that a passage in which foreign materials and germs accumulate is periodically cleaned through a separate device. Recently, studies on simplifying such periodical cleaning have been actively conducted.

SUMMARY

Therefore, it is an aspect of the present disclosure to provide a refrigerator capable of easily eliminating foreign materials and germs that have accumulated in a passage for supplying water from the passage through a sterilizing water supplier included in the refrigerator, and a method of controlling the same.

In accordance with one embodiment of a refrigerator, the refrigerator includes a dispenser passage, a water supplier to supply sterilizing water or rinsing water to the dispenser passage, a drain to drain the sterilizing water or the rinsing water that is supplied to the dispenser passage, and a controller configured to perform a sterilization cycle and control the water supplier and the drain to perform a rinsing cycle after completing the sterilization cycle, wherein the sterilization cycle is a cycle of keeping the sterilizing water in the dispenser passage and then draining the sterilizing water, and the rinsing cycle is a cycle of supplying the rinsing water to the dispenser passage and draining the rinsing water therefrom.

Also, in accordance with one embodiment, the refrigerator may further include a user interface to receive a dispenser cleaning signal, wherein, when the dispenser cleaning signal is input, the controller may control the water supplier to supply the sterilizing water to the dispenser passage.

Further, in accordance with one embodiment, the controller may block a passage to an ice-making machine until the rinsing water is drained after the sterilizing water is supplied.

Furthermore, in accordance with one embodiment, the controller may control the water supplier to supply the sterilizing water during a predetermined time interval.

Also, in accordance with one embodiment, the controller may control the water supplier to supply the sterilizing water during a predetermined time interval.

In addition, in accordance with one embodiment, the refrigerator may further include a flow rate detector to detect a flow rate of the sterilizing water being supplied, wherein the controller may control the water supplier to stop the supplying of the sterilizing water when the flow rate detected by the flow rate detector is equal to or greater than a predetermined flow rate.

Moreover, in accordance with one embodiment, the controller may control the water supplier to supply the rinsing water during a predetermined time interval.

Further, in accordance with one embodiment, the refrigerator may further include a flow rate detector to detect a flow rate of the rinsing water being supplied, wherein the controller may stop the supplying of the rinsing water when the flow rate detected by the flow rate detector is equal to or greater than a predetermined flow rate.

In accordance with another embodiment of the refrigerator, the refrigerator includes a dispenser passage, a dispenser discharger to drain the sterilizing water or the rinsing water that is supplied to the dispenser passage, and to store the drained water in a water receiver, a water receiver detector to detect whether or not the water receiver is placed below the dispenser discharger, and a controller to control the dispenser discharger to store the sterilizing water and the rinsing water in the water receiver when the water receiver placed below the dispenser discharger is detected.

Also, in accordance with another embodiment, the refrigerator may further include a user interface to provide a message instructing a user to place the water receiver at the dispenser discharger.

Further, in accordance with another embodiment, the user interface may receive a drain start signal input by the user and the controller may control the dispenser discharger to store the sterilizing water and the rinsing water in the water receiver when the drain start signal is input.

Moreover, in accordance with another embodiment, the water receiver detector may detect that the water receiver is placed below the dispenser discharger when a dispenser lever is pressed.

Furthermore, in accordance with still another embodiment, the water receiver detector may detect whether or not the water receiver is placed below the dispenser discharger, and the user interface may provide a message instructing the user to place the water receiver below the dispenser discharger.

Additionally, in accordance with yet another embodiment, the water receiver detector may detect whether or not the water receiver is attached to the dispenser discharger, and the user interface may provide a message instructing the user to attach the water receiver to the dispenser discharger.

Also, in accordance with another embodiment, a water level detector to detect a water level in the water receiver may be further included, and the controller may control the dispenser discharger to stop draining when the detected water level exceeds a predetermined water level.

In accordance with still another embodiment of the refrigerator, the refrigerator includes a dispenser passage, a water supplier to supply sterilizing water or rinsing water to the dispenser passage, a draining device to drain the sterilizing water or the rinsing water that is supplied to the dispenser passage, and including a dispenser discharger and a drain, a user interface to receive a draining mode regarding a draining performance component of the dispenser discharger and the drain, and a controller to control the user interface to provide a message instructing a user to place a water receiver capable of storing water at the dispenser discharger when an instruction to perform drainage at the dispenser discharger is input, and when an instruction to perform drainage at the drain is input, to control the water supplier and the drain to perform a sterilization cycle and to perform a rinsing cycle when the sterilization cycle is completed, wherein the sterilization cycle is a cycle of keeping the sterilizing water in the dispenser passage and then draining the sterilizing water, and the rinsing cycle is a cycle of supplying the rinsing water to the dispenser passage and draining the rinsing water therefrom.

Also, in accordance with still another embodiment, the refrigerator may further include a user interface to receive a number of times the sterilizing water and the rinsing water are supplied.

Further, in accordance with still another embodiment, the refrigerator may further include the user interface to receive a flow rate at which the sterilizing water and the rinsing water are to be supplied.

Moreover, in accordance with still another embodiment, the refrigerator may further include the user interface to receive a supply time of the sterilizing water and a supply time of the rinsing water.

Furthermore, in accordance with still another embodiment, the user interface may provide messages regarding the number of times the sterilizing water and the rinsing water are supplied, the flow rates at which the sterilizing water and the rinsing water are to be supplied, and an estimated dispenser cleaning time corresponding to at least one of the supply time of the sterilizing water and the supply time of the rinsing water.

Additionally, in accordance with yet another embodiment, the refrigerator may further include a user interface to provide a message regarding a remaining dispenser cleaning time when the dispenser cleaning is performed.

Further, in accordance with yet another embodiment, the refrigerator may further include a user interface to provide a message regarding a current cycle when the dispenser cleaning is performed.

Moreover, in accordance with yet another embodiment, the refrigerator may further include a water receiver detector to detect whether or not the water receiver is placed below the dispenser discharger, and the user interface may provide a message regarding detection of the water receiver when the water receiver detector detects the water receiver.

Furthermore, in accordance with yet another embodiment, the refrigerator may further include a water receiver detector to detect whether or not the water receiver is attached to the dispenser discharger, and the user interface may provide a message regarding detection of attachment of the water receiver.

Also, in accordance with yet another embodiment, the refrigerator may further include the user interface to receive a period of the dispenser cleaning.

Moreover, in accordance with yet another embodiment, the refrigerator may further include the user interface to provide a message regarding a last dispenser cleaning date.

Further, in accordance with yet another embodiment, the refrigerator may further include a communication device to communicate with other electronic device, and the controller may control the water supplier to supply the sterilizing water to the dispenser passage when the dispenser cleaning signal is transmitted from the other electronic device.

In accordance with one embodiment of a method of controlling a refrigerator, the method includes receiving a dispenser cleaning signal, providing a message instructing a user to place a water receiver capable of storing water at a dispenser discharger when the dispenser cleaning signal is input, detecting whether or not the water receiver is placed below the dispenser discharger, draining and storing sterilizing water, which is supplied to a dispenser passage and then kept therein, when the water receiver is detected, providing another message instructing the user to place the water receiver at the dispenser discharger when the draining of the sterilizing water is completed, detecting again whether or not the water receiver is placed below the dispenser discharger, and, when the water receiver is detected, supplying rinsing water to the dispenser passage and draining and storing the supplied rinsing water.

In accordance with another embodiment, the method may include receiving an input regarding a draining mode with respect to a draining device, receiving a number of times sterilizing water and rinsing water are supplied, receiving the dispenser cleaning signal, and supplying and draining the sterilizing water and the rinsing water according to the received number of times the sterilizing water and the rinsing water are supplied and the input regarding the draining mode when the dispenser cleaning signal is input.

In accordance with still another embodiment, the method may include receiving an input regarding a draining mode with respect to a draining device from other electronic device, receiving a number of times the sterilizing water and the rinsing water are supplied from the other electronic device, receiving the dispenser cleaning signal from the other electronic device, and supplying and draining the sterilizing water and the rinsing water according to the received number of times the sterilizing water and the rinsing water are supplied and the input regarding the draining mode when the dispenser cleaning signal is input.

In accordance with the refrigerator and the method of controlling the same described above, foreign materials and germs that have accumulated in the passage may be easily eliminated without a separate cleaning device.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
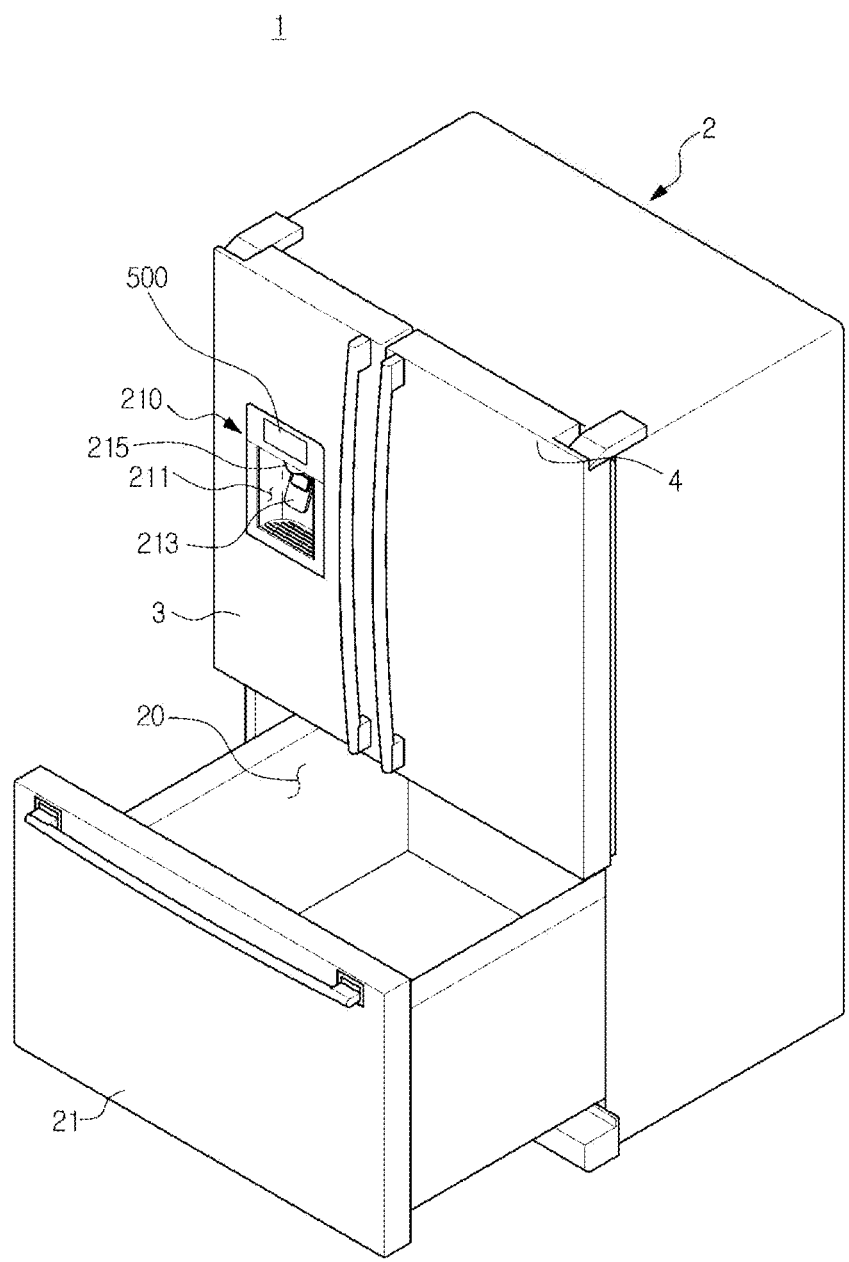
FIG. 1 is a view illustrating an external appearance of a refrigerator according to one embodiment of the present invention.

Reference will now be made in detail to the embodiments of the present disclosure, examples of which are illustrated in the accompanying drawings, wherein like reference numerals refer to like elements throughout.

Hereinafter, some embodiments of the present invention will be described in detail with reference to the accompanying illustrative drawings. Also, in the following description of the present invention, if a detailed description of known functions and configurations is determined to obscure the interpretation of embodiments of the present invention, the detailed description thereof will be omitted.

All terms used hereinafter are selected by considering a function in an embodiment, and meanings thereof may be different according to the intent or custom of a user and an operator. Therefore, the meanings of the terms used in the following embodiments should follow detailed definitions disclosed herein if any, and have the same meaning as commonly understood by those skilled in the art to which the invention pertains unless otherwise defined.

Even though all components are illustrated in the drawings as single units, these components should be construed to be freely combinable in groups of one or more thereof in selectively described aspects or embodiments to operate in combination unless otherwise defined or resulting in obvious contradictions to those skilled in the art.

Hereinafter, one embodiment of a refrigerator and a method for controlling the same will be described in detail with reference to the accompanying drawings.

Figure 2:
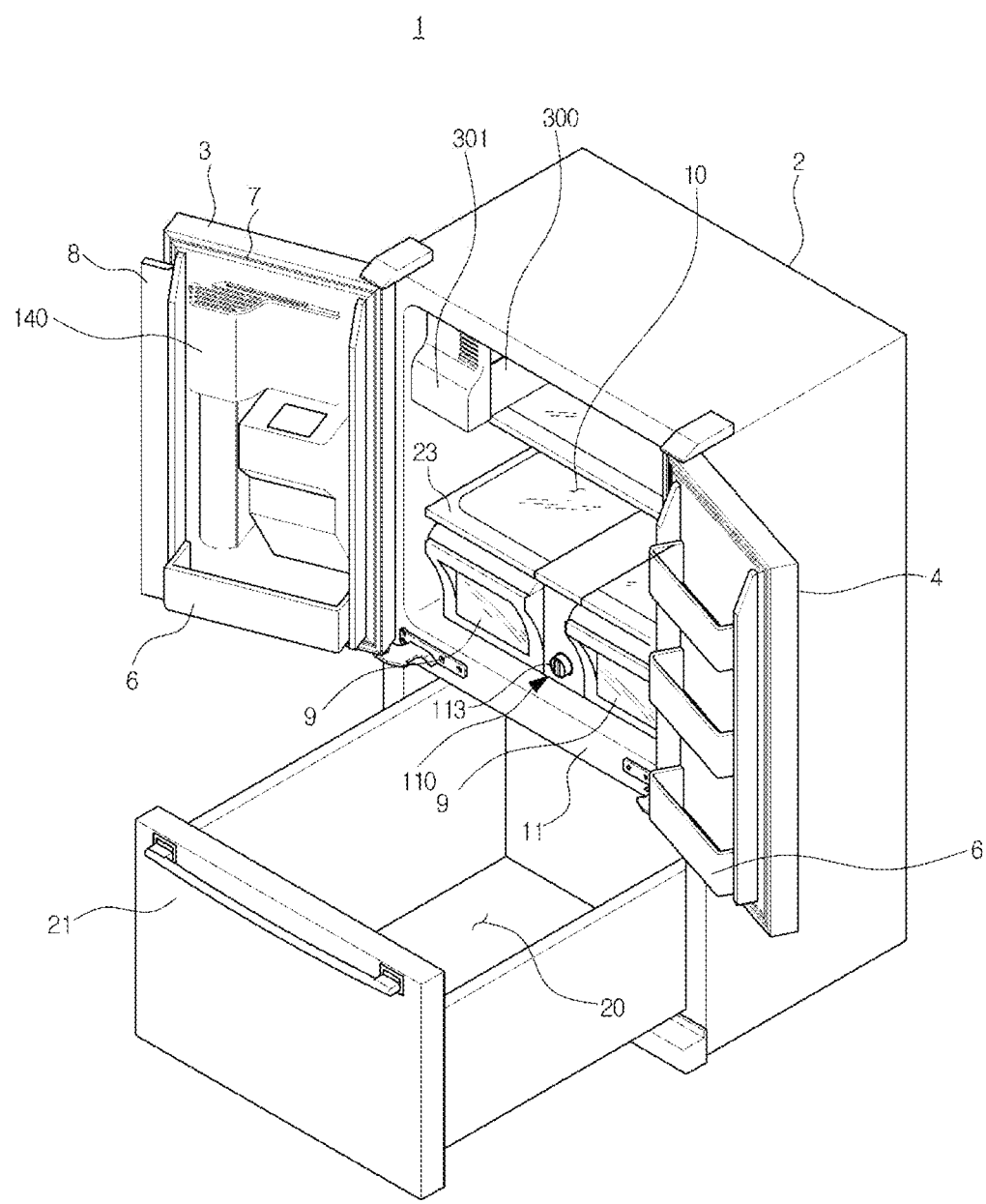
FIG. 2 is a view illustrating an interior of a refrigerator according to one embodiment of the present invention.

With reference to FIGS. 1 and 2, one embodiment of the refrigerator will be described below.

FIG. 1 illustrates an external appearance of the refrigerator, and FIG. 2 illustrates an interior of the refrigerator.

Referring to FIGS. 1 and 2, the refrigerator 1 may include a main body 2, storage compartments 10 and 20 provided inside the main body 2, and a cold air supplier for supplying cold air to the storage compartments 10 and 20.

The main body 2 may include an internal casing forming the storage compartments 10 and 20, an external casing coupled to the outside of the internal casing to form an exterior of the refrigerator 1, and an insulator arranged between the internal casing and the external casing to insulate the storage compartments 10 and 20 from the outside.

The storage compartments 10 and 20 may be divided into a refrigerating compartment 10 at an upper portion and a freezing compartment 20 at a lower portion by an intermediate partition wall 11. The refrigerating compartment 10 may be maintained at a temperature of approximately positive 3° C. to keep food and drinks under refrigeration, whereas the freezing compartment 20 may be maintained at a temperature of approximately negative 18.5° C. to keep food and drinks frozen.

Although it has been described that the refrigerating compartment 10 and the freezing compartment 20 are divided in an upper and lower direction, they are not limited thereto, and the refrigerating compartment 10 and the freezing compartment 20 may be divided in a left and right direction by the intermediate partition wall 11.

The refrigerating compartment 10 may be provided with shelves on which food and drinks are placed and at least one storage box 9 for maintaining airtightness of the food and drinks.

Also, the refrigerating compartment 10 may be provided with a purified water supplier 110 for purifying and storing water, and the purified water supplier 110 may include a water purification filter 113 for purifying water supplied from a water source 40, a water chamber 111 for storing the purified water, and the like.

Further, as shown in FIG. 2, the purified water supplier 110 may be provided between a plurality of storage boxes 9, but it is not limited thereto, and it may be sufficient for the purified water supplier 110 to be provided inside the refrigerating compartment 10 to enable the purified water from the purified water supplier 110 to be cooled by cold air inside the refrigerating compartment 10.

A detailed configuration of the purified water supplier 110 will be described below with reference to FIGS. 20 to 32B.

Moreover, an ice-making machine 300 capable of making ice may be formed at an upper corner inside the refrigerating compartment 10 in isolation therefrom. An ice-making device 301 for making and storing ice may be provided inside the ice-making machine 300, and may include ice trays for making the ice using purified water supplied from the water chamber 111, an ice bucket for storing the ice made in the ice trays, and the like.

Each of the refrigerating compartment 10 and the freezing compartment 20 has a front surface that opens to load and retrieve food and drinks. The opened front surface of the refrigerating compartment 10 may be opened and closed by a pair of rotary doors 3 and 4 which are coupled to the main body 2 through a hinge, and the opened front surface of the freezing compartment 20 may be opened and closed by a sliding door 21 that is slidable with respect to the main body 2.

A door guard 6 capable of accommodating food and drinks may be provided at a rear surface of each of the pair of rotary doors 3 and 4, a gasket 7 may be provided at an edge portion of the rear surface of each of the pair of rotary doors 3 and 4 to shield against cold air of the refrigerating compartment 10 by sealing between the pair of rotary doors 3 and 4 and the main body 2 when the pair of rotary doors 3 and 4 are closed.

Also, a rotary bar 8 may be selectively provided at one of the pair of rotary doors 3 and 4 of the refrigerating compartment 10 to shield against cold air of the refrigerating compartment 10 by sealing between the pair of rotary doors 3 and 4 upon being closed.

Further, at one of the pair of rotary doors 3 and 4 of the refrigerating compartment 10, a dispenser for discharging purified water, sparkling water, or ice to the outside without the pair of rotary doors 3 and 4 being opened, and a user interface 500 for receiving control instructions related to operations of the refrigerator 1 from a user and displaying operation information thereof may be provided.

The dispenser may include a withdrawal space 210a provided as a space into which a vessel including a cup and the like is inserted to withdraw water or ice, a dispenser lever 213 for activating the dispenser to discharge purified water, sparkling water, or ice, and a dispenser nozzle 215 discharging purified water or sparkling water.

A configuration and an operation of the dispenser will be described in detail below with reference to FIGS. 7 and 8.

The user interface 500 may include an input component 530 for receiving a variety of control instructions with respect to the refrigerator 1 from the user, and a display 510 for displaying operation information of the refrigerator 1 to the user.

The user interface 500 may receive a target temperature of the refrigerating compartment 10, a target temperature of the freezing compartment 20, an instruction to activate or deactivate making of sparkling water, a sparkling water concentration, and the like, and may display a current temperature of the refrigerating compartment 10, a current temperature of the freezing compartment 20, whether sparkling water is being made or not, a concentration of the made sparkling water, and the like, in response to the control instructions from the user. Also, the user interface 500 may receive a dispenser cleaning signal for cleaning the dispenser, and, more particularly, may receive a number of sterilizations, a number of rinses, a flow rate of sterilizing water, a flow rate of rinsing water, a drainage mode instruction, a sterilization time, a rinse time, and the like, which are related to the dispenser cleaning.

A configuration and an operation of the user interface 500 will be described in detail below with reference to FIG. 33.

A sparkling water supplier 140 for making and storing sparkling water may be mounted on the rear surface of one of the pair of rotary doors 3 and 4 at which the dispenser of the refrigerator 1 is provided.

Hereinafter, a configuration of the refrigerator 1 will be described with reference to FIGS. 3 and 4.

Figure 3:
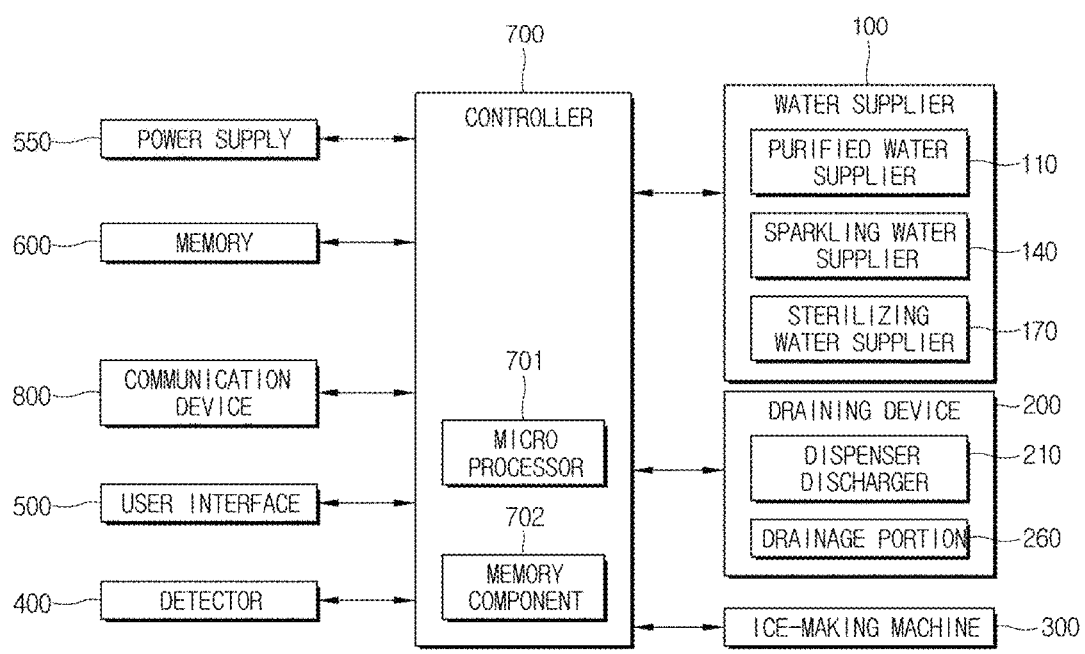
FIG. 3 is a schematic block diagram of a refrigerator according to one embodiment of the present invention.
Figure 4:
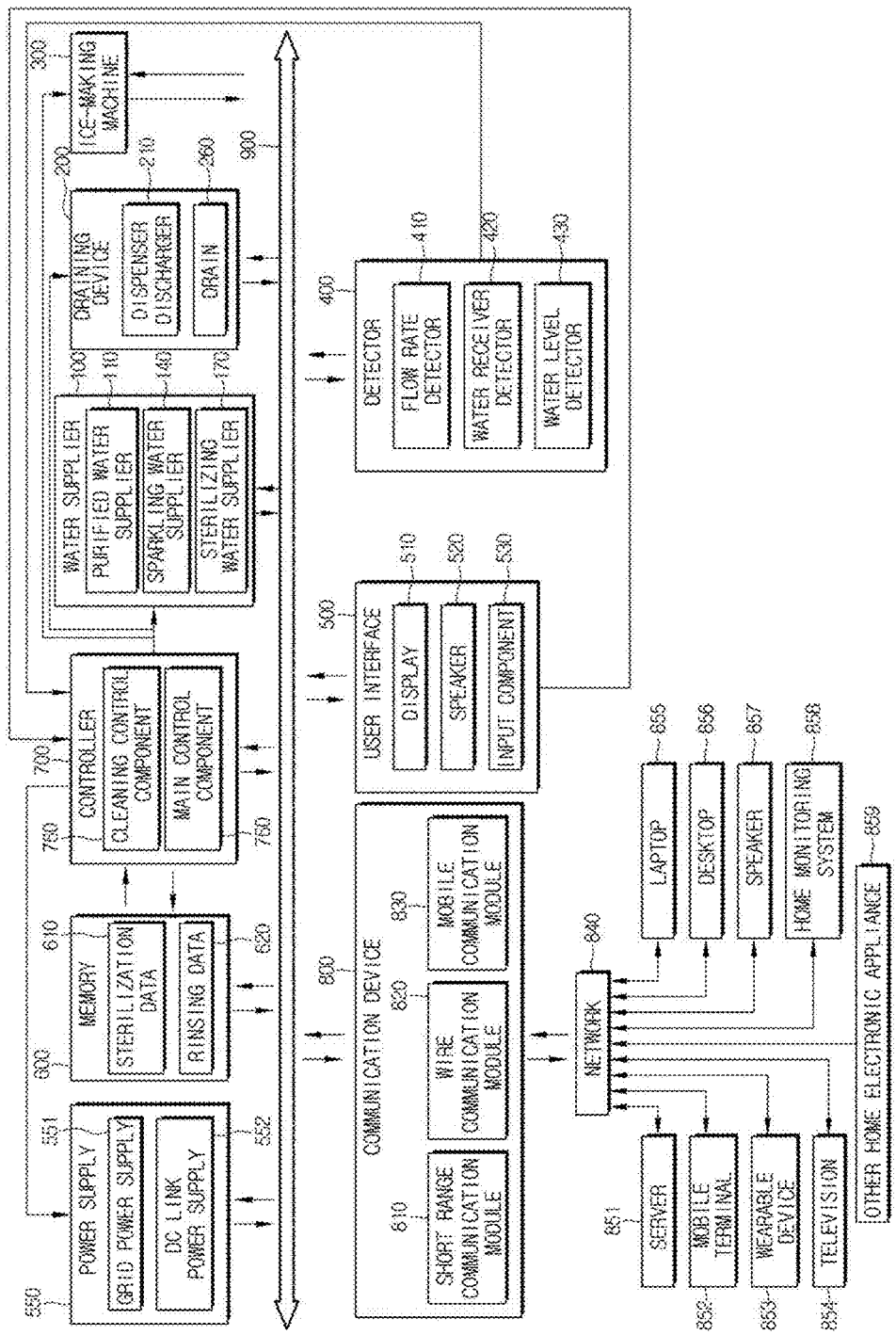
FIG. 4 is a detailed block diagram of a refrigerator according to one embodiment of the present invention.

FIG. 3 schematically shows a configuration of the refrigerator 1 in blocks, and FIG. 4 shows the configuration of the refrigerator 1 in blocks in detail.

The refrigerator 1 may include the dispenser, a detector 400, a power supply 550, a memory 600, the user interface 500, a communication device 800, and a controller 700. Also, the dispenser, the detector 400, the power supply 550, the memory 600, the user interface 500, the communication device 800, and the controller 700 may connected to each other through a bus 900.

The dispenser is a necessary configuration for enabling the refrigerator 1 to provide the user with water, and may include a water supplier 100, a draining device 200, and the ice-making machine 300.

The water supplier 100 is a device for supplying water required in the refrigerator 1, and may receive water from the outside to generate purified water, sparkling water, and sterilizing water. Also, the water supplier 100 may use the purified water or the water from the outside as rinsing water for eliminating the sterilizing water. Further, the water supplier 100 may include the purified water supplier 110, the sparkling water supplier 140, and a sterilizing water supplier 170.

The purified water supplier 110 receives water from the outside and filters foreign materials contained in the water to generate purified water, and also may control a temperature of the purified water. Moreover, the purified water supplier 110 may provide the sparkling water supplier 140 with the purified water to enable the sparkling water supplier 140 to generate sparkling water, and may provide the ice-making machine 300 with the purified water to enable the ice-making machine 300 to generate ice.

The sparkling water supplier 140 may generate sparkling water by mixing the purified water provided from the purified water supplier 110 with carbon dioxide gas stored in a carbon dioxide cylinder. Alternatively, the sparkling water supplier 140 may generate the sparkling water through a mixing tube, a sparkling vessel, or a water receiver.

The sterilizing water supplier 170 may generate sterilizing water containing hypochlorous acid (HClO) by performing electrolysis on the purified water or water provided from the external water source 40. Also, the sterilizing water supplier 170 may deliver the generated sterilizing water to the dispenser to eliminate foreign materials and germs that have accumulated in a dispenser passage 99.

Figure 5:
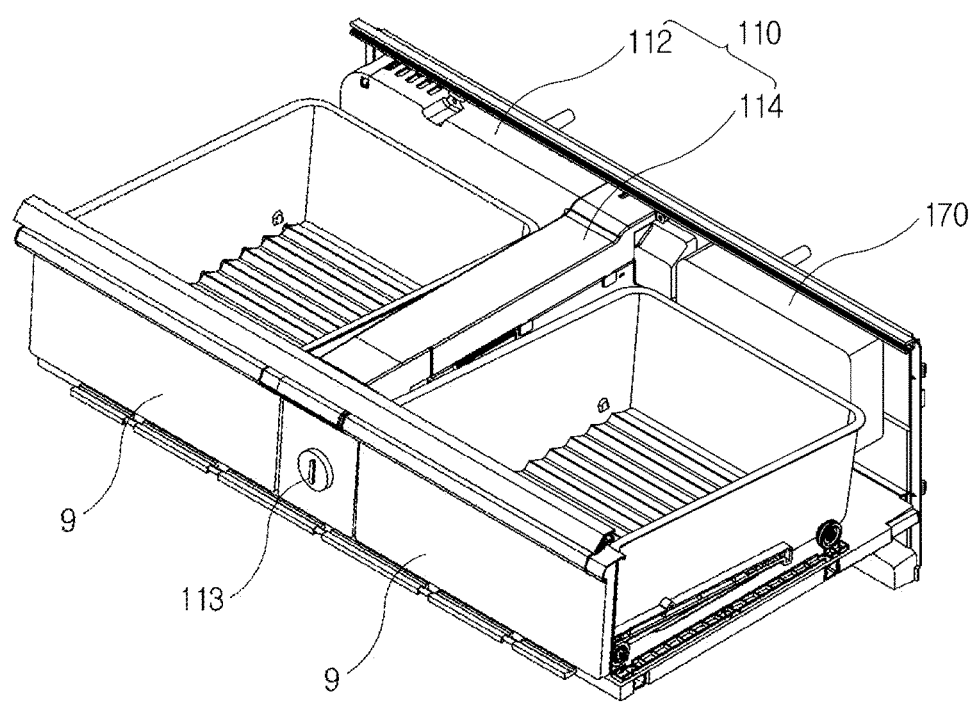
FIG. 5 is a view illustrating a part of an interior of a refrigerator according to one embodiment of the present invention.
Figure 6:
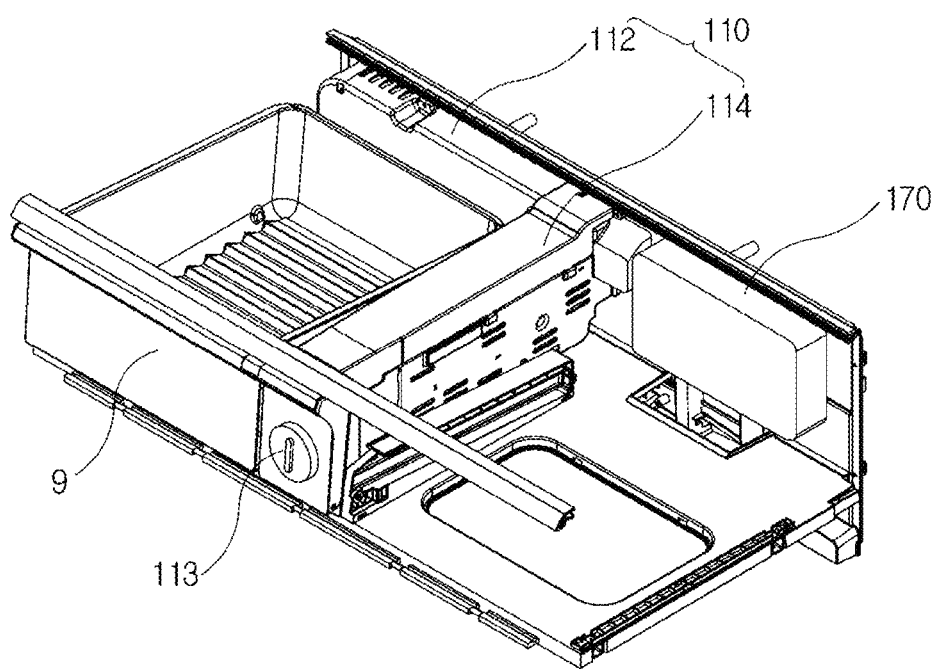
FIG. 6 is a view illustrating a water supplier provided inside a refrigerator according to one embodiment of the present invention.

An arrangement of the purified water supplier 110 and the sterilizing water supplier 170 inside the refrigerator 1 may be seen in FIGS. 5 and 6.

FIG. 5 shows a part of an interior of the refrigerator 1, and FIG. 6 shows the water supplier 100 provided inside the refrigerator 1.

The storage box 9 may be provided at each of left and right sides inside the storage compartment of the refrigerating compartment 10 of the refrigerator 1, and the purified water supplier 110 and the sterilizing water supplier 170 may be provided in the vicinity of the two storage boxes 9.

In particular, the purified water supplier 110 may include a first purified water housing 114 and a second purified water housing 112. The first purified water housing 114 is a cover including the water purification filter 113, and may be provided between the two storage boxes 9. The second purified water housing 112 is a cover including the water chamber 111, and may be provided between the left one of the two storage boxes 9 and an internal wall of the storage compartment of the refrigerating compartment 10.

The sterilizing water supplier 170 may be provided as a separate module in isolation from the purified water supplier 110, may be removable as necessary upon manufacture by a manufacturer or use by the user. Also, the sterilizing water supplier 170 may be provided between the right one of the two storage boxes 9 and the internal wall of the storage compartment of the refrigerating compartment 10.

The draining device 200 may use water supplied from the water supplier 100 and then drain the used water from the refrigerator 1 to the outside thereof. The draining device 200 may drain water into the dispenser to allow the dispenser to dispense the water to the user or to discard the water, or may be connected to an external drain to drain the used water into the external drain.

In particular, the draining device 200 may include a dispenser discharger 210 and a drainage component 260.

The dispenser discharger 210 may dispense the water supplied from the water supplier 100 to the user. In other words, the dispenser discharger 210 may dispense purified water or sparkling water required by the user. A shape and a function of the dispenser discharger 210 will be described in detail with reference to FIGS. 7 to 19C.

The drainage component 260 may drain water supplied from the water supplier 100 into the external drain after using the water to discard the used water.

In particular, the drainage component 260 may drain sterilizing water, which is supplied from the sterilizing water supplier 170 to the dispenser to sterilize the dispenser, to the outside of the refrigerator 1. Also, the drainage component 260 may drain rinsing water, which is supplied to the dispenser to rinse the dispenser, to the outside.

The ice-making machine 300 may receive the purified water from the purified water supplier 110 and generate ice by freezing the purified water to provide the generated ice to the dispenser. On the other hand, the ice-making machine 300 may be deactivated during a dispenser cleaning operation of the refrigerator 1 not to generate ice.

A relationship among the water supplier 100, the draining device 200, and the ice-making machine 300 and functions thereof will be described in detail below with reference to FIGS. 20 and 32B.

The detector 400 may detect an operation status of the refrigerator 1 to use the detected operation status for operation control of the refrigerator 1. In particular, the detector 400 may detect a flow rate of water flowing in the dispenser, whether or not the water receiver is positioned at a side of the dispenser, or a water level in the water receiver. Specifically, the detector 400 may include a flow rate detector 410, a water receiver detector 420, and a water level detector 430.

The flow rate detector 410 may detect a flow rate of water flowing in the dispenser passage 99. In particular, the flow rate detector 410 may be provided at a valve of the dispenser passage 99 to detect a speed and pressure of fluid passing through the valve, thereby detecting a flow rate of water.

The water receiver detector 420 may detect whether or not the water receiver is positioned at a side of the dispenser. In particular, the water receiver detector 420 may detect whether or not the water receiver is positioned at or attached to a lower portion of the dispenser discharger 210 when a drainage operation of a dispenser cleaning mode is performed through the dispenser discharger 210. For example, when a cup-shaped water receiver 250 is used, an optical sensor may be provided at a side wall of the dispenser to detect whether or not the cup-shaped water receiver 250 is positioned at a lower portion of the dispenser discharger 210, or a touch sensor or a weight sensor may be provided at a lower portion wall of the dispenser to detect whether or not the cup-shaped water receiver 250 is positioned at the lower portion of the dispenser discharger 210.

Alternatively, if the water receiver is a bottle-shaped water receiver 252 or a hose-shaped water receiver 240 that is attachable to and detachable from the dispenser discharger 210, the water receiver detector 420 may have a configuration provided at a side of the dispenser discharger 210 for detecting attachment and detachment of the water receiver 252 or 240. A configuration for detecting the attachment and detachment will be described in detail below with reference to FIGS. 15 to 16C and FIGS. 18 to 19C.

The water level detector 430 may detect a water level of water stored in the water receiver. For example, a plurality of optical sensors may be provided at one side wall of the dispenser to detect a water level, or a weight at a position at which the water receiver is placed or is attached or detached is measured to detect a water level of water stored in the water receiver.

The power supply 550 may include a grid power supply 551 and a direct-current (DC) link power supply 552.

The grid power supply 551 is a power supplier providing alternating-current (AC) power to the DC link power supply 552 and the like. The grid power supply 551 may receive electric power from the outside to transmit the received electric power to the DC link power supply 552, or may convert chemical energy into electrical energy as a battery to transmit the converted electrical energy to the DC link power supply 552.

The DC link power supply 552 converts AC power supplied from the grid power supply 551 into DC power to provide electrical energy required to operate the refrigerator 1.

In particular, the power supply 550 may include the grid power supply 551 for supplying electrical energy from the outside to the inside of the refrigerator 1 as AC power, and the DC link power supply 552 for converting the supplied AC power into DC power.

The DC link power supply 552 may include a rectifier circuit, a power factor correction circuit, and a smoothing circuit.

The rectifier circuit may convert AC power supplied from the grid power supply 551 into DC power. The rectifier circuit may be a full bridge type circuit in which four diodes are arranged, or a half bridge type circuit in which two diodes and two capacitors are arranged. Besides the circuits described above, a variety of circuits capable of converting AC power into DC power may be used as the rectifier circuit.

The power factor correction circuit may adjust a magnitude of the converted DC power. In particular, the power factor correction circuit may receive a correction value determined by the controller 700 or a DC power instruction therefrom to adjust a magnitude of DC power to reduce a conversion loss in a power conversion circuit.

The smoothing circuit may eliminate noise of the DC power corrected in the power factor correction circuit. In particular, the smoothing circuit may include low-pass filters to eliminate high frequency noise. For example, the smoothing circuit may be a circuit in which capacitors are connected in parallel to two nodes, or buffers are connected in parallel to capacitors. Besides the circuits described above, a variety of circuits for eliminating noise of DC power may be used as the smoothing circuit.

The memory 600 is a device for storing a flow rate detected by the detector 400 of fluid flowing in the dispenser, whether or not the water receiver is positioned below the dispenser discharger 210, a water level of water stored inside the water receiver, control data of the controller 700, input data from the input component 530, communication data of the communication device 800, and the like.

Also, the memory 600 may store sterilization data 610 and rinse data 620.

The sterilization data 610 may be data regarding a cycle of generating and providing sterilizing water, keeping the sterilizing water in the dispenser passage 99, and then draining the sterilizing water therefrom. For example, the sterilization data 610 may include a magnitude and time of power to be applied to electrodes to provide the sterilizing water, an opening time of a valve, a flow rate of the sterilizing water to be generated, times for which the sterilizing water is supplied to the dispenser and kept therein, a number of sterilization cycles, and the like. The rinse data 620 may be data regarding a cycle for providing rinsing water to the dispenser and then draining the rinsing water therefrom. For example, the rinse data 620 may include an opening time of a valve, a flow rate of the rinsing water to be supplied, times for which the rinsing water is supplied to the dispenser and drained therefrom, a number of rinsing cycles, and the like.

The memory 600 may include a volatile memory such as a read-only memory (ROM), a high-speed random access memory (RAM), a magnetic disk storage, and a flash memory, or a non-volatile semiconductor memory.

For example, the memory 600 is a semiconductor memory device, and a secure digital (SD) memory card, a secure digital high capacity (SDHC) memory card, a mini SD memory card, a mini SDHC memory card, a trans flash (TF) memory card, a micro SD memory card, a micro SDHC memory card, a memory stick, a compact flash (CF), a multi-media card (MMC), an MMC micro, an extreme digital (XD) card, and the like may be used thereas.

Also, the memory 600 may include a storage device attachable to a network 840 to be accessed therethrough.

The user interface 500 has a configuration for receiving an instruction regarding the refrigerator 1 from the user with and recognizing an operation of the refrigerator 1, and may include the input component 530 and the display 510.

The input component 530 is a combination of buttons for selecting operations of the refrigerator 1. The input component 530 may be a push button type in which a manipulation button is pushed, a sliding switch type in which the user may manipulate a desired operation of the refrigerator 1, and a touch switch type in which the user touches a switch to input a desired operation. Besides the switch types described above, a variety of input components for enabling the user to input desired operations with respect to the refrigerator 1 may be used as the input component 530.

The display 510 may indicate a control status of the refrigerator 1 being controlled by the controller 700, an operation status of the refrigerator 1 detected by the detector 400, and the like to the user in the form of visual, auditory, and tactile information.

The user interface 500 may display an operation and a status of the refrigerator 1 and receive instructions to be selected to operate the refrigerator 1.

In particular, the user interface 500 may include the display, a speaker 520, and an input component 530.

The display 510 may be provided as a cathode ray tube (CRT), a digital light processing (DLP) panel, a plasma display panel, a liquid crystal display (LCD) panel, an electro luminescence (EL) panel, an electrophoretic display (EPD) panel, an electrochromic display panel, a light emitting diode (LED) panel, an organic light emitting diode (OLED) panel, or the like, but it is not limited thereto.

The speaker 520 may inform the user of a control and operation status of the refrigerator 1, variables detected by the detector 400 of auditory information, and the like, and may guide a behavior that the user should perform to clean the dispenser of the refrigerator 1, and the like.

The input component 530 is a combination of buttons for selecting operations of the refrigerator 1. The input component 530 may be a push button type in which a manipulation button is pushed, a sliding switch type in which the user may manipulate a desired operation of the refrigerator 1, and a touch switch type in which the user touches a switch to input a desired operation. Besides the switch types described above, a variety of input components for enabling the user to input desired operations with respect to the refrigerator 1 may be used as the input component 530.

The user interface 500 may include a central processing unit (CPU) and a graphic processing unit (GPU) which are implemented by a microprocessor and the like, and various kinds of storage devices, and these devices may be provided on a mounted printed circuit board (PCB).

The user interface 500 will be described in detail below with reference to FIGS. 33 to 41.

The communication device 800 may be connected to the network 840 by wire and wirelessly to communicate with other external home electric appliances or servers. The communication device 800 may transmit and receive data to and from servers and other electronic devices, which are connected to each other through a home server. Also, the communication device 800 may perform data communication according to a protocol of the home server.

The communication device 800 may transmit and receive data related to remote control through the network 840, as well as operations and the like of other home electric appliances. Further, the communication device 800 may receive information related to a life pattern of the user from a server for use in operating the refrigerator 1. Furthermore, the communication device 800 may perform data communication with not only a server inside a home but also other home electric appliances including a mobile terminal 851 of the user and the like.

The communication device 800 may be connected to the network 840 by wire and wirelessly to transmit and receive data to and from a server 852, the mobile terminal 851, or other electronic devices. The communication device 800 may include one or more components communicating with other external electronic devices. For example, the communication device 800 may include a short range communication module 810, a wired communication module 820, and a mobile communication module 830.

The short range communication module 810 may be a module for short range communication within a predetermined short range. A short range communication technology may include a wireless local area network (LAN), wireless fidelity (Wi-Fi), Bluetooth, Zigbee, Wi-Fi direct (WFD), ultra wideband (UWB), Infrared Data Association (IrDA), Bluetooth low energy (BLE), near field communication (NFC), and the like, but it is not limited thereto.

The wired communication module 820 may be a module for communication using an electrical signal or an optical signal. The wired communication technology may include a pair cable, a coaxial cable, an optical fiber cable, an Ethernet cable, and the like, but it is not limited thereto.

The mobile communication module 830 may transmit and receive a wireless signal to and from at least one of a base station, an external terminal, and a server, which are connected to a mobile communication network. The wireless signal may include a variety of forms of data according to transmission and reception of a voice call signal, a video telephony call, or a text/multimedia message.

The controller 700 controls operations of the refrigerator 1.

In particular, the controller 700 may include a main control component 710 for controlling overall operations of the refrigerator 1, and a cleaning control component 760 for controlling each element for performing dispenser cleaning.

The main control component 710 controls the overall operations of the refrigerator 1.

In particular, the main control component 710 may receive a dispenser cleaning signal from the input component 530 and start dispenser cleaning to control performance of a sterilization cycle and a rinsing cycle. Also, when draining is performed at the dispenser discharger 210, the main control component 710 may control dispenser cleaning to start when a dispenser cleaning signal is input and the water receiver detector 420 detects that the water receiver is positioned near the dispenser discharger 210. Further, when the dispenser cleaning is performed, the main control component 710 may control a passage connecting to the ice-making machine 300 to be blocked, thereby preventing sterilizing water and rinsing water from flowing into the ice-making machine 300. Moreover, the main control component 710 may control the display 510 to display an operation currently being performed by the refrigerator 1 and a status thereof, and control the refrigerator 1 to perform a desired operation by receiving the desired operation from the user.

The cleaning control component 760 may receive a control signal from the main control component 710 to transmit the received control signal to a sub-configuration to perform the dispenser cleaning.

In particular, upon receiving a sterilization cycle performance signal from the main control component 710, the cleaning control component 760 may control a valve at the purified water supplier 110 to close and a valve at the sterilizing water supplier 170 to open to generate sterilizing water, and control a valve at the drain to close, thereby keeping the sterilizing water in the dispenser passage 99 during a predetermined time. Then, after the predetermined time, the cleaning control component 760 may control the valve at the drain to open to perform drainage of the sterilizing water.

Also, upon receiving a rinsing cycle performance signal from the main control component 710, the cleaning control component 760 may open the valve at the purified water supplier 110 and close the valve at the sterilizing water supplier 170 to generate rinsing water, thereby supplying the rinsing water to the dispenser passage 99. Thereafter, the cleaning control component 760 may control the valve at the drain to open to perform drainage of the rinsing water.

Such a controller 700 may include a memory component 702 storing a control program and a control data retrieved from the memory 600, and a microprocessor 701 performing an arithmetic operation according to the control program and the control data stored in the memory 600.

The memory component 702 may include a volatile memory such as a static RAM (SRAM), a dynamic RAM (DRAM), and the like, but is not limited thereto. According to circumstances, the memory component 702 may include a non-volatile memory such as a flash memory, an erasable programmable read only memory (EPROM), and the like.

The microprocessor 701 performs an arithmetic operation for controlling various components included in the refrigerator 1 according to the control program and the control data stored in the memory component 702. Also, the microprocessor 701 may be a process device in which an arithmetic and logic calculator, a resistor, a program counter, an instruction decoder, a control circuit, or the like is provided in at least one silicon chip.

Also, the microprocessor 701 may include a graphic processing unit (GPU) for graphic processing of an image or a video. The microprocessor 701 may be implemented in the form of a core and a system on chip (SoC) including the GPU. The microprocessor 701 may include a single core, a dual core, a triple core, a quad core, and a multiple core thereof.

An operation of the refrigerator 1 to be described below may be regarded as an operation according to a control operation of the controller 700.

Figure 7:
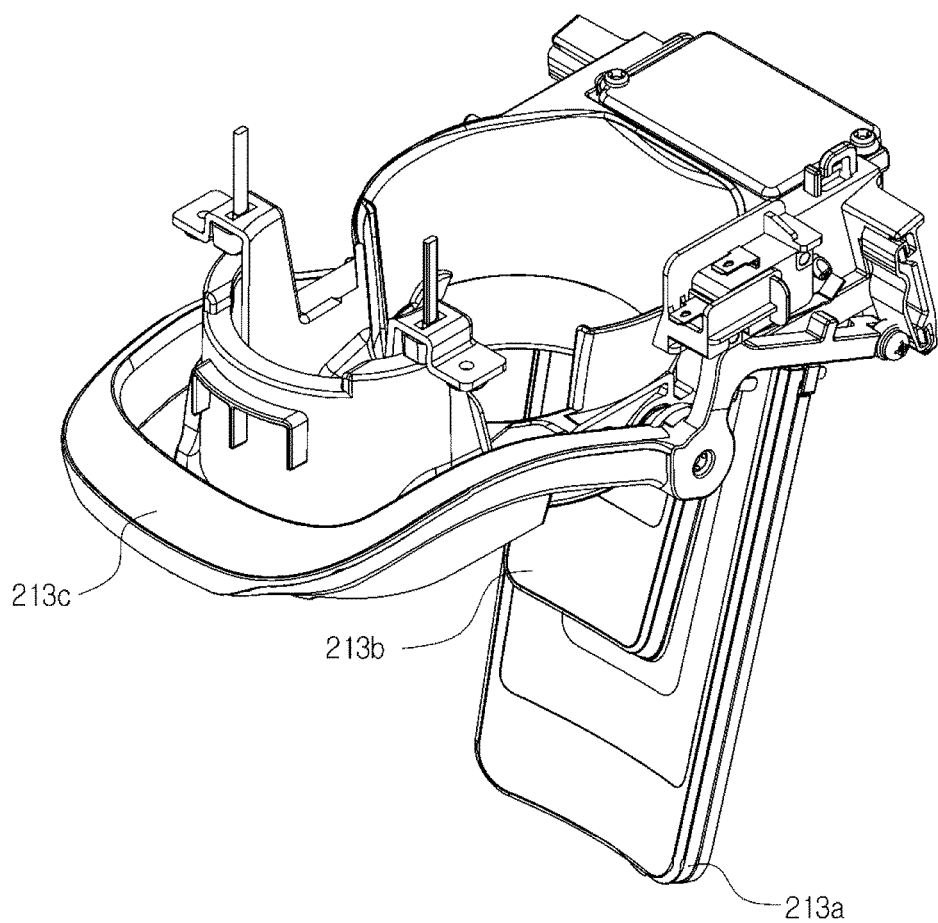
FIG. 7 is a view illustrating a configuration of a dispenser module included in a refrigerator according to one embodiment of the present invention.
Figure 8:
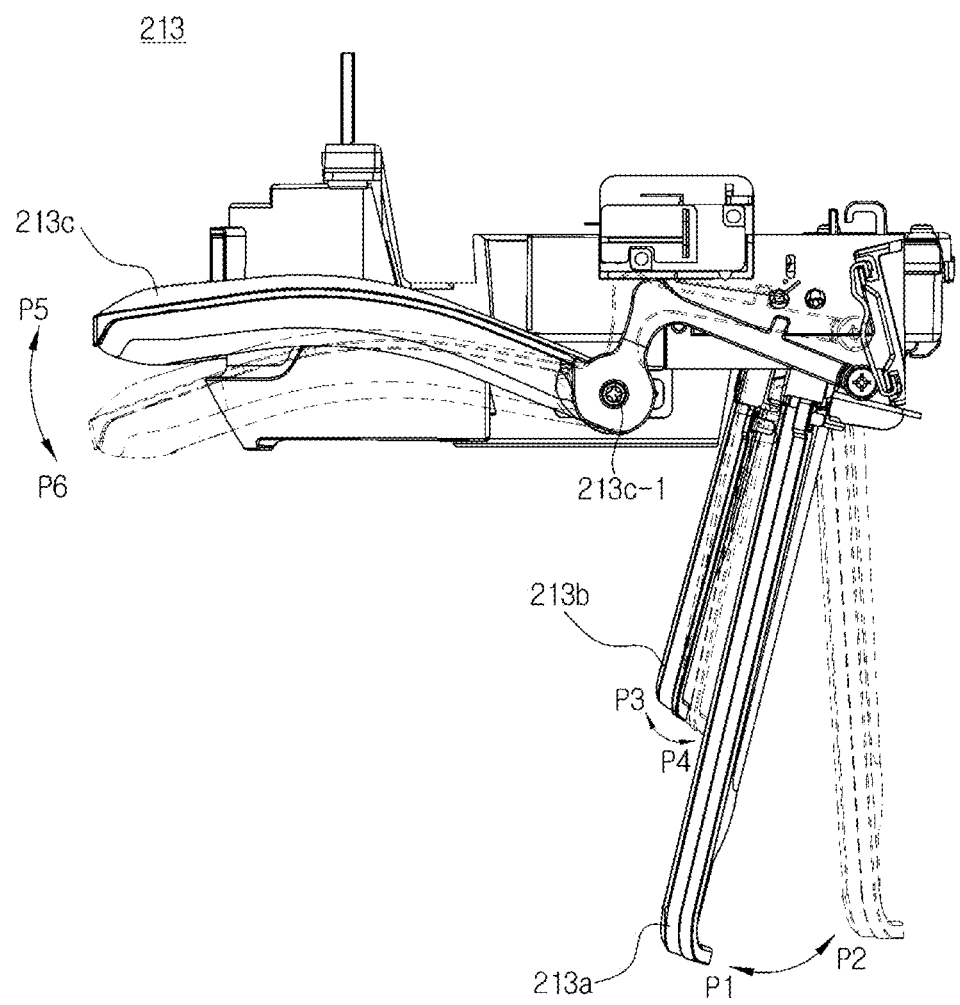
FIG. 8 is a view illustrating an operation of a dispenser module included in a refrigerator according to one embodiment of the present invention.

FIG. 7 shows a configuration of a dispenser module included in the refrigerator 1, and FIG. 8 shows an operation of the dispenser module included in the refrigerator 1.

With reference to FIGS. 7 and 8, the dispenser lever may include a first dispenser lever 213*a*, a second dispenser lever 213*b*, and a third dispenser lever 213*c*.

The first dispenser lever 213*a* may be formed to extend from an upper side to a lower side, and may rotatably move forward and backward centering on a first rotation axis provided at an upper portion of the first dispenser lever 213*a*.

In particular, the first dispenser lever 213*a* may rotatably move between a first position P1 and a second position P2 centering on the first rotation axis. For example, the first dispenser lever 213*a* moves from the first position P1 to the second position P2 when the user presses the first dispenser lever 213*a* backward, whereas the first dispenser lever automatically returns to the first position P1 when the user releases the first dispenser lever 213*a*.

The second dispenser lever 213*b* may be provided to be stacked in front of the first dispenser lever 213*a*, and may rotatably move forward and backward centering on a second rotation axis provided above the second dispenser lever 213*b*.

The second dispenser lever 213*b* may rotatably move between a third position P3 and a fourth position P4 centering on the second rotation axis. For example, the second dispenser lever 213*b* moves from the position P3 to the position P4 when the user presses the second dispenser lever 213*b* backward, whereas the second dispenser lever 213*b* automatically returns to the third position P3 when the user releases the second dispenser lever 213*b*.

Also, the third dispenser lever 213*c* may be provided to protrude forward from the dispenser, and may rotatably move upward and downward centering on a third rotation axis 213*c*-1 positioned behind the third dispenser lever 213*c*.

In particular, the third dispenser lever 213*c* may rotatably move between a fifth position P5 and a sixth position P6 centering on the third rotation axis 213*c*-1. For example, when the user presses the third dispenser lever 213*c* downward, the third dispenser lever 213*c* moves from the fifth position P5 to the sixth position P6 to be fixed at the sixth position P6. On the other hand, when the user presses the third dispenser lever 213*c* upward, the third dispenser lever 213*c* moves from the sixth position P6 to the fifth position P5 to be fixed at the fifth position P5.

The user may input an ice discharge instruction, a purified water discharge instruction, or a sparkling water discharge instruction by manipulating the first dispenser lever 213*a*, the second dispenser lever 213*b*, and the third dispenser lever 213*c* according to a predetermined manipulation manner.

For example, when the user presses the first dispenser lever 213*a*, the refrigerator 1 may discharge purified water. In other words, the refrigerator 1 may discharge purified water through the dispenser when the first dispenser lever 213*a* is positioned at the second position P2, whereas the refrigerator 1 may stop the discharging of the purified water when the first dispenser lever 213*a* is positioned at the first position P1.

As another example, the refrigerator 1 may discharge sparkling water when the user places the third dispenser lever 213*c* at the fifth position P5 and presses the second dispenser lever 213*b*, whereas the refrigerator 1 may discharge ice when the user places the third dispenser lever 213*c* at the sixth position P6 and presses the second dispenser lever 213*b*. In other words, the refrigerator 1 may discharge the sparkling water or the ice according to a position of the third dispenser lever 213*c* when the second dispenser lever 213*b* is positioned at the fourth position P4, whereas the refrigerator 1 may stop the discharging of the sparkling water or the ice when the second dispenser lever 213*b* is positioned at the third position P3.

The configuration of the refrigerator 1 according to one embodiment has been described above. However, the refrigerator 1 described above is merely one embodiment to which the disclosed invention is applicable, and thus the disclosed invention may be applicable to any configuration of a refrigerator capable of generating sparkling water.

Hereinafter, embodiments of a dispenser, a water receiver, and a detector will be described with reference to FIGS. 9 to 19C.

FIGS. 9 to 12 show embodiments of a cup-shaped water receiver, a dispenser, and a detector, FIGS. 13 to 16C show embodiments of a bottle-shaped water receiver, a dispenser, and a detector, and FIGS. 17 to 19C show embodiments of a water receiver including the hose 240 and a water chamber, a dispenser, and a detector.

Figure 9:
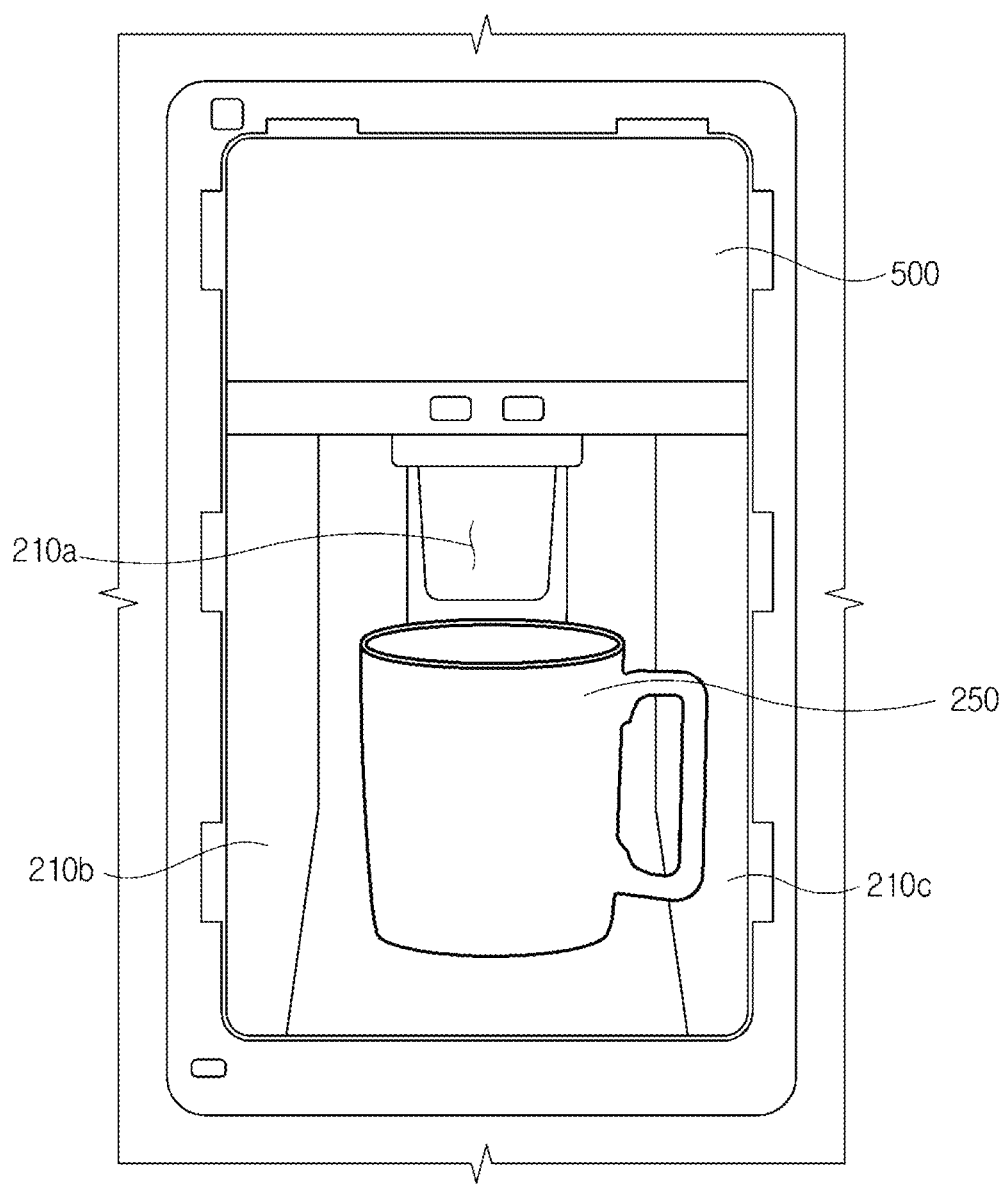
FIG. 9 is a view illustrating a dispenser module available for a cup according to one embodiment of the present invention.

FIG. 9 shows a dispenser module available for a cup according to one embodiment.

As shown in FIG. 9, the user interface 500 for receiving instructions from the user and providing messages with respect to a status of a refrigerator 1 and an operation performed therein may be provided above a dispenser.

The dispenser may be provided with a dispenser lever 211 disposed at an inner space provided inside the dispenser, and walls 210b and 210c disposed at both sides of the dispenser to support the inner space. Also, a withdrawal space 210a from which water can be withdrawn may be formed at a front surface of the dispenser lever 211 between the walls 210b and 210c. Further, a lower portion of the withdrawal space 210a may be formed to be inclined forward to prevent water from collecting in the dispenser.

When the user places a cup-shaped water receiver 250 in the withdrawal space 210a to push the dispenser lever 211, the controller 700 may recognize that the cup-shaped water receiver 250 is placed below the dispenser discharger 210, and sterilizing water and rinsing water may be drained into the cup-shaped water receiver 250.

Figure 10:
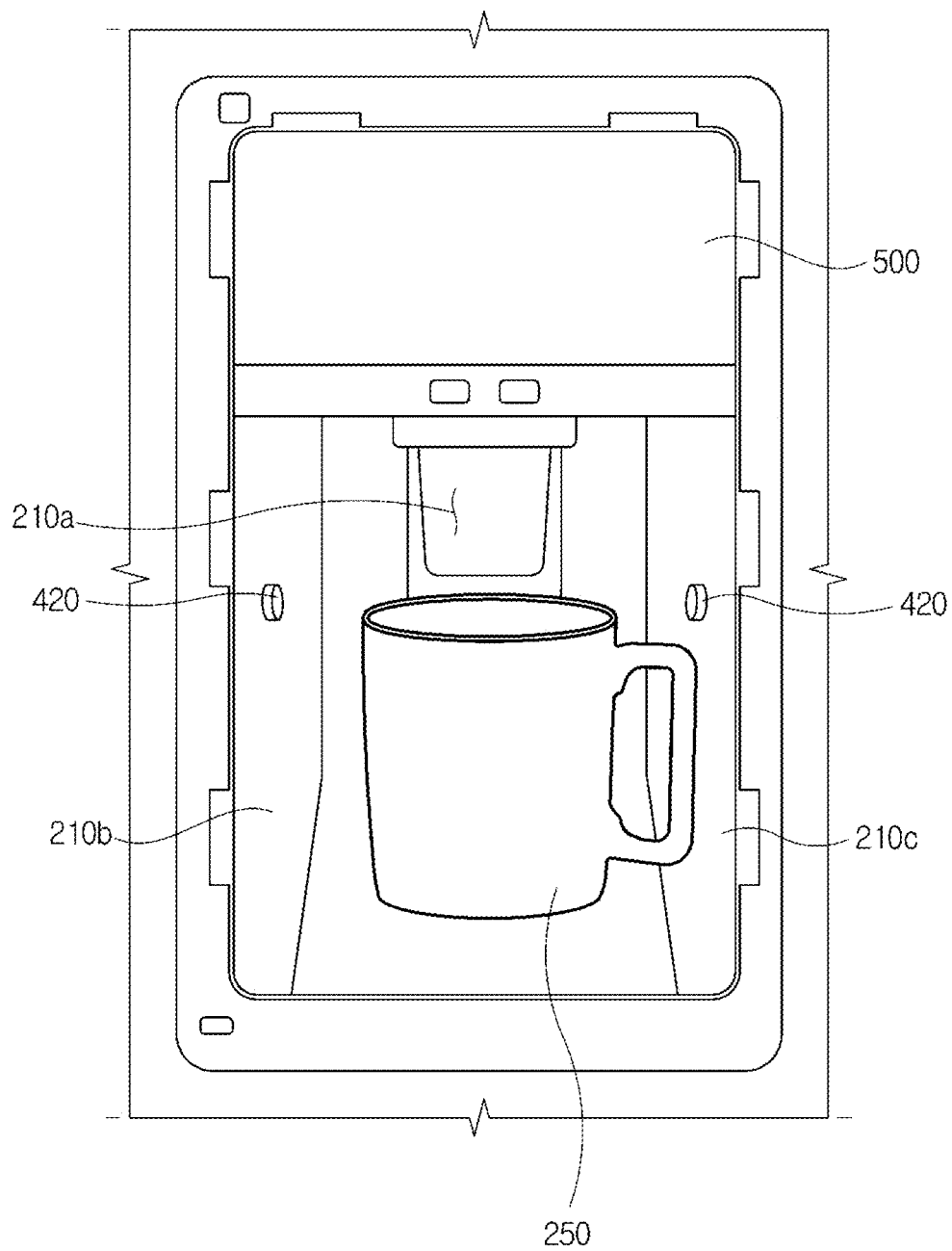
FIG. 10 is a view illustrating a dispenser module available for a cup according to a first embodiment of the present invention.

FIG. 10 shows a dispenser module available for a cup according to a first embodiment.

As shown in FIG. 10, a user interface 500 for receiving instructions from a user and providing messages with respect to a status of a refrigerator 1 and an operation performed therein may be provided above a dispenser.

The dispenser may be provided with a dispenser lever 211 disposed at an inner space provided inside the dispenser, and walls 210b and 210c disposed at both sides of the dispenser to support the inner space. Also, a withdrawal space 210a from which water can be withdrawn may be formed at a front surface of the dispenser lever 211 between the walls 210b and 210c. Further, a lower portion of the withdrawal space 210a may be formed to be inclined forward to prevent water from collecting in the dispenser.

Additionally, a water receiver detector 420 capable of detecting a water receiver may be provided at each of the walls 210b and 210c. The water receiver detector 420 may detect whether or not the cup-shaped water receiver 250 is placed in the withdrawal space 210a by irradiating one of the walls 210b and 210c with light to detect a returning time and a magnitude of the light reflected from the other of the walls 210b and 210c. Therefore, an ultrasonic sensor and an infrared sensor may be used as the water receiver detector 420. Besides the sensors described above, a variety of sensors capable of detecting whether or not the cup-shaped water receiver 250 is placed below the dispenser discharger 210 may be used as the water receiver detector 420.

Therefore, when the user places the cup-shaped water receiver 250 in the withdrawal space 210a, the controller 700 may recognize that the cup-shaped water receiver 250 is placed below the dispenser discharger 210, and sterilizing water and rinsing water may be drained into the cup-shaped water receiver 250.

Figure 11:
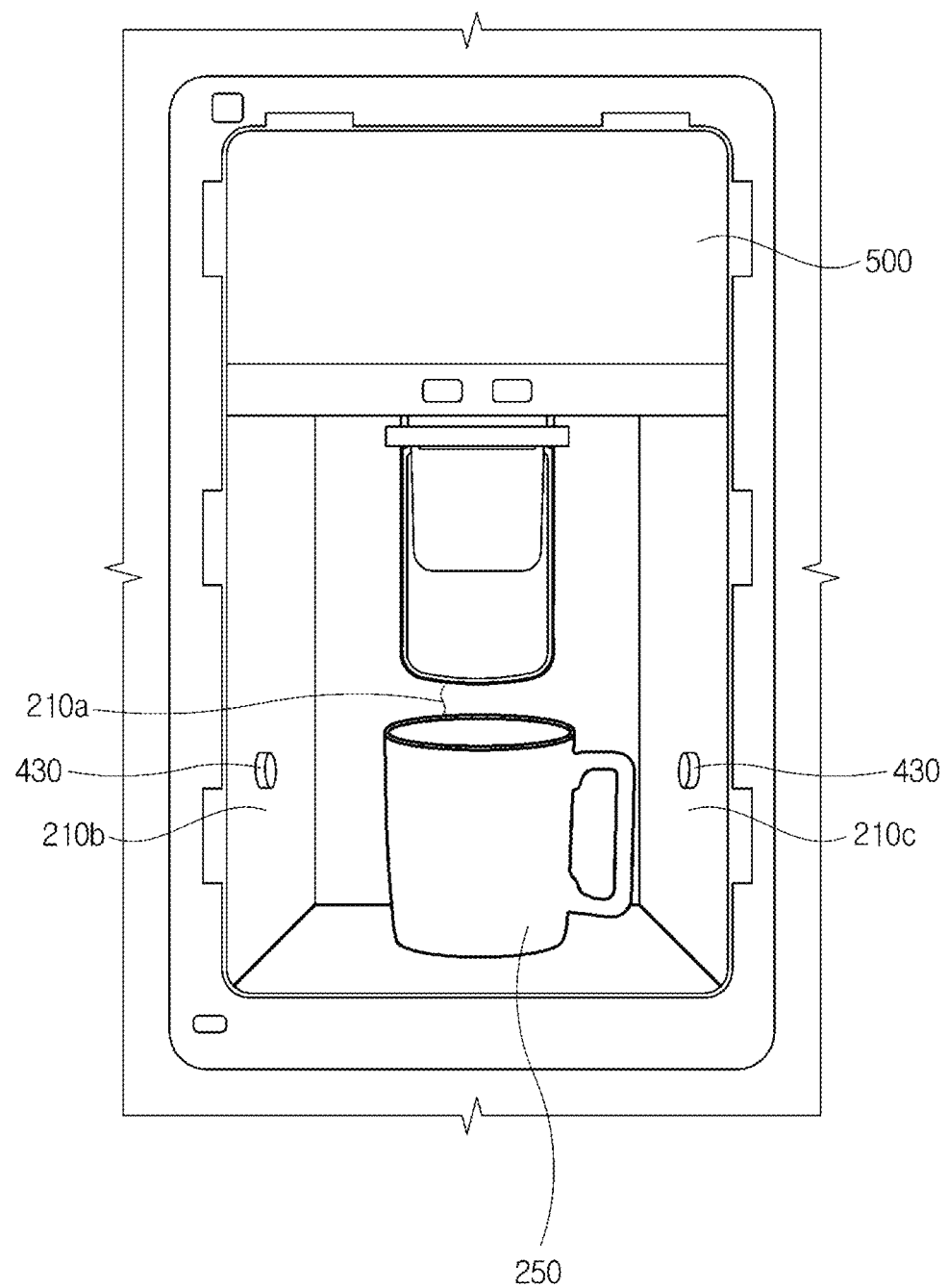
FIG. 11 is a view illustrating a dispenser module available for a cup according to a second embodiment of the present invention.

FIG. 11 shows a dispenser module available for a cup according to a second embodiment.

As shown in FIG. 11, a user interface 500 for receiving instructions from a user and providing messages with respect to a status of a refrigerator 1 and an operation performed therein may be provided above a dispenser.

The dispenser may be provided with a dispenser lever 211 disposed in an inner space provided inside the dispenser, and walls 210b and 210c disposed at both sides of the dispenser to support the inner space. Also, a withdrawal space 210a from which water can be withdrawn may be formed at a front surface of the dispenser lever 211 between the walls 210b and 210c. Further, a lower portion of the withdrawal space 210a may be formed in parallel with the ground to allow a cup-shaped water receiver 250 to be stably positioned.

Additionally, a water receiver detector 420 capable of detecting the cup-shaped water receiver 250 may be provided at each of the walls 210b and 210c. The water receiver detector 420 may detect whether or not the cup-shaped water receiver 250 is placed in the withdrawal space 210a by irradiating one of the walls 210b and 210c with light to detect a returning time and a magnitude of the light reflected from the other of the walls 210b and 210c. Therefore, an ultrasonic sensor and an infrared sensor may be used as the water receiver detector 420. Besides the sensors described above, a variety of sensors capable of detecting whether or not the cup-shaped water receiver 250 is placed below the dispenser discharger 210 may be used as the water receiver detector 420.

Moreover, a water level detector 430 may be provided between the walls 210b and 210c to irradiate the cup-shaped water receiver 250 with light penetrating therethrough to detect whether or not a water level of water stored in the cup-shaped water receiver 250 is equal to or greater than a threshold level. An operation principle of the water level detector 430 may be identical to or different from that of the water receiver detector 420 described above.

Therefore, when the user positions the cup-shaped water receiver 250 in the withdrawal space 210a and places it on the lower surface thereof, the controller 700 may recognize that the cup-shaped water receiver 250 is placed below the dispenser discharger 210 to drain sterilizing water and rinsing water, and may stop the drainage to prevent overflow of water from the cup-shaped water receiver 250 when a water level inside the cup-shaped water receiver 250 is determined to be equal to or greater than a predetermined water level.

Here, the predetermined water level may be a value set or input at the time of manufacture, design, or use in consideration of a capacity of the cup-shaped water receiver 250 to be used by the user.

Figure 12:
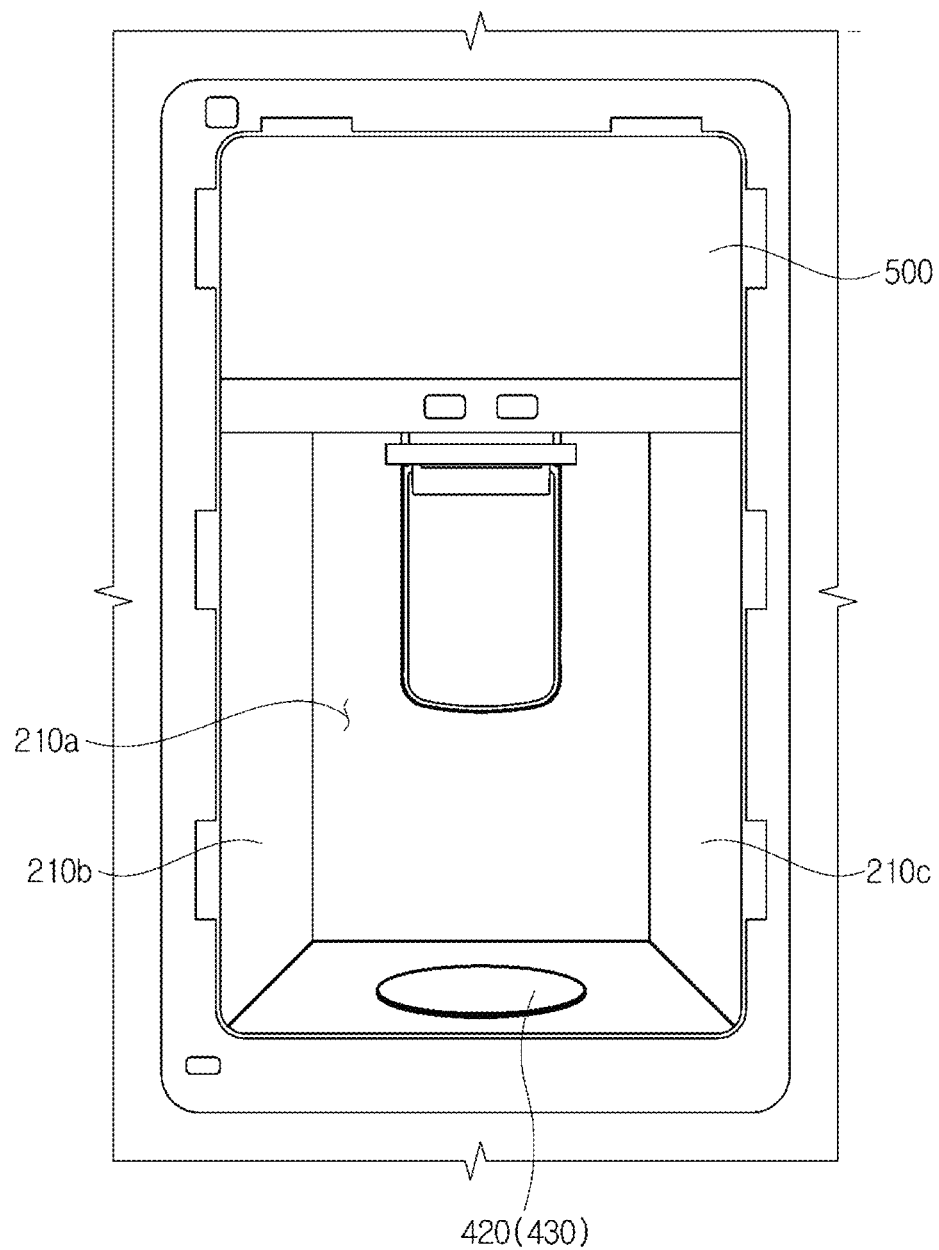
FIG. 12 is a view illustrating a dispenser module available for a cup according to a third embodiment of the present invention.

FIG. 12 shows a dispenser module available for a cup according to a third embodiment.

As shown in FIG. 12, a user interface 500 for receiving instructions from a user and providing messages with respect to a status of a refrigerator 1 and an operation performed therein may be provided above a dispenser.

The dispenser may be provided with a dispenser lever 211 disposed in an inner space provided inside the dispenser, and walls 210b and 210c disposed at both sides of the dispenser to support the inner space. Also, a withdrawal space 210a from which water can be withdrawn may be formed at a front surface of the dispenser lever 211 between the walls 210b and 210c. Further, a lower portion of the withdrawal space 210a may be formed in parallel with the ground to allow a cup-shaped water receiver 250 to be stably positioned.

Additionally, a water receiver detector 420 capable of detecting the cup-shaped water receiver 250 may be provided at a lower surface. By detecting a weight of an object placed atop the water receiver detector 420, the water receiver detector 420 may detect that the cup-shaped water receiver 250 has been placed in the withdrawal space 210a when the detected weight is equal to or greater than a first predetermined weight. Besides the configuration described above, a variety of sensors capable of detecting whether or not the cup-shaped water receiver 250 is placed below the dispenser discharger 210 may be used as the water receiver detector 420.

Moreover, a water level detector 430 may be provided at a lower surface to detect whether or not a water level of water stored in the cup-shaped water receiver 250 is equal to or greater than a threshold level. By detecting a weight of an object placed atop the water level detector 430, the water level detector 430 may detect that a water level inside the cup-shaped water receiver 250 has reached a level equal to or greater than the threshold level when the detected weight is equal to or greater than a second predetermined weight.

Therefore, when the user positions the cup-shaped water receiver 250 in the withdrawal space 210a and places it on the lower surface thereof, and then a weight detected by the water receiver detector 420 is equal to or greater than the first predetermined weight, a controller 700 may recognize that the cup-shaped water receiver 250 has been placed below the dispenser discharger 210 and sterilizing water and rinsing water may be drained into the cup-shaped water receiver 250, whereas the controller 700 may stop the drainage to prevent overflow of water from the cup-shaped water receiver 250 when an inner weight of the cup-shaped water receiver 250 is determined to be equal to or greater than the second predetermined weight.

Here, the first predetermined weight and the second predetermined weight may be values that are preset or input at the time of manufacture, design, or use in consideration of a weight and a capacity of the cup-shaped water receiver 250 to be used by the user, and a density of fluid to be drained.

Figure 13:
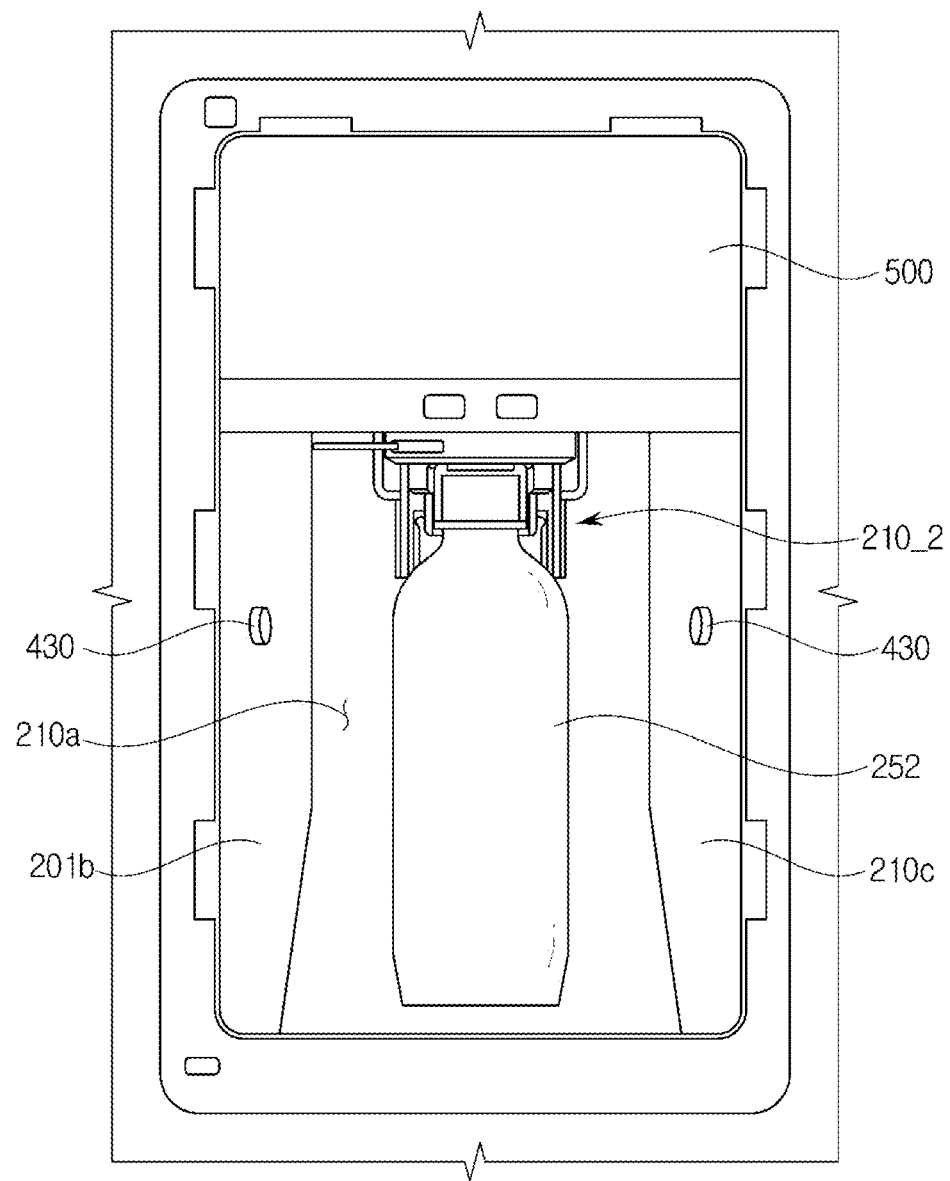
FIG. 13 is a view illustrating a dispenser available for a water bottle according to one embodiment of the present invention.

FIG. 13 shows a dispenser module available for a water bottle according to one embodiment.

As shown in FIG. 13, a user interface 500 for receiving instructions from a user and providing messages with respect to a status of a refrigerator 1 and an operation performed therein may be provided at an upper portion of a dispenser.

The dispenser may be provided with a dispenser lever 211 disposed in an inner space provided inside the dispenser, and walls 210b and 210c disposed at both sides of the dispenser to support the inner space. Also, a withdrawal space 210a from which water can be withdrawn may be formed at a front surface of the dispenser lever 211 between the walls 210b and 210c. Further, a lower portion of the withdrawal space 210a may be formed to be inclined forward to prevent water from collecting in the dispenser.

A coupling member 227 may be provided in the vicinity of a dispenser discharger 210 to attachably and detachably couple the dispenser discharger 210 to a water receiver 252. Additionally, a seating member 221 on which the water receiver 252 is seated may be provided below the coupling member 227.

A water receiver seating space 221a on which an inlet of the water receiver 252 is seated may be formed inside the seating member 221. The user may insert the water receiver 252 to seat the water receiver 252 on the water receiver seating space 221a.

Moreover, a water receiver stop protrusion 221b for fixing the water receiver 252 to the seating member 221 is formed at a lower portion of the seating member 221. The water receiver stop protrusion 221b prevents the water receiver 252 from being separated from the water receiver seating space 221a when the water receiver 252 is inserted into the water receiver seating space 221a.

Furthermore, a water level detector 430 may be provided at each of the walls 210b and 210c to detect whether or not a water level of water stored in the water receiver 252 is equal to or greater than a threshold level by irradiating the water receiver 252 with light penetrating therethrough. The water level detector 430 may detect the water level of water stored in the water receiver 252 by irradiating one of the walls 210b and 210c with light and then detecting a returning time and a magnitude of the light reflected from the other of the walls 210b and 210c. Therefore, an ultrasonic sensor and an infrared sensor may be used as the water level detector 430. Besides the sensors described above, a variety of sensors capable of detecting a water level of water stored in the water receiver 252 may be used as the water level detector 430.

Consequently, when the user positions the bottle-shaped water receiver 252 in the withdrawal space 210a to couple the bottle-shaped water receiver 252 to the coupling member 227 and the seating member 221, a controller 700 may recognize that the water receiver 252 has been placed below the dispenser discharger 210 to drain sterilizing water and rinsing water into the water receiver 252, whereas the controller 700 may stop the drainage of the sterilizing water and the rinsing water to prevent overflow of the water from the water receiver 252 when a water level inside the water receiver 252 is determined to be equal to or greater than a predetermined water level.

Here, the predetermined water level may be a value preset or input at the time of manufacture, design, or use in consideration of a capacity of the water receiver 252 to be used by the user.

Also, the water level detector 430 may detect a level of water stored in the water receiver 252 by irradiating light when the water receiver 252 is made of a transparent material, or by measuring a weight when the water receiver 252 is made of an opaque material.

Figure 14:
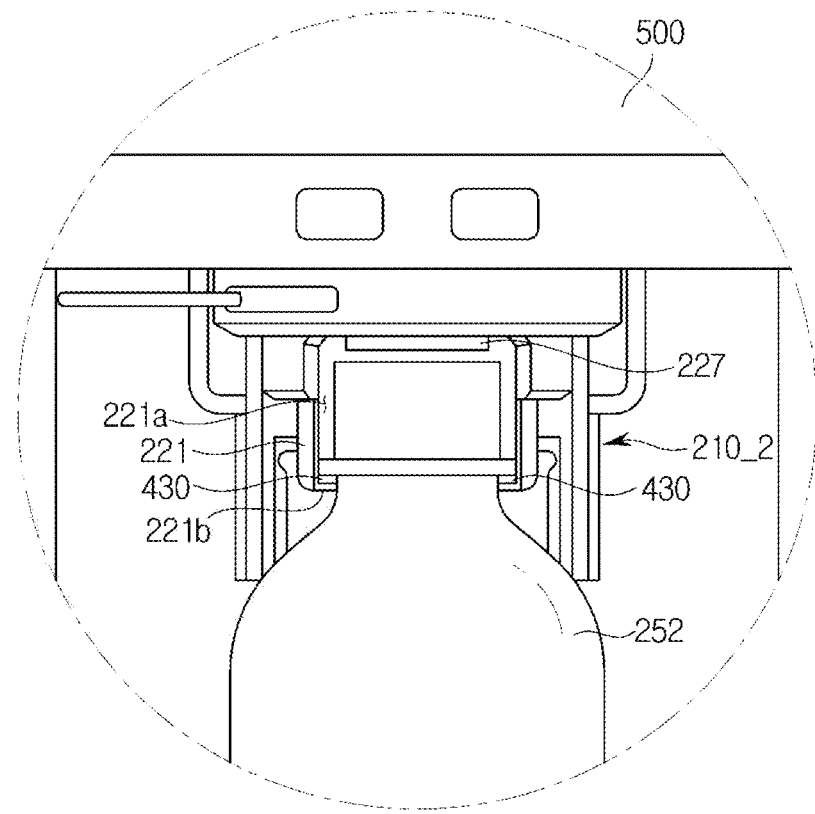
FIG. 14 is an enlarged view of a dispenser module according to one embodiment of the present invention.

FIG. 14 is an enlarged view of the dispenser module.

The water level detector 430 may include an elastic member that is deformed in proportion to an external force, and a strain gauge whose electrical resistance is varied according to a deformation of the elastic member. The water level detector 430 detects a magnitude of the external force or a weight of an object by measuring a value of electrical resistance of the strain gauge, and outputs an electrical signal corresponding to the detected external force or the detected weight.

Such a water level detector 430 may be installed at the water receiver stop protrusion 221b of the seating member 221 included in a water receiver coupler.

The water receiver stop protrusion 221b of the seating member 221 supports the water receiver 252 to prevent it from separating from the seating member 221, such that an upper surface of the water receiver stop protrusion 221b is subject to an external force equivalent to a weight of the water receiver 252. Therefore, when installed at the upper surface of the water receiver stop protrusion 221b, the water level detector 430 may detect a weight of the water receiver 252.

More water stored in the water receiver 252 increases the weight of the water receiver 252.

Also, the weight of the water receiver 252 may be set to a predetermined weight corresponding to a threshold level of water stored in the water receiver 252.

In this case, the refrigerator 1 may determine that a level of water stored in the water receiver 252 reaches a maximum water level when the weight of the water receiver 252 is equal to or greater than the predetermined weight, whereas the refrigerator 1 may determine that the level of water stored in the water receiver 252 does not reach the maximum water level when the weight of the water receiver 252 is less than the predetermined weight.

Figure 15:
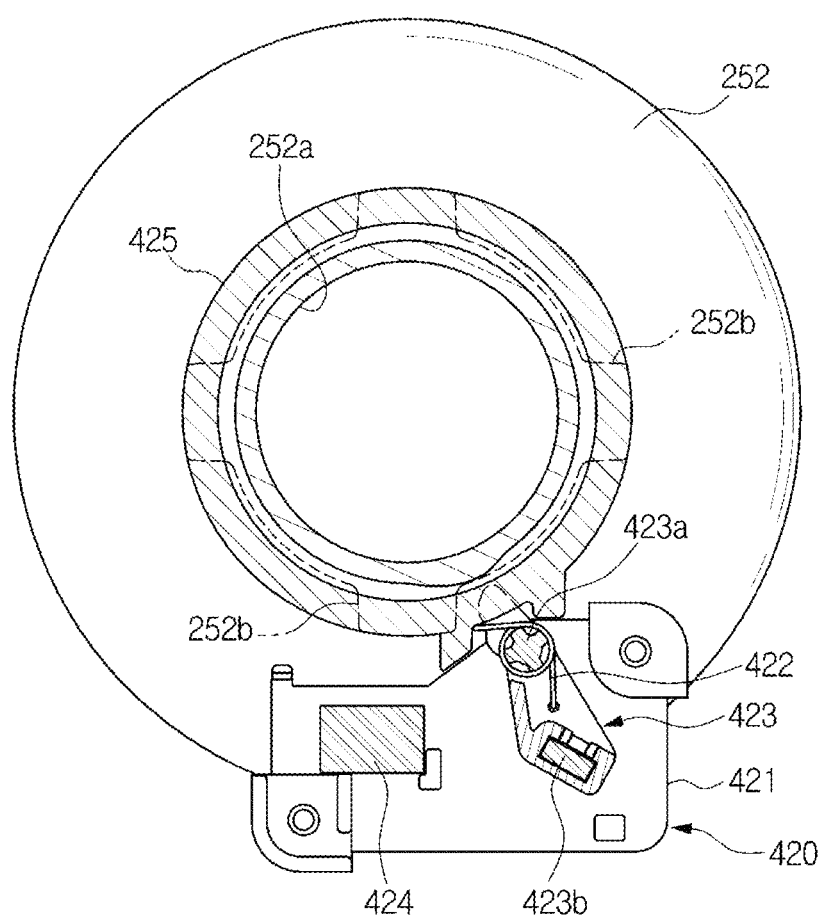
FIG. 15 is a cross-sectional view of a water bottle and a water receiver detector according to one embodiment of the present invention.

FIG. 15 is a cross-sectional view of a water bottle and a water receiver detector according to one embodiment.

A dispenser may include an installation body 425 at which a water receiver 252 is installed, and a water receiver detector 420.

The water receiver 252 is provided to be installed at the installation body 425 and is configured to be attachable thereto and detachable therefrom. A withdrawal space 210a exposed to the outside of a main body 2 of a refrigerator 1 may be provided, and the installation body 425 may be configured to be exposed through the withdrawal space 210a. With such a configuration, the water receiver 252 is provided to be installable at the installation body 425 exposed through the withdrawal space 210a.

An operation in which the water receiver 252 is installed at the installation body 425 and an operation in which a water receiver detector 420 detects the installation operation of the water receiver 252 may be configured to be concurrently performed. Drainage stability may be improved by controlling water drainage through the water receiver detector 420 to be performed only when the water receiver 252 is installed at the installation body 425.

The water receiver 252 may include a water receiver 252 provided to store water therein, and an opening 252a provided at one side of the water receiver 252 to allow a fluid to flow thereinto and therefrom.

The water receiver 252 may include a seating protrusion 252b formed as a protruding portion of the water receiver 252. The seating protrusion 252b may be configured to be adjacent to the opening 252a. When the water receiver 252 is installed at the installation body 425, the opening 252a is inserted into the installation body 425 to be seated at the seating protrusion 252b. The seating protrusion 252b is formed to radially protrude from on the opening 252a. At least the one seating protrusion 252b may be provided, and, for example, four such seating protrusions 252b may be provided to be spaced apart from each other at regular intervals.

The opening 252a of the water receiver 252 is formed approximately in a circular shape such that the installation body 425 may be formed in a cylindrical shape to correspond to the opening 252a. However, shapes of the opening 252a of the water receiver 252 and the installation body 425 are not limited thereto, and it may be sufficient for the installation body 425 to be provided to have a shape corresponding to a shape of the opening 252a of the water receiver 252.

After being separated from the installation body 425, the water receiver 252 may be easily carried.

The water receiver detector 420 is provided to detect installation of the water receiver 252 at the installation body 425. In particular, the water receiver detector 420 is provided to detect that the seating protrusion 252b moves to a seating portion along a guide rail of the installation body 425.

The water receiver detector 420 may include a sensing lever 423 and a sensor 424.

The sensing lever 423 may be provided to be rotatable. In particular, the sensing lever 423 may be provided to be rotatable about a sensing lever center shaft 423a, and one side of the sensing lever 423 may be configured to rotate by being pressed by the seating protrusion 252b. The sensing lever 423 is provided to move between a non-installation position corresponding to a position at which the seating protrusion 252b is placed on the guide rail and an installation position corresponding to a position at which the seating protrusion 252b moves on the guide rail to be placed at the seating position.

The water receiver detector 420 may include a return elastic member 422. The return elastic member 422 is provided to enable the sensing lever 423 to return from the installation position to the non-installation position when the water receiver is separated from the installation body 425.

The sensor 424 is provided to detect rotation of the sensing lever 423. The sensor 424 is provided to correspond to an opposite end of the sensing lever 423 to detect the rotation of the sensing lever 423.

A magnetic component 423b may be provided at the opposite end of the sensing lever 423, and the sensor 424 may include a reed switch which is provided to detect the magnetic component 423b of the sensing lever 423. Alternatively, the sensor 424 may include, for example, a micro switch which is provided to turn on and off by being pressed by the opposite end of the sensing lever 423.

The water receiver detector 420 may include a sensor housing 421. The sensor housing 421 may be provided to prevent the sensing lever 423 and the sensor 424 from exposure to the outside. Additionally, the sensor housing 421 is provided to prevent the sensing lever 423 and the sensor from malfunctioning due to the purified water.

When the water receiver 252 is installed at the installation body 425, the opening 252a of the water receiver 252 may be sealed by the dispenser. In this case, the opening 252a of the water receiver 252 may be sealed by the dispenser, or by a separate configuration.

As an example, the dispenser may include a packing component to seal the opening 252a of the water receiver 252. The packing component may be arranged inside the installation body 425 to correspond to the opening 252a of the water receiver 252. When the water receiver 252 is installed at the installation body 425, the packing component may seal the opening 252a to prevent water from leaking therethrough.

Figure 16A:
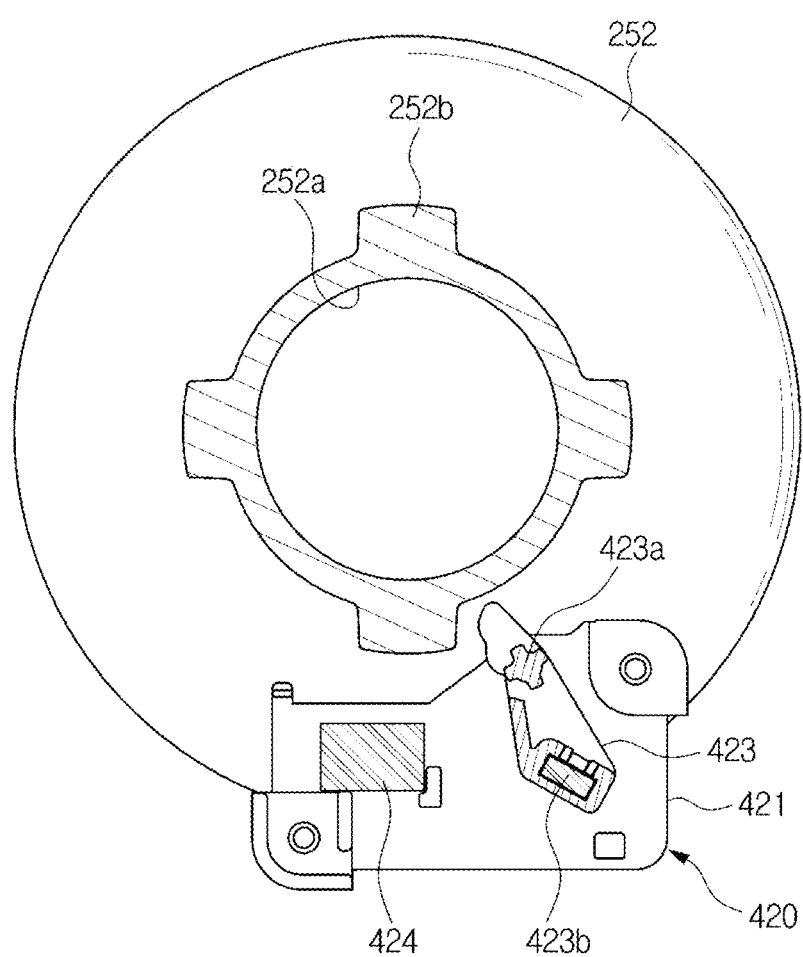
FIGS. 16A to 16C are views illustrating a concept of detecting a water bottle at a water receiver detector according to one embodiment of the present invention.
Figure 16B:
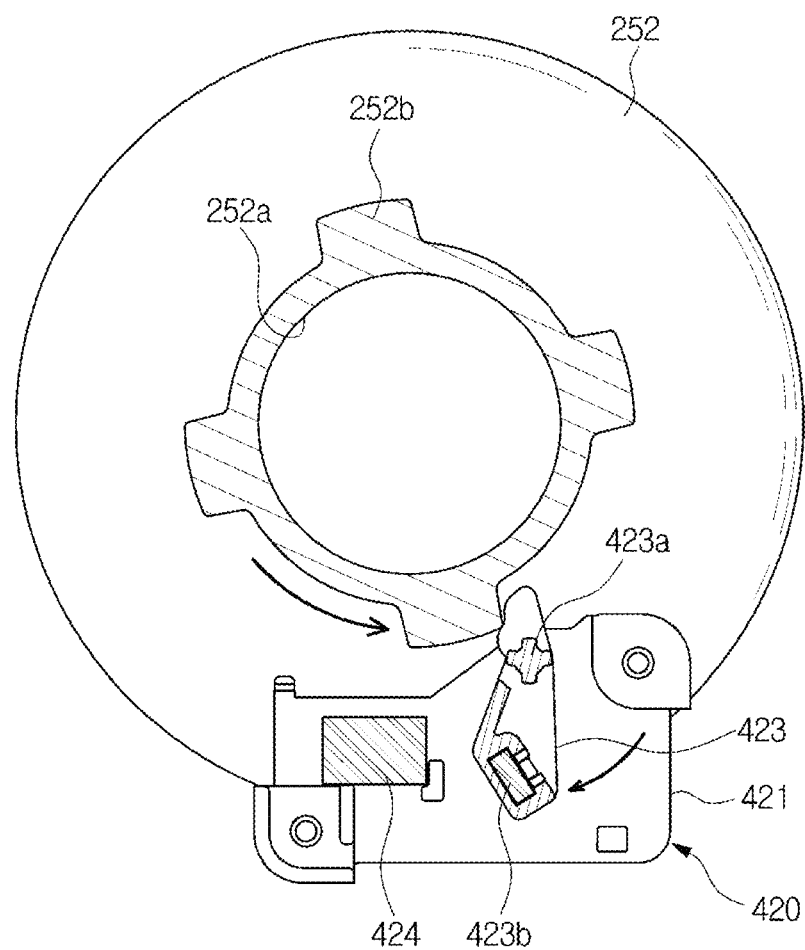
Figure 16C:
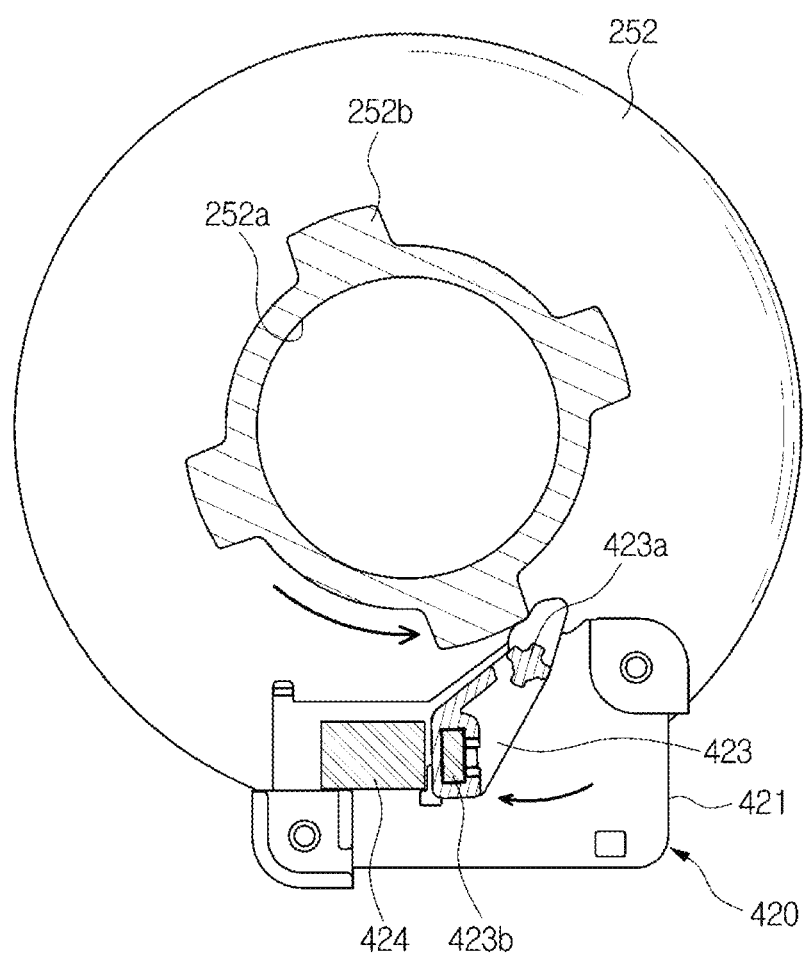

FIGS. 16A to 16C show a concept of detecting a water bottle by a water receiver according to one embodiment.

A water receiver 252 is installed at an installation body 425 exposed through a withdrawal space 210a.

A seating protrusion 252b of the water receiver 252 is inserted into a guide rail along an insertion recessed groove.

In order to position the seating protrusion 252b on the guide rail, the water receiver 252 is inserted into the installation body 425 and then is rotated in an installation direction. In this case, the seating protrusion 252b moves along the guide rail in the installation direction and is positioned at the seating portion to install the water receiver 252 at the installation body 425.

Coincidentally, a sensing lever 423 of an installation sensor 277 may be pressed by the seating protrusion 252b at a non-installation position shown in FIGS. 16A and 16B to move to an installation position shown in FIG. 16C, thereby detecting installation of the water receiver 252 at a dispenser. Also, the opening 252a of the water receiver 252 is provided to be sealed.

When the water receiver 252 is misinstalled at the installation body 425, the seating protrusion 252b is not inserted into the guide rail. If the seating protrusion 252b is not seated on the seating portion, the installation sensor 277 remains in a non-installation position such that drainage is not performed at the water receiver 252.

Coincidentally, drainage stability may be improved by preventing drainage from being performed when the water receiver 252 is misinstalled or not installed.

An operation of separating the water receiver 252 from the dispenser after completing the drainage at the water receiver 252 will be described.

To move the seating protrusion 252b of the water receiver 252 from the seating portion along the guide rail, the water receiver 252 is rotated in a separation direction. Thereafter, to allow the seating protrusion 252b to pass the insertion recessed groove from the guide rail and come off of the installation body 425, the water receiver 252 and the dispenser are separated from each other.

Coincidentally, the sensing lever 423 of the installation sensor 227, which has been pressed by the seating protrusion 252b at the installation position, is released to move to a non-installation position.

Figure 17:
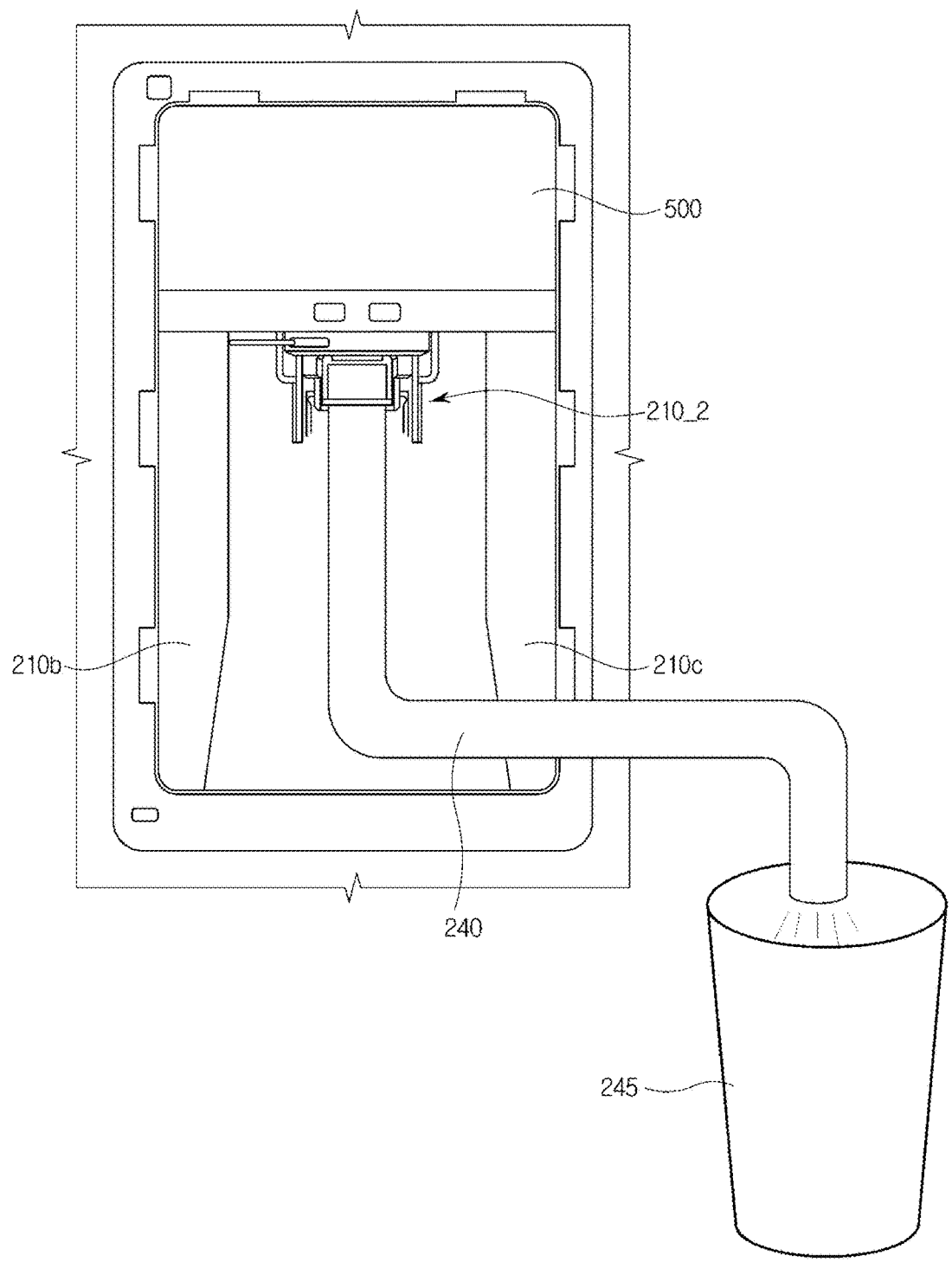
FIG. 17 is a view illustrating the dispenser module using a hose and a bucket according to one embodiment of the present invention.

FIG. 17 shows a dispenser module using a hose and a water chamber according to one embodiment.

As shown in FIG. 17, a user interface 500 for receiving instructions from a user and providing messages with respect to a status of a refrigerator 1 and an operation performed therein may be provided above a dispenser.

The dispenser may be provided with a dispenser lever 211 disposed at an inner space provided inside the dispenser, and walls 210b and 210c disposed at both sides of the dispenser to support the inner space. Also, a withdrawal space 210a from which water can be withdrawn may be formed at a front surface of the dispenser lever 211 between the walls 210b and 210c. Further, a lower portion of the withdrawal space 210a may be formed to be inclined forward to prevent water from collecting in the dispenser.

A coupling member 227 may be provided in the vicinity of a dispenser discharger 210 to attachably and detachably couple the dispenser discharger 210 to water receivers 240 and 245. Also, a seating member 221 on which the hose 240 is seated may be provided below the coupling member 227. Here, the water receivers 240 and 245 may include the hose 240 and the water chamber 245, and water drained from the dispenser discharger 210 may be stored in the water chamber 245 through the hose 240. Therefore, using a large capacity of the vessel 245 may reduce any inconvenience due to limited capacities of the water receivers 240 and 245 of the user emptying the water receivers 240 and 245 while cleaning the dispenser.

A water receiver space 221a on which inlets of the water receivers 240 and 245 are seated is formed inside the seating member 221. The user may insert the water receivers 240 and 245 to seat the water receivers 240 and 245 on the water receiver space 221a.

Additionally, a water receiver stop protrusion 221b for fixing the water receivers 240 and 245 to the seating member 221 is formed at the bottom of the seating member 221. The water receiver stop protrusion 221b serves to prevent the water receivers 240 and 245 from being separated from the water receiver space 221a when the water receivers 240 and 245 are inserted into the water receiver space 221a.

Consequently, when the user positions the water receivers 240 and 245 including the hose 240 and the water chamber 245 in the withdrawal space 210a to couple to the coupling member 227 and the seating member 221, a controller 700 may recognize that the water receivers 240 and 245 have been placed below the dispenser discharger 210 and the sterilizing water and the rinsing water may be drained into the water receivers 240 and 245.

Figure 18:
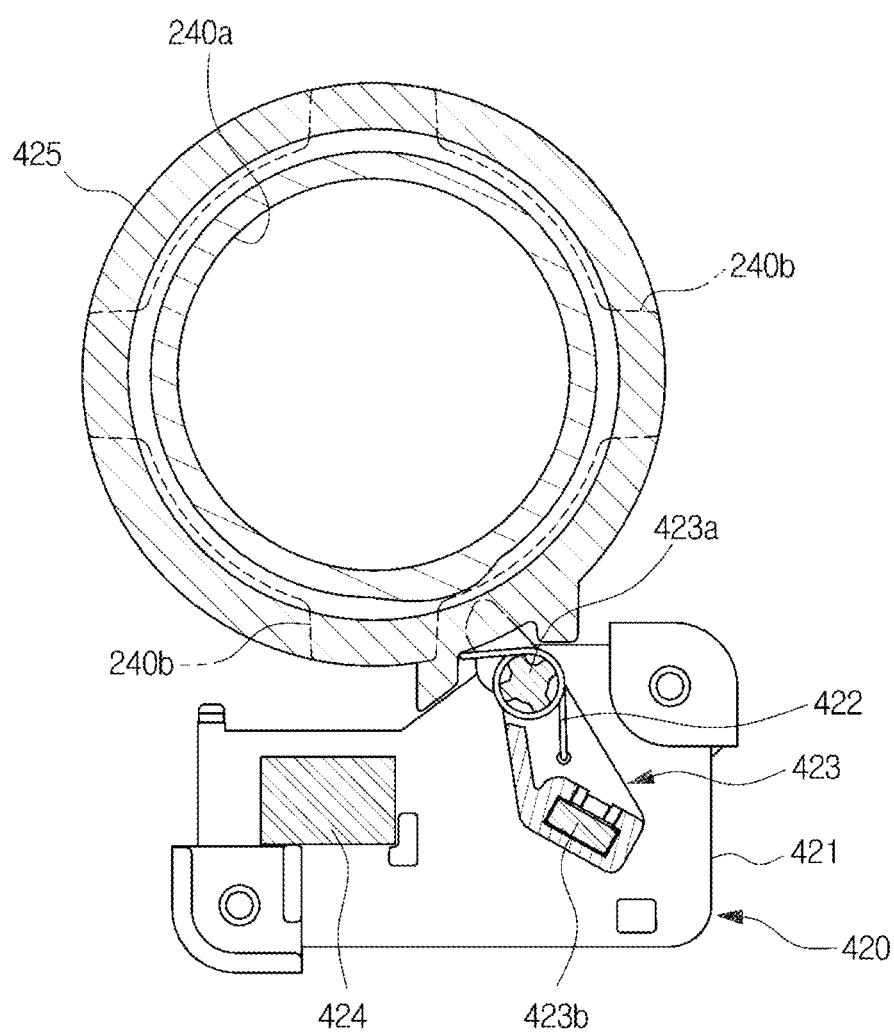
FIG. 18 is a cross-sectional view of a hose and a water receiver detector according to one embodiment of the present invention.

FIG. 18 is a cross-sectional view of a hose and a water receiver detector according to one embodiment.

A dispenser may include an installation body 425 at which water receivers 240 and 245 are installed, and a water receiver detector 420.

The water receivers 240 and 245 may be provided to be installed at the installation body 425, and may be configured to be attachable and detachable to and from the installation body 425. A withdrawal space 210a may be provided to be exposed to the outside of a main body 2 of a refrigerator, and the installation body 425 may be configured to be expose through the withdrawal space 210a. With such a configuration, the water receivers 240 and 245 may be provided to be installable at the installation body 425 exposed through the withdrawal space 210a.

An operation in which the water receivers 240 and 245 are installed at the installation body 425 and an operation in which the water receiver detector 420 detects the installation operation of the water receivers 240 and 245 may be configured to be concurrently performed. Drainage stability may be improved by controlling water drainage through the water receiver detector 420 to be performed only when the water receivers 240 and 245 are installed at the installation body 425.

The water receivers 240 and 245 may include the water receivers 240 and 245 provided to store water therein, and an opening 240a provided at one side of each of the water receivers 240 and 245 to allow a fluid to flow thereinto and therefrom.

The water receivers 240 and 245 may include a seating protrusion 240b formed as a protruding portion of each of the water receivers 240 and 245. The seating protrusions 240b may be configured to be adjacent to the openings 240a.

When the water receivers 240 and 245 are installed at the installation body 425, the openings 240a are inserted into the installation body 425 to be seated on the seating protrusions 240b. The seating protrusions 240b are formed to radially protrude from the openings 240a. At least one each of the seating protrusions 240b may be provided, and, for example, four each of such seating protrusions 240b may be provided to be spaced apart from each other at regular intervals.

The openings 240a of the water receivers 240 and 245 are formed approximately in circular shapes, such that the installation body 425 may be formed in a cylindrical shape to correspond to the openings 240a. However, shapes of the openings 240a of the water receivers 240 and 245 and the installation body 425 are not limited thereto, and it may be sufficient for the installation body 425 to be provided to have a shape corresponding to shapes of the openings 240a of the water receivers 240 and 245.

The water receiver detector 420 is provided to detect installation of the water receivers 240 and 245 at the installation body 425. In particular, the water receiver detector 420 is provided to detect that the seating protrusions 240b move to a seating portion along the guide rail of the installation body 425.

The water receiver detector 420 may include a sensing lever 423 and a sensor 424.

The sensing lever 423 may be provided to be rotatable. In particular, the sensing lever 423 may be provided to be rotatable about a sensing lever center shaft 423a, and one side of the sensing lever 423 may be configured to rotate by being pressed by the seating protrusions 240b. The sensing lever 423 is provided to move between a non-installation position corresponding to a position at which the seating protrusions 240b are placed on the guide rail and an installation position corresponding to a position at which the seating protrusions 240b move on the guide rail to be placed at the seating position.

The water receiver detector 420 may include a return elastic member 422. The return elastic member 422 is provided to enable the sensing lever 423 to return from the installation position to the non-installation position when the water receivers 240 and 245 are separated from the installation body 425.

The sensor 424 is provided to detect rotation of the sensing lever 423. The sensor 424 is provided to correspond to an opposite end of the sensing lever 423 to detect the rotation of the sensing lever 423.

A magnetic component 423b may be provided at the opposite end of the sensing lever 423, and the sensor 424 may include a reed switch which is provided to detect the magnetic component 423b of the sensing lever 423. Alternatively, the sensor 424 may include, for example, a micro switch which is provided to turn on and off by being pressed by the opposite end of the sensing lever 423.

The water receiver detector 420 may include a sensor housing 421. The sensor housing 421 may be provided to prevent the sensing lever 423 and the sensor 424 from exposure to the outside. Additionally, the sensor housing 421 is provided to prevent the sensing lever 423 and the sensor from malfunctioning due to the purified water.

When the water receivers 240 and 245 are installed at the installation body 425, the openings 240a of the water receivers 240 and 245 may be sealed by the dispenser. In this case, the openings 240a of the water receivers 240 and 245 may be sealed by the dispenser, or by a separate configuration.

As an example, the dispenser may include a packing component to seal the openings 240a of the water receivers 240 and 245. The packing component may be arranged inside the installation body 425 to correspond to the openings 240a of the water receivers 240 and 245. When the water receivers 240 and 245 are installed at the installation body 425, the packing component may seal the openings 240a to prevent water from leaking therethrough.

Figure 19A:
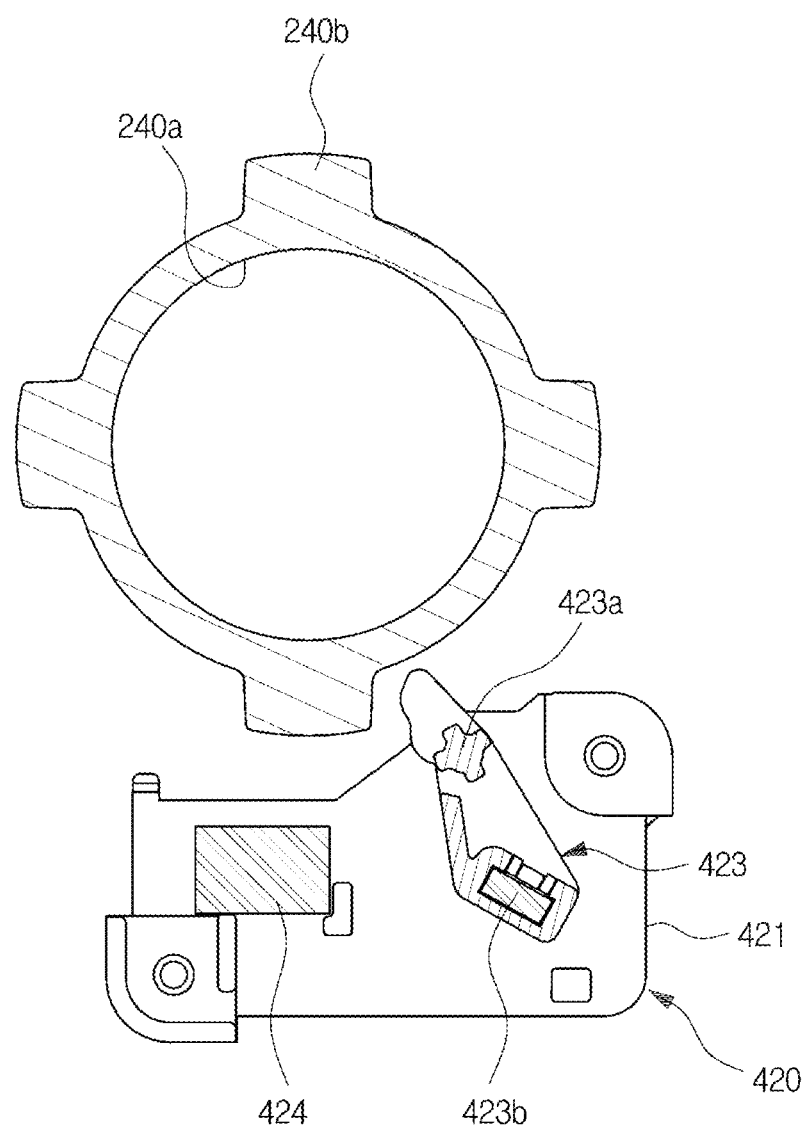
FIGS. 19A to 19C are views illustrating a concept of detecting a hose at the water receiver detector according to one embodiment of the present invention.
Figure 19B:
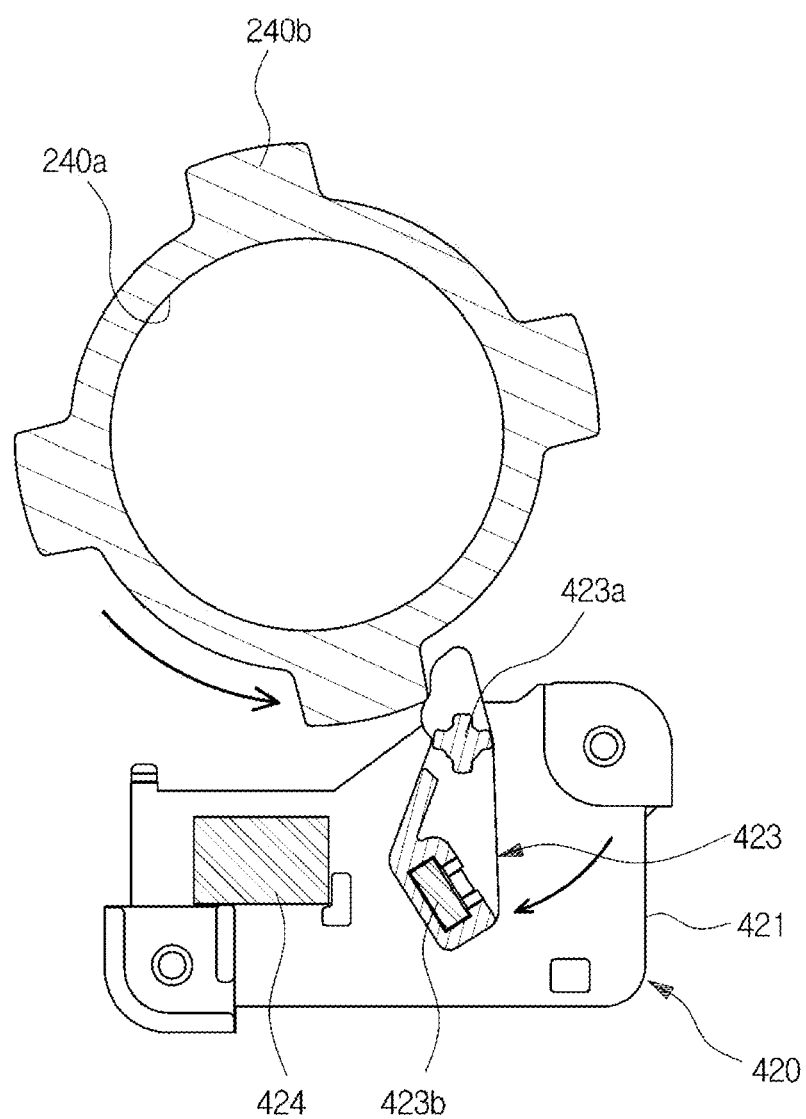
Figure 19C:
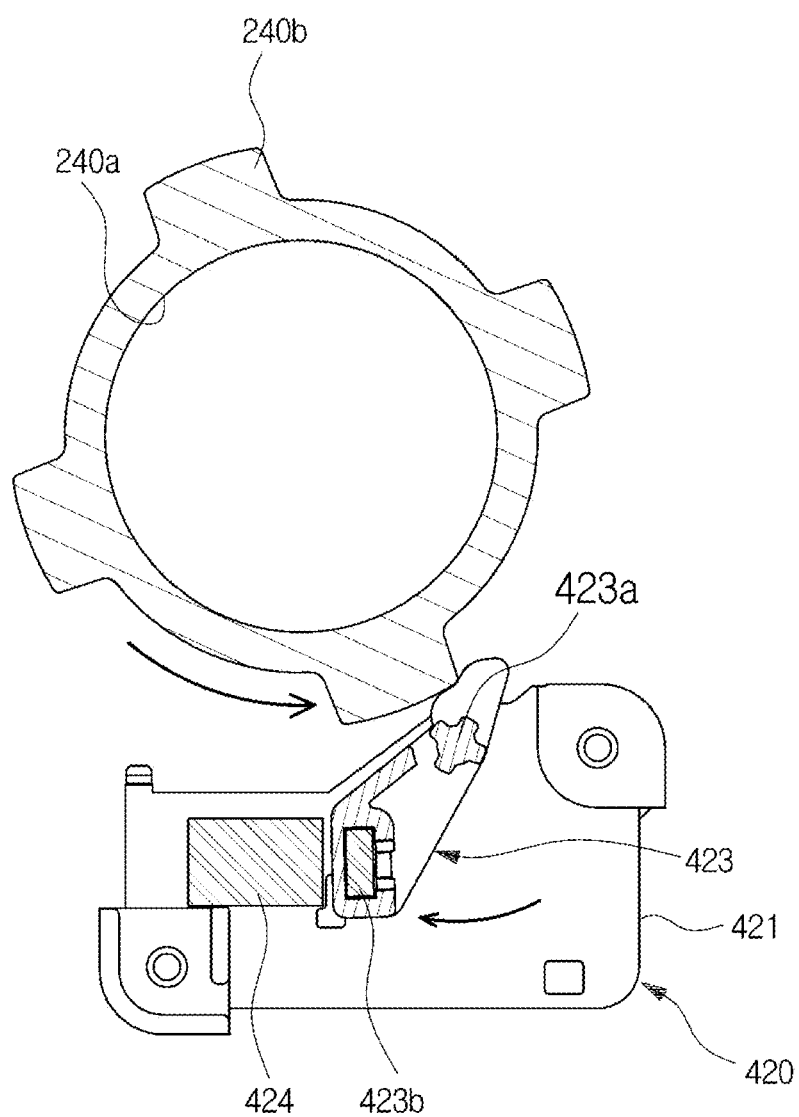

FIGS. 19A to 19C show a concept of a water receiver detector detecting a hose 240 according to one embodiment.

Water receivers 240 and 245 are installed at an installation body 425 exposed through a withdrawal space 210a.

Seating protrusions 240b of the water receivers 240 and 245 are inserted into a guide rail along an insertion recessed groove.

In order to position the seating protrusions 240b on the guide rail, the water receivers 240 and 245 are inserted into the installation body 425 and then rotated in an installation direction. In this case, the seating protrusions 240b move along the guide rail in the installation direction and are positioned at the seating portion to install the water receivers 240 and 245 at the installation body 425.

Coincidentally, a sensing lever 423 of an installation sensor 277 may be pressed by a seating protrusion 252b at a non-installation position shown in FIGS. 19A and 19B to move to an installation position shown in FIG. 19C, thereby detecting installation of the water receivers 240 and 245 at the dispenser. Also, openings 240a of the water receiver 252 are provided to be sealed.

When the water receivers 240 and 245 are misinstalled at the installation body 425, the seating protrusions 240b are not inserted into the guide rail. If the seating protrusions 240b are not seated on the seating portion, the installation sensor 277 remains at a non-installation position such that drainage is not performed at the water receivers 240 and 245.

Coincidentally, drainage stability may be improved by preventing drainage from being performed when the water receivers 240 and 245 are misinstalled or not installed.

An operation of separating the water receivers 240 and 245 from the dispenser after completing the drainage at the water receivers 240 and 245 will be described.

To move the seating protrusions 240b of the water receivers 240 and 245 from the seating portion along the guide rail, the water receivers 240 and 245 are rotated in a separation direction. Thereafter, to allow the seating protrusions 240b to pass the insertion recessed groove from the guide rail and come off of the installation body 425, the water receivers 240 and 245 and the dispenser are separated from each other.

Coincidentally, the sensing lever 423 of the installation sensor 227, which has been pressed by the seating protrusion 240b at the installation position, is released to move to a non-installation position.

Hereinafter, with reference to FIGS. 20 to 32B, embodiments of dispensers and purified water supply, ice making, sterilization, rinse, and sparkling water supply by a fluid flow in passages of the dispenser will be described.

Figure 20:
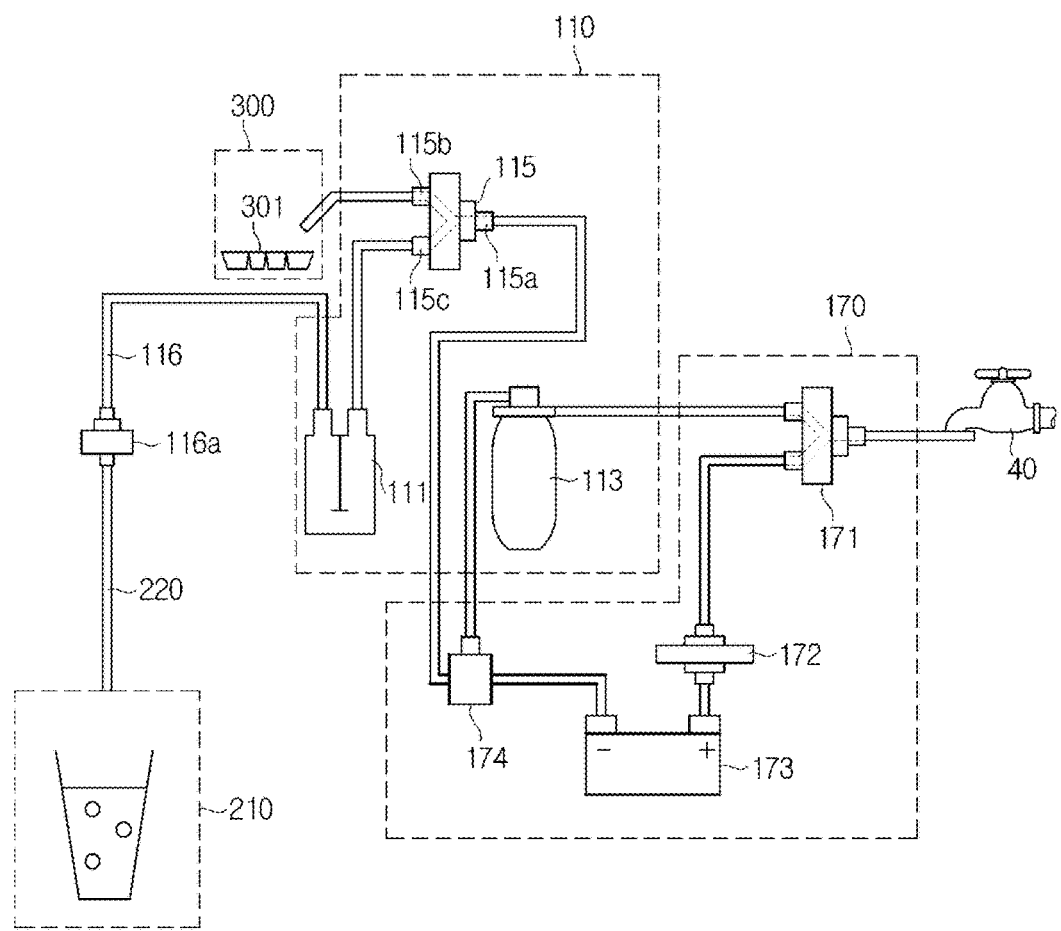
FIG. 20 is a view illustrating a passage of a dispenser according to a first embodiment of the present invention.

FIG. 20 shows a passage of the dispenser according to a first embodiment.

A refrigerator 1 may include a dispenser discharger 210, a purified water supplier 110, a sterilizing water supplier 170, a sparkling water supplier 140, and an ice-making machine 300.

The dispenser discharger 210 is configured to receive inputs from the user for a purifying operation, an ice-making operation, a sparkling water manufacturing operation, and the like and transmit them to a controller 700, and may be identical to or different from the dispenser discharger 210 described with reference to FIGS. 7 and 8.

The purified water supplier 110 may include a water chamber 111 for storing purified water, a water purification filter 113 for purifying water supplied from a water source 40, and a first passage change-over valve 115 for distributing the purified water to the ice-making machine 300 or the water chamber 111.

The purified water supplier 110 supplies the purified water to be discharged through the dispenser discharger 210 or to be used for manufacturing the sparkling water.

As shown in FIG. 20, the purified water supplier 110 may include the water chamber 111 for storing the purified water, the water purification filter 113 for purifying water supplied from the water source 40, the first passage change-over valve 115 for distributing the purified water to the ice-making machine 300 or the water chamber 111, and the ice-making machine 300.

As described above, the water chamber 111 may be provided at a second purified water housing 112 located at the rear surface of a left storage box 9, and the water purification filter 113 may be provided at a first purified water housing 114 located at a center between two storage boxes 9.

The first passage change-over valve 115 may be implemented by a 3-way valve including an inlet 115a connected to the water purification filter 113, a first outlet 115b connected to the ice-making machine 300, and a second outlet 115c connected to the water chamber 111.

The first passage change-over valve 115 may supply the purified water provided from the water purification filter 113 to one of the water chamber 111 and the ice-making machine 300.

In particular, to supply the purified water to the water chamber 111 when an ice-making operation is not required, the first passage change-over valve 115 opens a passage connected to the water chamber 111 and closes a passage connected to the ice-making machine 300.

Otherwise, to supply the purified water to the ice-making machine 300 when an ice-making operation is required, the first passage change-over valve 115 closes the passage connected to the water chamber 111 and opens the passage connected to the ice-making machine 300.

Also, the purified water supplier 110 shown in FIG. 20 is merely one example of a purified water supplier applicable to the refrigerator 1 according to one embodiment, and it is not limited thereto.

The sterilizing water supplier 170 may include a second passage change-over valve 171, a sterilizing water generation-side inlet valve 172, a sterilizing water generator 173, and a third passage change-over valve 174.

The second passage change-over valve 171 may be implemented by a 3-way valve which is connected to the external water source 40, the water purification filter 113, and the sterilizing water generation-side inlet valve 172, and is capable of directing a flow of water supplied from the external water source 40 to the water purification filter 113 or to the sterilizing water generation-side inlet valve 172.

The sterilizing water generation-side inlet valve 172 is a valve for controlling whether or not water supplied from the external water source 40 to the sterilizing water supplier 170 is provided to the sterilizing water generator 173, and may be implemented by a check valve.

The sterilizing water generator 173 may generate sterilizing water containing HClO by performing electrolysis on water supplied when the sterilizing water generation-side inlet valve 172 is opened. Alternatively, according to another embodiment, the sterilizing water generator 173 may be provided with a permeable membrane to convert the water supplied from the external water source 40 into ionic water.

The third passage change-over valve 174 may be implemented by a 3-way valve which is connected to the sterilizing water generator 173, the water purification filter 113, and the first passage change-over valve 115 and is capable of controlling provision of the purified water generated in the water purification filter 113 and the sterilizing water or the ionic water generated in the sterilizing water generator 173 to the first passage change-over valve 115.

Also, the dispenser may be provided with a purified water discharge passage 116 to drain the purified water, the sterilizing water, the ionic water, and the rinsing water into the dispenser discharger 210 through a common discharge passage 220.

Hereinafter, with reference to FIGS. 21A to 21E, concepts of supplying fluid to the purified water supplier, the sterilizing water supplier, and the ice-making machine, which are described with reference to FIG. 20, will be described.

Figure 21A:
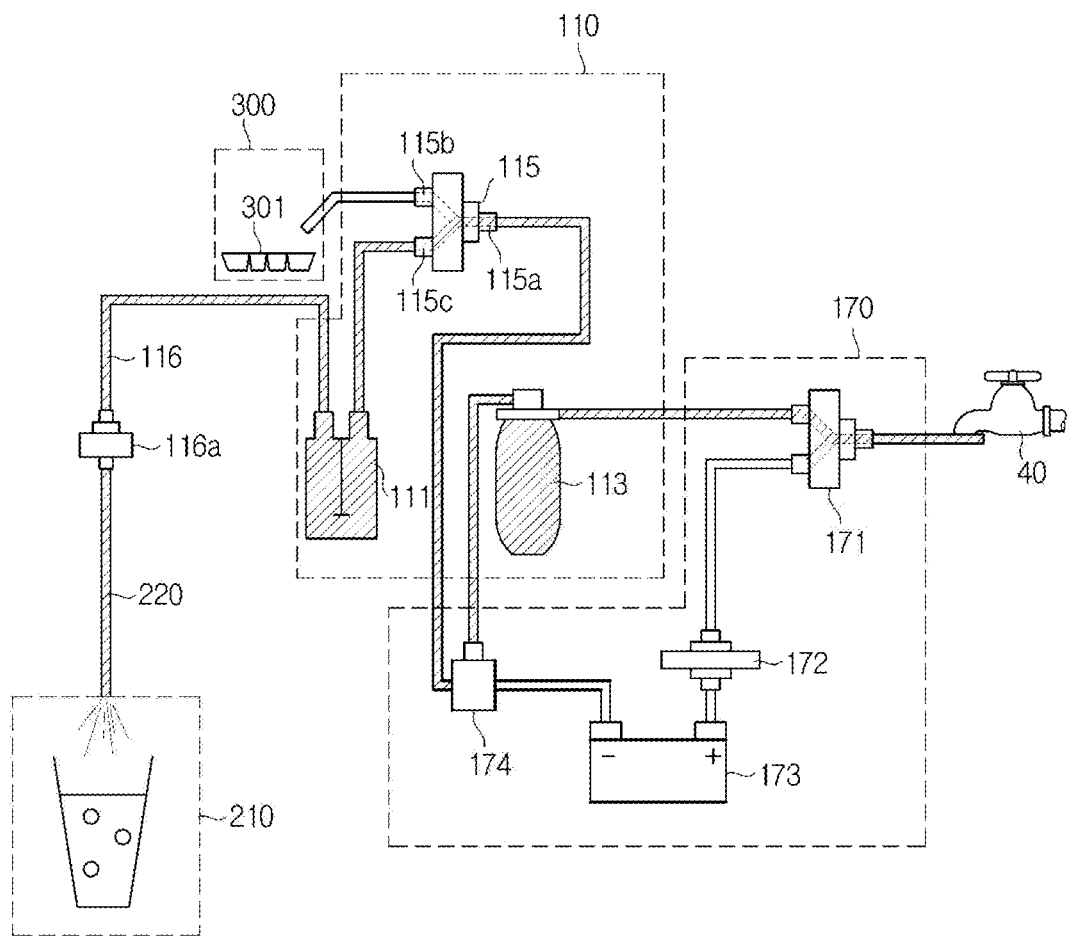
FIG. 21A is a view illustrating a concept of supplying purified water according to the first embodiment of the present invention.

FIG. 21A shows a concept of supplying the purified water according to the first embodiment.

When the dispenser discharger 210 receives an instruction for a purification operation from the user, the controller 700 may control the refrigerator 1 to discharge the purified water through the common discharge passage 220.

In particular, water supplied from the water source 40 may be purified by eliminating pollutants through the water purification filter 113 to create purified water and then the purified water may flow into the first passage change-over valve 115.

The first passage change-over valve 115 may close the first outlet 115b to block a flow of the purified water into the ice-making machine 300 and open the second outlet 115c to allow the purified water to flow into the water chamber 111 based on a determined operation in the controller 700.

Also, a temperature of the purified water flowing into the water chamber 111 may be adjusted according to a target temperature input by the user through a user interface 500.

The purified water having a temperature adjusted to the target temperature in the water chamber 111 may be discharged to one side of the water chamber 111 connected to the second outlet 115c and the other side. At this point, the controller 700 may control a purified water discharge valve 116a to open so that the purified water departing from the water chamber 111 flows into the common discharge passage 220.

In addition, the controller 700 may control the purified water discharge valve 116a to open and close so that the purified water departing from the water chamber 111 flows into a vessel placed below the dispenser discharger 210 through the common discharge passage 220.

Thus, the user may obtain the purified water at the target temperature.

Figure 21B:
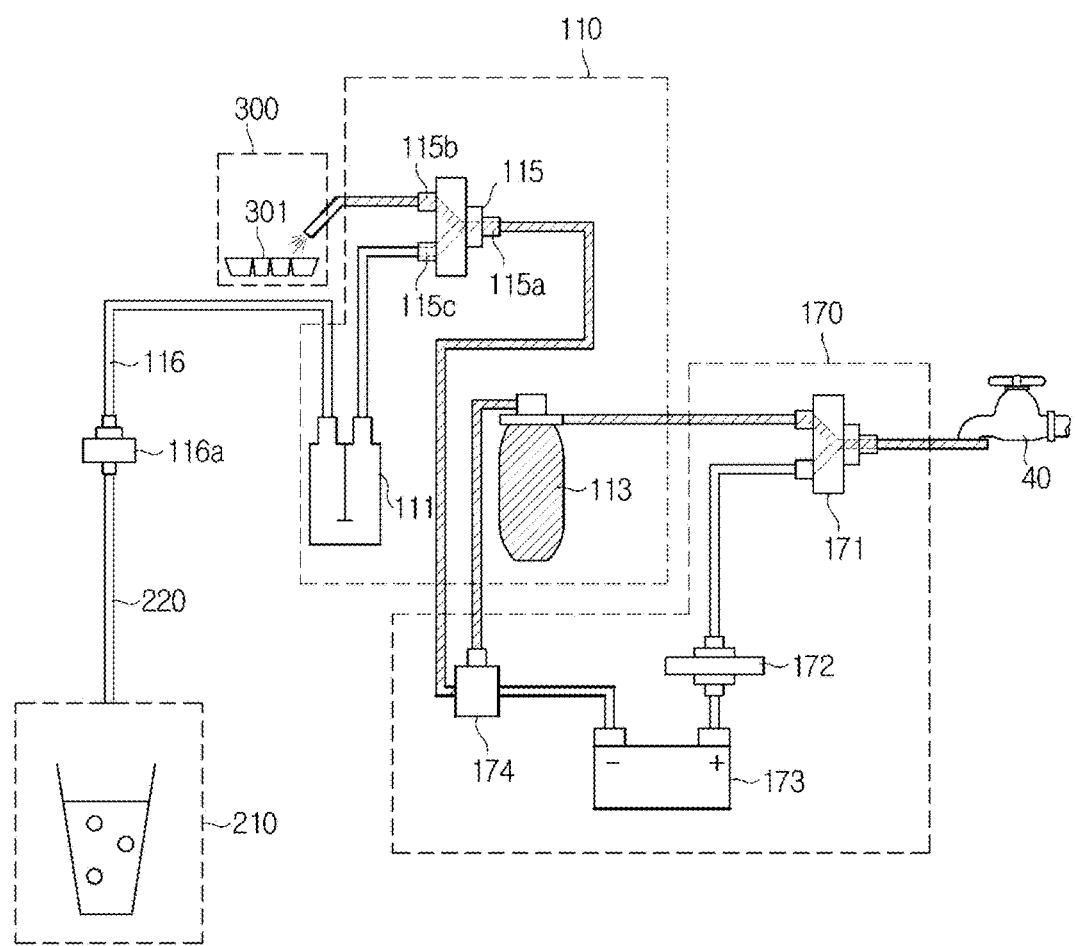
FIG. 21B is a view illustrating the concept of supplying the purified water to an ice-making machine according to the first embodiment of the present invention.

FIG. 21B shows a concept of supplying the purified water to the ice-making machine according to the first embodiment.

When the dispenser receives an instruction for an ice-making operation from the user, the controller 700 may control the refrigerator 1 to discharge ice in the ice-making machine 300 to the dispenser discharger 210.

In particular, water supplied from the water source 40 may be purified by eliminating pollutants through the water purification filter 113 to create purified water and then the purified water may flow into the first passage change-over valve 115.

The first passage change-over valve 115 may close the second outlet 115c to block a flow of the purified water into the water chamber 111 and open the first outlet 115b to allow the purified water to flow into the ice-making machine 300 based on a determined operation in the controller 700.

The ice-making machine 300 may manufacture ice using the purified water flowing thereinto, and the manufactured ice may be discharged to the dispenser.

Figure 21C:
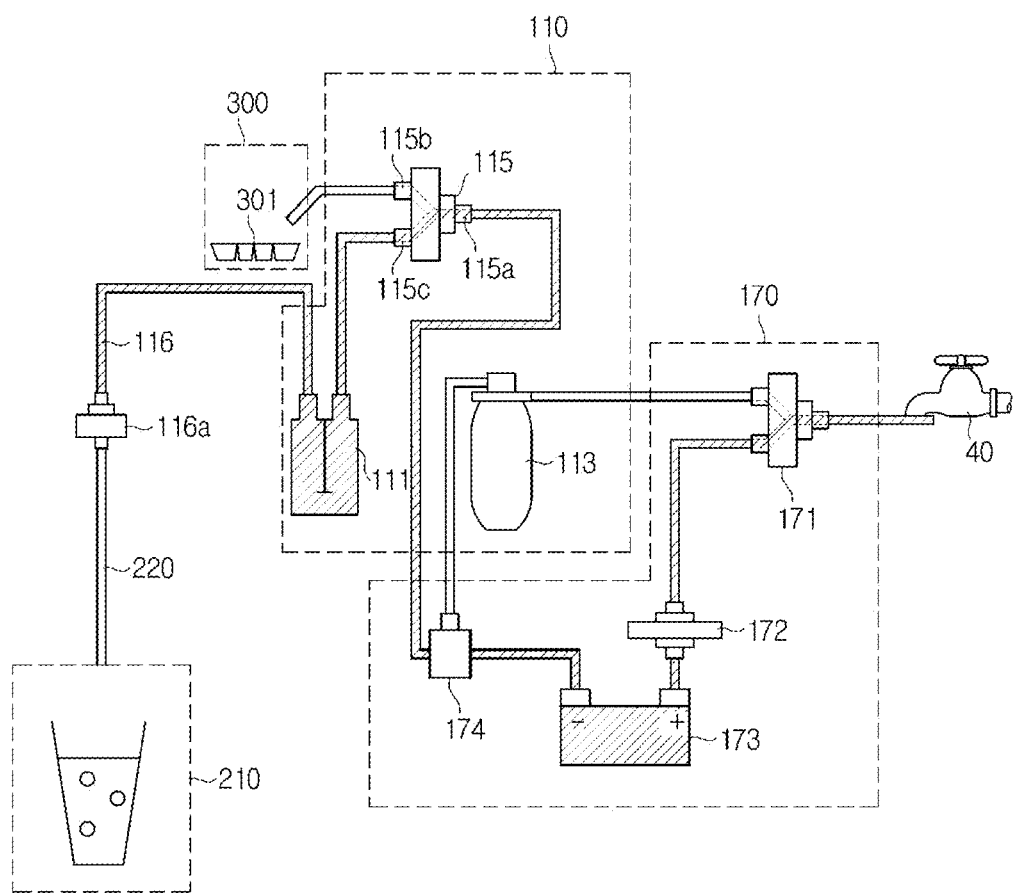
FIG. 21C is a view illustrating a concept of supplying sterilizing water to the dispenser and keeping the sterilizing water therein according to the first embodiment of the present invention.

FIG. 21C shows a concept of supplying the sterilizing water to the dispenser and keeping the sterilizing water therein according to the first embodiment.

When the user inputs a dispenser cleaning signal through the user interface 500, the controller 700 may control the second passage change-over valve 171 to connect to the external water source 40 and the sterilizing water generation-side inlet valve 172, and to isolate the water purification filter 113 from the external water source 40.

The water supplied from the external water source 40 may be converted into sterilizing water in the sterilizing water generator 173, and the third passage change-over valve 174 may be controlled to connect the sterilizing water generator 173 to the first passage change-over valve 115 and to isolate the first passage change-over valve 115 from the water purification filter 113. In addition, the first passage change-over valve 115 may block the ice-making machine 300 so that the sterilizing water does not flow thereinto.

Therefore, after being supplied to a dispenser passage 99, the sterilizing water may be supplied to the first passage change-over valve 115, the water chamber 111, and the purified water discharge passage 116. Further, the sterilizing water is kept in the dispenser passage 99 by closing the purified water discharge valve 116a, such that foreign materials or germs that have accumulated in the dispenser passage 99 may be eliminated.

Figure 21D:
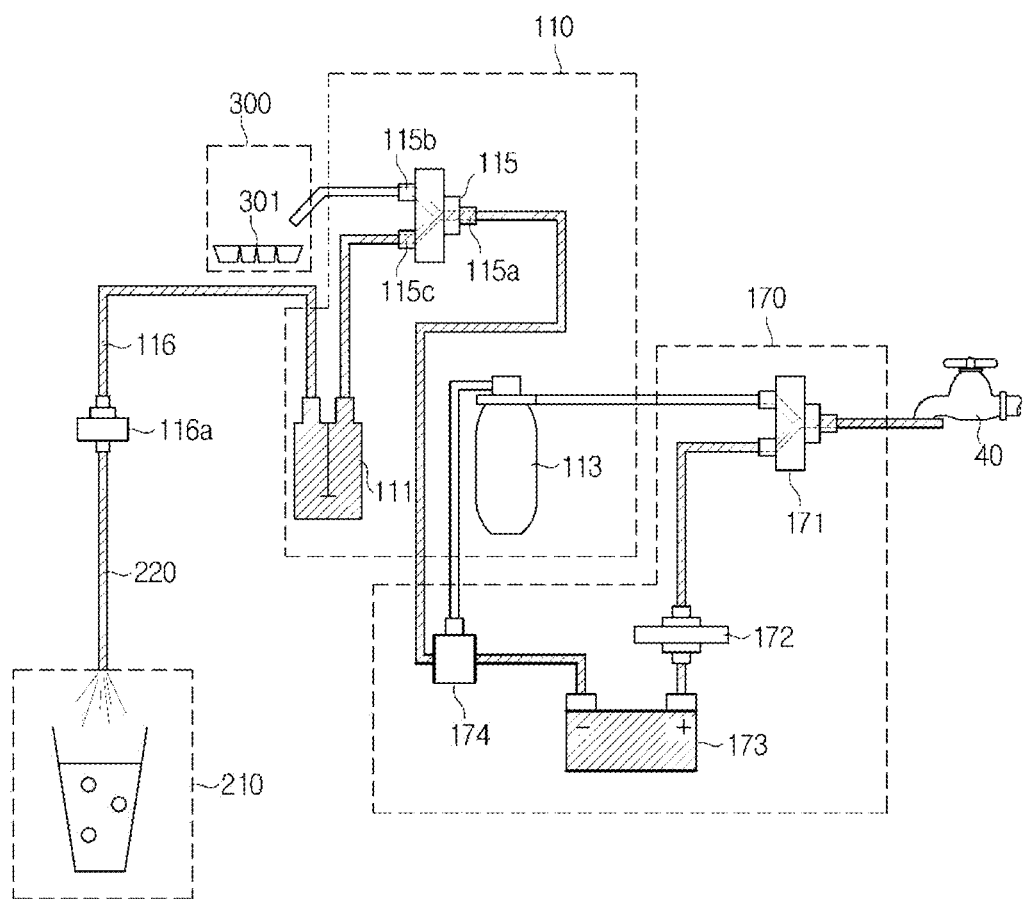
FIG. 21D is a view illustrating a concept of draining the sterilizing water according to the first embodiment of the present invention.

FIG. 21D shows a concept of draining the sterilizing water according to the first embodiment.

Once the foreign materials or germs that have accumulated in the dispenser passage 99 have been eliminated by keeping the sterilizing water in the dispenser passage 99 during a predetermined time period, the sterilizing water should be drained. Here, the predetermined time period for sterilization may be a value preset in the controller 700 at the time of design or manufacture, or a value set by the user through the user interface 500.

The controller 700 may open the purified water discharge valve 116a to drain the sterilizing water kept in the dispenser passage 99 into the dispenser discharger 210 through the common discharge passage 220.

Figure 21E:
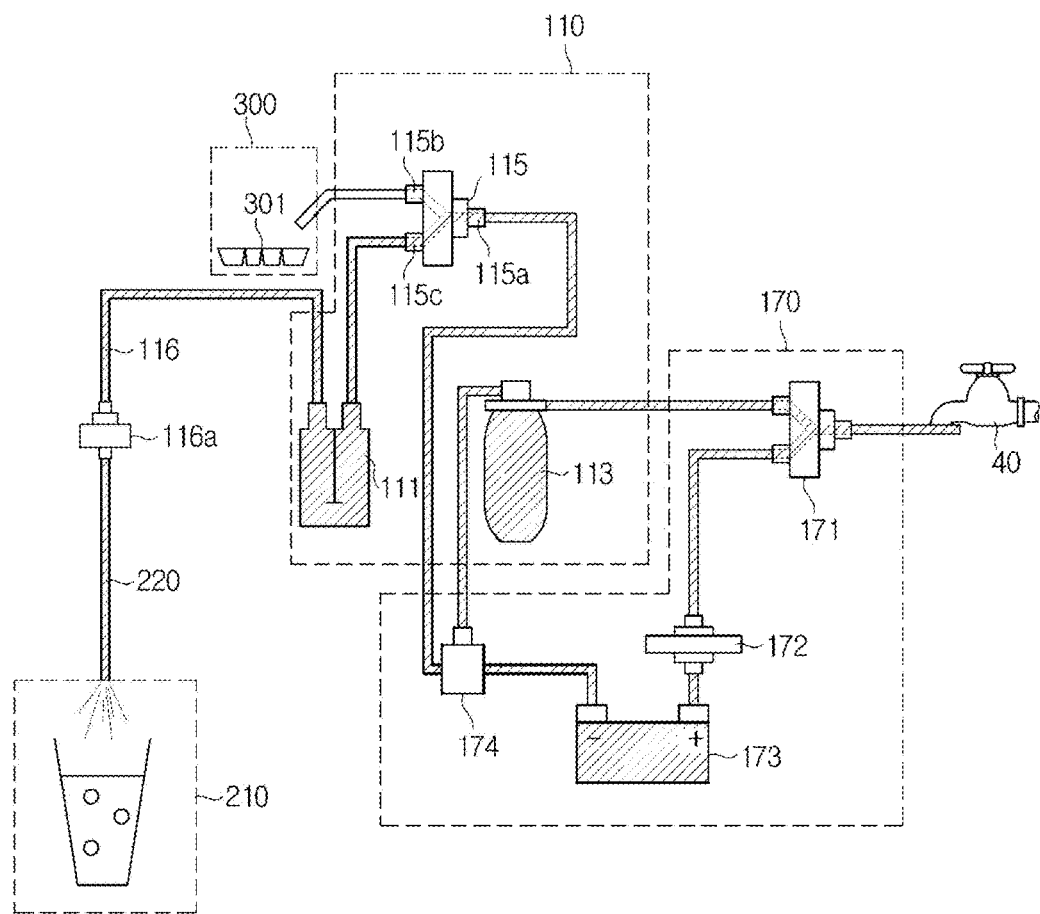
FIG. 21E is a view illustrating a concept of supplying and draining rinsing water according to the first embodiment of the present invention.

FIG. 21E shows a concept of supplying and draining the rinsing water according to the first embodiment.

After draining the sterilizing water into the dispenser discharger 210, the refrigerator 1 may rinse the dispenser passage 99 to sweep out any sterilizing water remaining in the dispenser passage 99.

In particular, by opening all valves except the first passage change-over valve 115, the purified water generated in the water purification filter 113 may flow throughout the dispenser passage 99 except for the ice-making machine 300 to be drained into the dispenser discharger 210. With such an operation, the dispenser passage 99 may be rinsed to sweep out any sterilizing water remaining therein.

Figure 22:
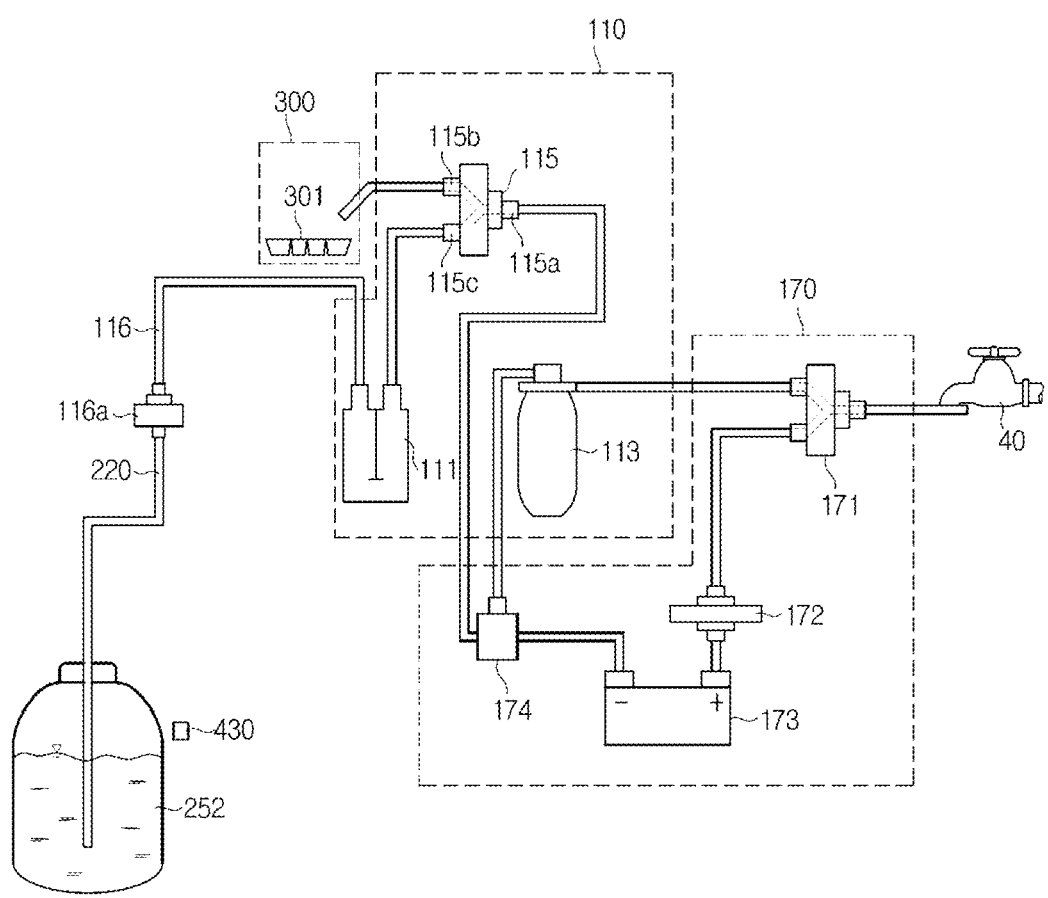
FIG. 22 is a view illustrating a passage of a dispenser according to a second embodiment of the present invention.

FIG. 22 shows a dispenser passage according to a second embodiment.

Unlike the first embodiment using the water receiver of a cup shape, the second embodiment is an embodiment using a water receiver of a water bottle.

In other words, as shown in FIG. 22, the water receiver has a water bottle shape and an opening of the water receiver is connected to a common discharge passage, such that purified water, sterilizing water, ionic water, or rinsing water may be drained into the water receiver. Additionally, since a water level detector 430 is provided, the drainage may be stopped when a level of water stored in the water receiver is equal to or greater than a threshold level and a message instructing a user to empty the water stored in the water receiver may be provided.

Hereinafter, embodiments of cleaning a dispenser additionally including the sparkling water supplier will be described with reference to FIGS. 23 to 28B.

Figure 23:
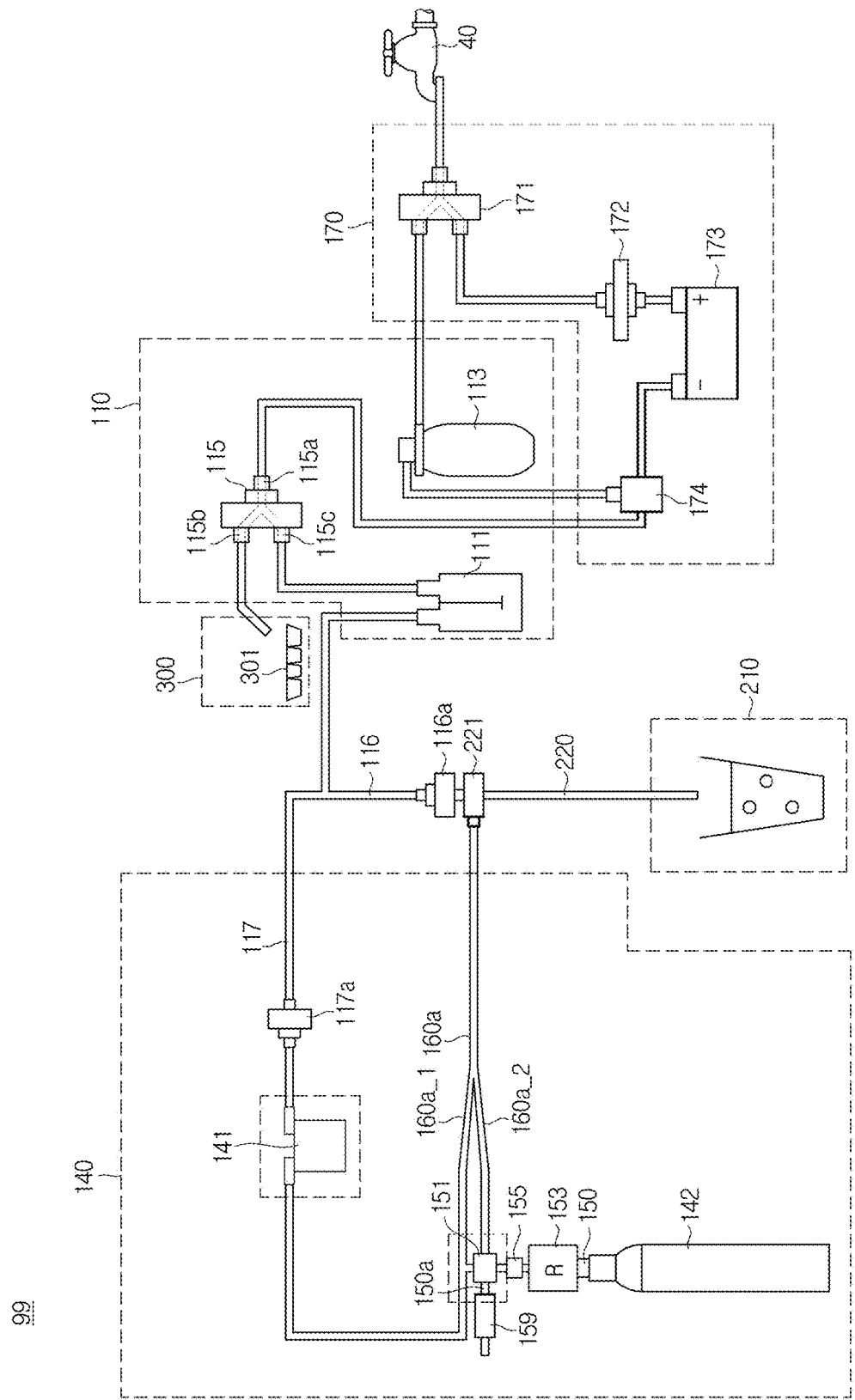
FIG. 23 is a view illustrating a passage of a dispenser including a sparkling water supplier according to a third embodiment of the present invention.

FIG. 23 shows a passage of the dispenser including the sparkling water supplier according to a third embodiment.

A refrigerator 1 may include a dispenser discharger 210, a purified water supplier 110, a sterilizing water supplier 170, the sparkling water supplier 140, and an ice-making machine 300.

The dispenser discharger 210 is configured to receive inputs from a user for a purifying operation, an ice-making operation, a sparkling water manufacturing operation, and the like and transmit them to a controller 700, and may be identical to or different from the dispenser discharger 210 described with reference to FIGS. 7 and 8.

The purified water supplier 110 may include a water chamber 111 for storing a purified water, a water purification filter 113 for purifying water supplied from a water source 40, and a first passage change-over valve 115 for distributing the purified water to the ice-making machine 300 or the water chamber 111.

The purified water supplier 110 supplies the purified water to be drained through the dispenser discharger 210, or to be used for manufacturing the sparkling water.

As shown in FIG. 23, the purified water supplier 110 may include the water chamber 111 for storing the purified water, the water purification filter 113 for purifying water supplied from the water source 40, the first passage change-over valve 115 for distributing the purified water to the ice-making machine 300 or the water chamber 111, and the ice-making machine 300.

As described above, the water chamber 111 may be provided at a second purified water housing 112 located at the rear surface of a left storage box 9, and the water purification filter 113 may be provided at a first purified water housing 114 located at a center between two storage boxes 9.

The first passage change-over valve 115 may be implemented by a 3-way valve including an inlet 115a connected to the water purification filter 113, a first outlet 115b connected to the ice-making machine 300, and a second outlet 115c connected to the water chamber 111.

The first passage change-over valve 115 may supply the purified water supplied from the water purification filter 113 to one of the water chamber 111 and the ice-making machine 300.

In particular, to supply the purified water to the water chamber 111 when an ice-making operation is not required, the first passage change-over valve 115 opens a passage connected to the water chamber 111 and closes a passage connected to the ice-making machine 300.

Otherwise, to supply the purified water to the ice-making machine 300 when an ice-making operation is required, the first passage change-over valve 115 closes the passage connected to the water chamber 111 and opens the passage connected to the ice-making machine 300.

Also, the purified water supplier 110 shown in FIG. 23 is merely one example of a purified water supplier applicable to the refrigerator 1 according to one embodiment, and it is not limited thereto.

The sterilizing water supplier 170 may include a second passage change-over valve 171, a sterilizing water generation-side inlet valve 172, a sterilizing water generator 173, and a third passage change-over valve 174.

The second passage change-over valve 171 may be implemented by a 3-way valve which is connected to the external water source 40, the water purification filter 113, and the sterilizing water generation-side inlet valve 172, and is capable of directing a flow of water supplied from the external water source 40 to the water purification filter 113 or to the sterilizing water generation-side inlet valve 172.

The sterilizing water generation-side inlet valve 172 is a valve for controlling whether or not water supplied from the external water source 40 to the sterilizing water supplier 170 is provided to the sterilizing water generator 173, and may be implemented by a check valve.

The sterilizing water generator 173 may generate the sterilizing water containing HClO by performing electrolysis on water supplied when the sterilizing water generation-side inlet valve 172 is opened. Alternatively, according to another embodiment, the sterilizing water generator 173 may be provided with a permeable membrane to convert the water supplied from external the water source 40 into ionic water.

The third passage change-over valve 174 may be implemented by a 3-way valve which is connected to the sterilizing water generator 173, the water purification filter 113, and the first passage change-over valve 115 and is capable of controlling provision of the purified water generated in the water purification filter 113 and the sterilizing water or the ionic water generated in the sterilizing water generator 173 to the first passage change-over valve 115.

The sparkling water supplier 140 may include a common discharge passage 220 for discharging the sparkling water or the purified water, a purified water pump 141 for pumping the purified water to manufacture the sparkling water, a carbon dioxide cylinder 142 for storing carbon dioxide, a mixing tube 160a for maxing the purified water output from the purified water pump 141 with carbon dioxide output from the carbon dioxide cylinder 142, a purified water supply passage 117 for guiding the purified water from the purified water supplier 110 to the purified water pump 141, a carbon dioxide supply passage 150 for guiding the carbon dioxide from the carbon dioxide cylinder 142 to the mixing tube 160a, and a purified water discharge passage 116 for guiding the purified water from the purified water supplier 110 to the common discharge passage 220.

The purified water supply passage 117 guides the purified water supplied from the purified water supplier 110 to the purified water pump 141, and a check valve 117a for preventing backward flow of the purified water is provided at the purified water supply passage 117.

The purified water pump 141 pumps the purified water supplied from the purified water supplier 110 to the mixing tube 160a. The high-pressure purified water pumped by the purified water pump 141 is mixed with the carbon dioxide in the mixing tube 160a.

In particular, the purified water pump 141 may increase a pressure of the purified water supplied from the purified water supplier 110 through the purified water supply passage 117. Once the controller 700 determines a target pressure, the purified water pump 141 may increase a pressure of the purified water to the target pressure to deliver the purified water to the mixing tube 160a at the same pressure as carbon dioxide lowered in pressure in a carbon dioxide regulator 153. At this point, the increased pressure of the purified water may be a high pressure of 5 to 9 bars.

Also, the purified water pump 141 may adjust a pressure and a supply amount of water to be supplied based on a target concentration input by the user through a user interface 500, thereby controlling a concentration of the sparkling water.

The carbon dioxide cylinder 142 may store carbon dioxide of a high pressure of approximately 45 to 60 bars. The carbon dioxide stored in the carbon dioxide cylinder 142 may be supplied to the mixing tube 160a through the carbon dioxide supply passage 150.

The carbon dioxide supply passage 150 guides the carbon dioxide stored in the carbon dioxide cylinder 142 to the mixing tube 160a.

A carbon dioxide supply valve 151 for opening and closing the carbon dioxide supply passage 150, the carbon dioxide regulator 153 for regulating a pressure of the carbon dioxide, a carbon dioxide pressure sensor 155 for detecting a discharge pressure of the carbon dioxide from the carbon dioxide cylinder 142, and a safety valve 159 for automatically discharging carbon dioxide in the carbon dioxide supply passage 150 to the outside when an internal pressure of the carbon dioxide supply passage 150 exceeds a reference pressure are provided on the carbon dioxide supply passage 150.

The carbon dioxide supply valve 151 opens and closes the carbon dioxide supply passage 150.

If the carbon dioxide supply valve 151 is opened, the carbon dioxide stored in the carbon dioxide cylinder 142 is mixed with the purified water pumped by the purified water pump 141 in the mixing tube 160a, thereby manufacturing the sparkling water.

A pilot valve that is opened and closed by the purified water supplied to the mixing tube 160a may be adopted as such a carbon dioxide supply valve 151. Also, a solenoid valve opening and closing the carbon dioxide supply passage 150 in response to an electrical signal may be adopted as the carbon dioxide supply valve 151.

The carbon dioxide supply valve 151 is opened and closed by a pressure of the purified water supplied to the mixing tube 160a, and, more particularly, the carbon dioxide supply valve 151 is opened when the purified water is supplied to the mixing tube 160a and is closed otherwise.

However, the carbon dioxide supply valve 151 is not limited to the pilot valve. For example, a solenoid valve operating in isolation from the purified water pump 141 may be adopted as the carbon dioxide supply valve 151.

The carbon dioxide regulator 153 may be provided at an outlet of the carbon dioxide cylinder 142 to regulate a pressure of the carbon dioxide discharged therefrom.

In particular, the carbon dioxide regulator 153 may reduce a pressure of the carbon dioxide being supplied to the mixing tube 160a. Once the controller 700 determines a target pressure, the carbon dioxide regulator 153 may reduce a pressure of the carbon dioxide to the target pressure to deliver the carbon dioxide to the mixing tube 160a at the same pressure as water increased in pressure by the purified water pump 141. At this point, the reduced pressure of the carbon dioxide may be a high pressure of 6 to 9 bars.

Also, the carbon dioxide regulator 153 may regulate a pressure and a supply amount of the carbon dioxide to be supplied based on a target concentration input by the user through the user interface 500, thereby controlling a concentration of the sparkling water.

The carbon dioxide pressure sensor 155 is provided at an outlet of the carbon dioxide regulator 153 to detect the pressure of the carbon dioxide reduced by the carbon dioxide regulator 153.

A pressure switch which outputs a low pressure detect signal corresponding to a state in which the pressure of the carbon dioxide reduced by the carbon dioxide regulator 153 is equal to or less than a predetermined reference supply pressure may be adopted as such a carbon dioxide pressure sensor 155.

The safety valve 159 may be automatically opened when an internal pressure in the carbon dioxide supply passage 150 exceeds a reference pressure, and may be provided at a carbon dioxide discharge passage 150a branched off from the carbon dioxide supply passage 150.

The mixing tube 160a mixes the purified water output from the purified water pump 141 with the carbon dioxide output from the carbon dioxide cylinder 142. The purified water and the carbon dioxide are mixed in the mixing tube 160a to make the sparkling water.

Also, a concentration of the sparkling water may be adjusted by controlling the pressure of the purified water and the carbon dioxide supplied to the mixing tube 160a. The concentration of the sparkling water is increased if the pressure of the carbon dioxide is greater than that of the purified water, and the concentration of the sparkling water is reduced otherwise.

Additionally, a discharge amount of the sparkling water may be varied according to the pressure of the purified water and the carbon dioxide supplied to the mixing tube 160a.

If a pressure of the purified water is greater than that of the carbon dioxide, a discharge amount of the sparkling water is determined by the pressure of the purified water, whereas the discharge amount of the sparkling water is affected by the pressure of both the purified water and the carbon dioxide if the pressure of the purified water is less than that of the carbon dioxide.

As a result, when the pressure of the purified water is identical to that of the carbon dioxide, the sparkling water having a constant concentration may be discharged at maximum capacity. In other words, it may be preferable for pressures of the purified water and the carbon dioxide supplied to the mixing tube 160a to be the same.

However, it is not limited thereto, and thus the sparkling water having a wide range of concentrations may be made by diversely controlling a pressure ratio between the purified water and the carbon dioxide.

The purified water discharge passage 116 guides the purified water supplied from the purified water supplier 110 to the common discharge passage 220, and a purified water discharge valve 161 for opening and closing the purified water discharge passage 116 is provided thereon.

The common discharge passage 220 guides the sparkling water and the purified water to the dispenser discharger 210, and a common discharge valve 221 for controlling discharge of the sparkling water is provided at the common discharge passage 220.

As shown in FIG. 20, a 3-way valve which connects the common discharge passage 220 to one of the mixing tube 160a and the purified water discharge passage 116 may be adopted as the common discharge valve 221.

However, the common discharge valve 221 is not limited to the 3-way valve. For example, when a Y-shaped passage is adopted as the common discharge passage 220, a 2-way valve provided at the common discharge passage 220 and the mixing tube 160a may be adopted as the common discharge valve 221.

As described above, the sparkling water supplier 140 may provide the mixing tube 160a with the purified water and the carbon dioxide to make and discharge the sparkling water.

Figure 24A:
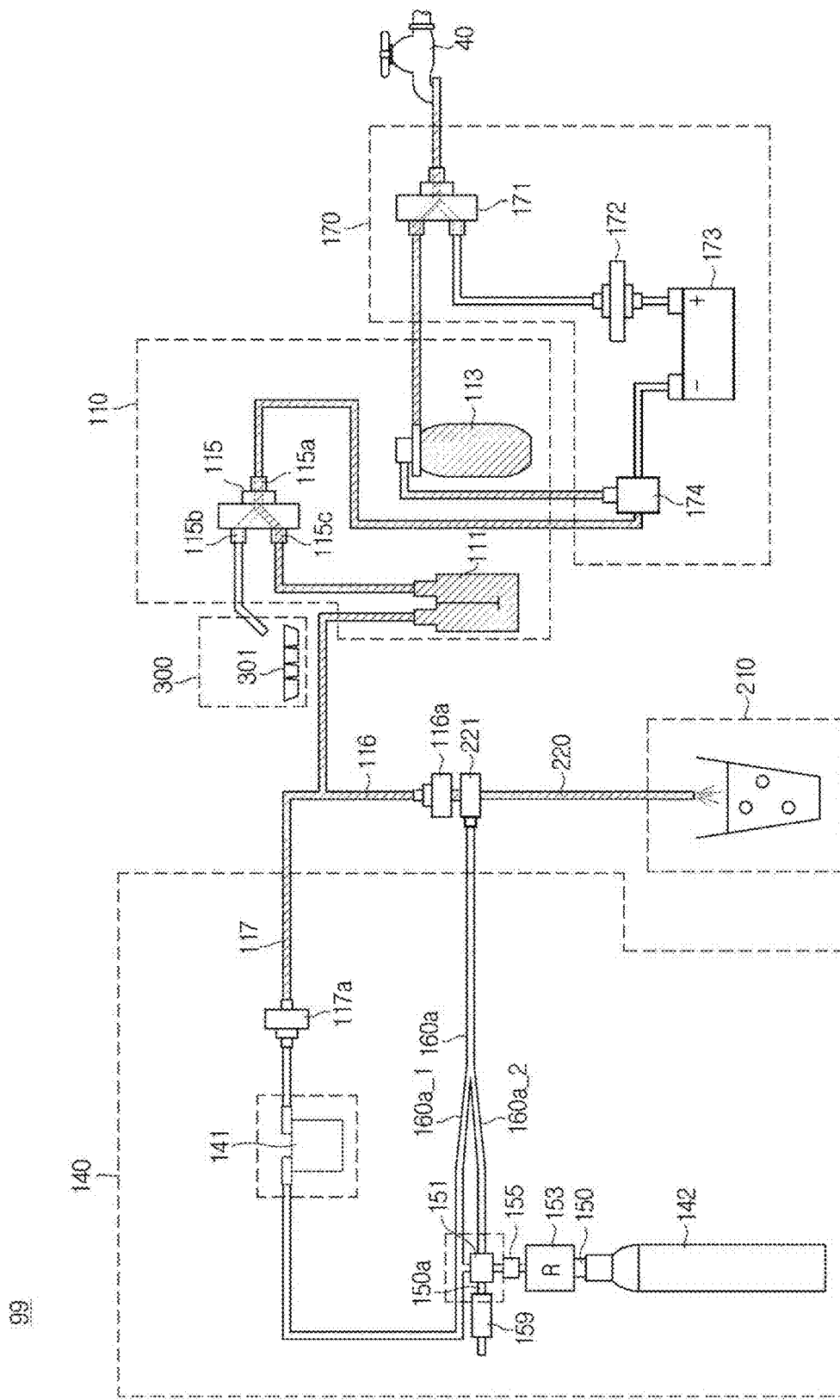
FIG. 24A is a view illustrating a concept of supplying purified water according to the third embodiment of the present invention.

FIG. 24A shows a concept of supplying the purified water according to the third embodiment.

When the dispenser discharger 210 receives an instruction for a water purification operation from the user, the controller 700 may control the refrigerator 1 to discharge the purified water into the common discharge passage 220.

In particular, water supplied from the water source 40 may be purified by eliminating pollutants through the water purification filter 113 to create purified water and then the purified water may flow into the first passage change-over valve 115.

The first passage change-over valve 115 may close the first outlet 115b to block a flow of the purified water into the ice-making machine 300 and open the second outlet 115c to allow the purified water to flow into the water chamber 111 based on a determined operation in the controller 700.

Also, a temperature of the purified water flowing into the water chamber 111 may be adjusted according to a target temperature input by the user through the user interface 500.

The purified water having the temperature adjusted to the target temperature in the water chamber 111 may be discharged to one side of the water chamber 111 connected to the second outlet 115c and the other side. At this point, the controller 700 may control the check valve 117a to close so that flow of the purified water into the purified water pump 141 is blocked, and control the purified water discharge valve 161 to open so that the purified water departing from the water chamber 111 can flow into the common discharge valve 221.

Moreover, the controller 700 may control the common discharge valve 221 to close so that the common discharge passage 220 is disconnected from the mixing tube 160a, thereby preventing the purified water from flowing into the mixing tube 160a, or the water, the carbon dioxide, and the sparkling water that remain in the mixing tube 160a from flowing thereinto. Alternatively, the controller 700 may open the common discharge valve 221 to connect the common discharge passage 220 to the purified water discharge passage 116, thereby allowing the purified water discharged from the water chamber 111 to flow into a vessel placed below the dispenser discharger 210 through the common discharge passage 220.

With such an operation, the user may obtain the purified water at the target temperature.

Figure 24B:
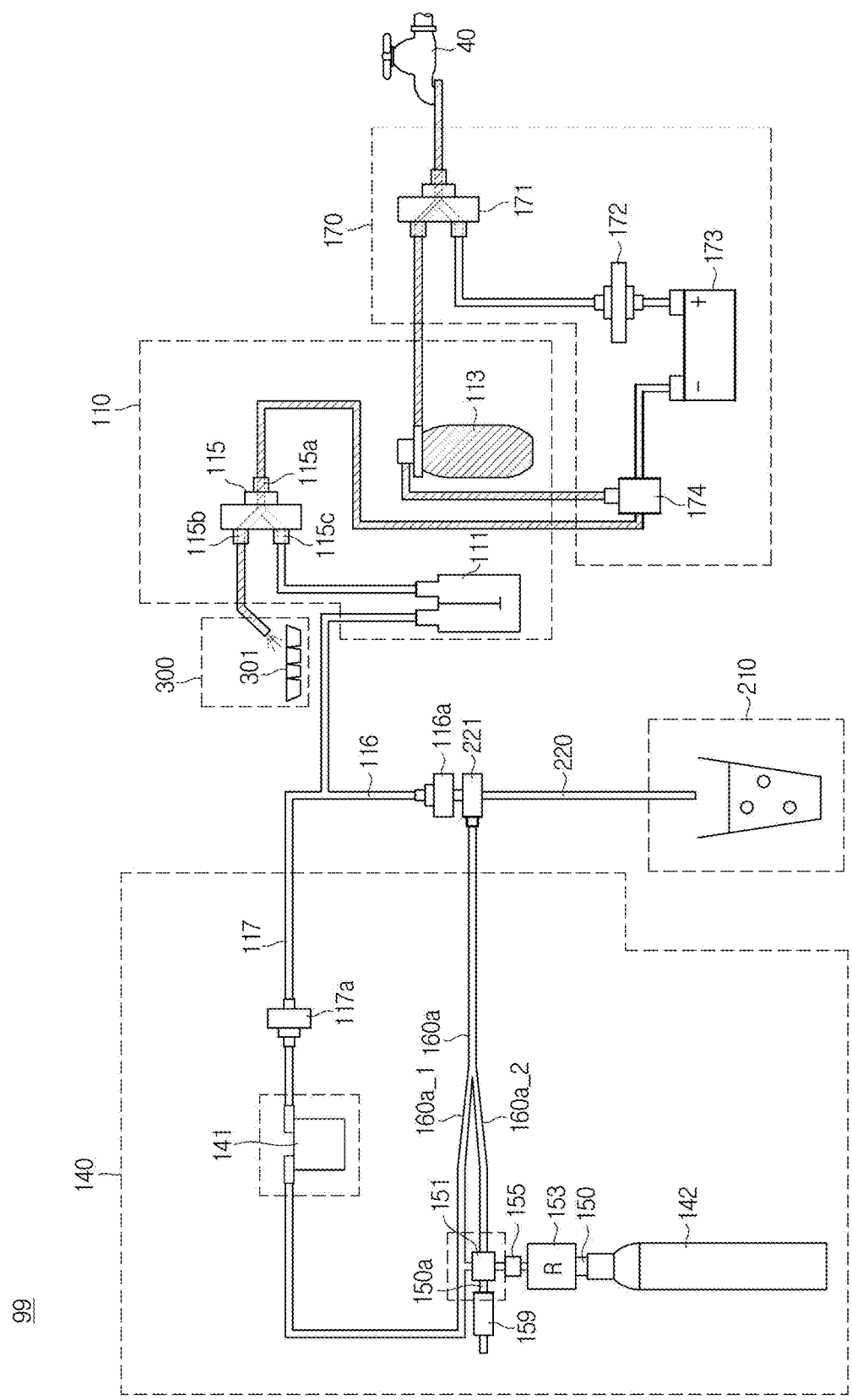
FIG. 24B is a view illustrating a concept of supplying the purified water to an ice-making machine according to the third embodiment of the present invention.

FIG. 24B shows a concept of supplying the purified water to the ice-making machine according to the third embodiment.

When the dispenser discharger 210 receives an instruction for an ice-making operation from the user, the controller 700 may control the refrigerator 1 to discharge ice from the ice-making machine 300 into the dispenser discharger 210.

In particular, water supplied from the water source 40 may be purified by eliminating pollutants through the water purification filter 113 to create purified water and then the purified water may flow into the first passage change-over valve 115.

The first passage change-over valve 115 may close the second outlet 115c to block a flow of the purified water into the water chamber 111 and open the first outlet 115b to allow the purified water to flow into the ice-making machine 300 based on a determined operation in the controller 700.

The ice-making machine 300 may produce ice using the purified water flowing thereinto, and the produced ice may be discharged into the dispenser discharger 210.

Figure 24C:
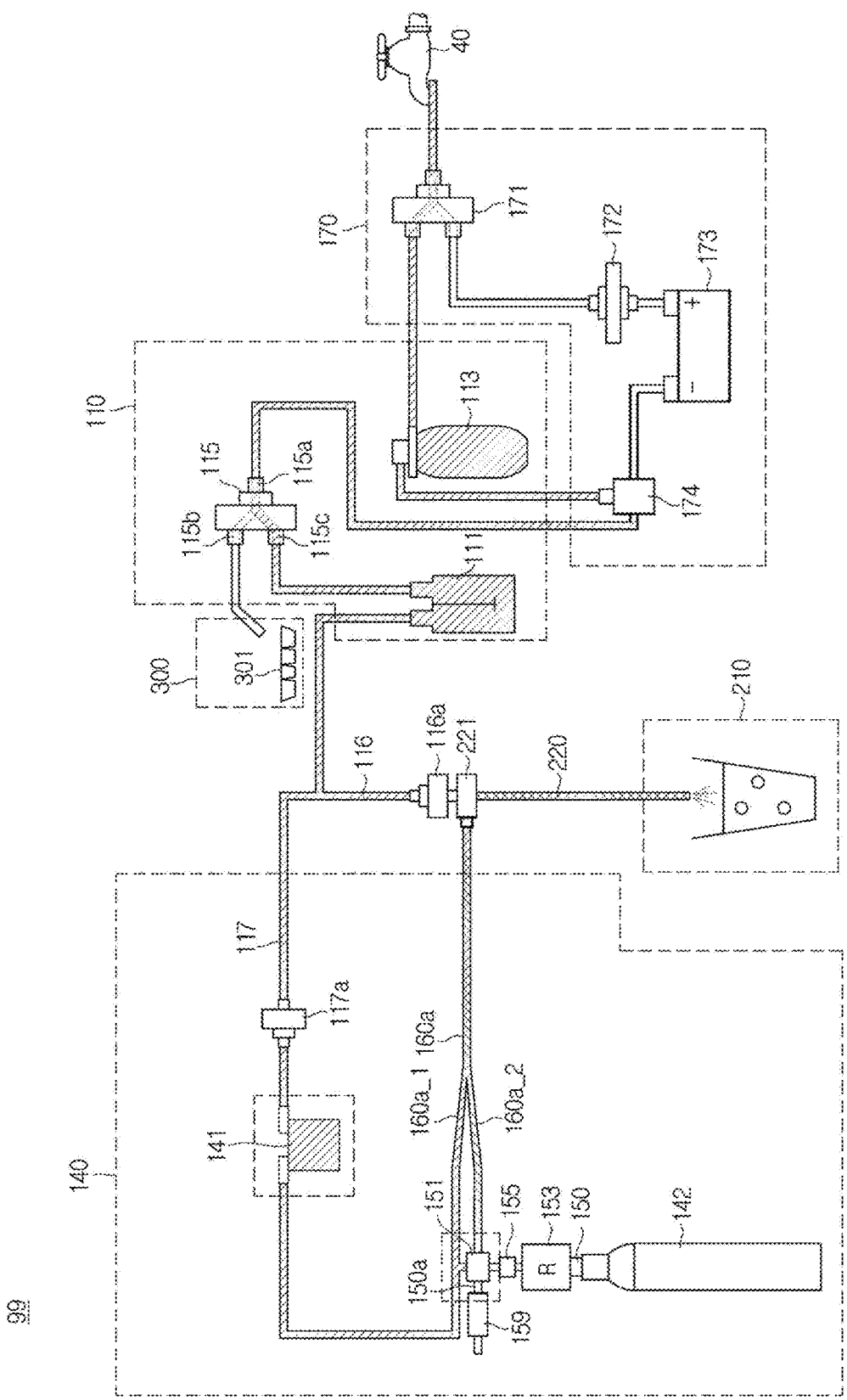
FIG. 24C is a view illustrating a concept of supplying sparkling water according to the third embodiment of the present invention.

FIG. 24C shows a concept of supplying the sparkling water according to the third embodiment.

When the dispenser discharger 210 receives an instruction for a sparkling water making operation from the user, the controller 700 may control the refrigerator 1 to discharge the made sparkling water into the dispenser discharger 210.

In particular, water supplied from the water source 40 may be purified by eliminating pollutants through the water purification filter 113 to create purified water and then the purified water may flow into the first passage change-over valve 115.

The first passage change-over valve 115 may close the first outlet 115b to block a flow of the purified water into the ice-making machine 300 and open the second outlet 115c to allow the purified water to flow into the water chamber 111 based on a determined operation in the controller 700.

Also, a temperature of the purified water flowing into the water chamber 111 may be adjusted according to a target temperature input by the user through the user interface 500. Particularly, the water chamber 111 may decrease the temperature of the purified water to increase carbon dioxide solubility when making the sparkling water.

The purified water having the temperature adjusted to the target temperature in the water chamber 111 may be discharged to one side of the water chamber 111 connected to the second outlet 115c and the other side. At this point, the controller 700 may control the check valve 117a to open so that the purified water departing from the water chamber 111 can flow into the purified water pump 141, and control the purified water discharge valve 161 to close so that flow of the purified water into the common discharge valve 221 is blocked.

A pressure of the purified water flowing into the purified water pump 141 is increased while the purified water is passing therethrough. Carbon dioxide solubility in water may be increased when a temperature is low and a pressure is high. Therefore, the carbon dioxide in the carbon dioxide cylinder 142 is stored therein at a high pressure such that it may be easy to reduce the pressure of the carbon dioxide through the carbon dioxide regulator 153, whereas it may be difficult to increase a pressure of water at a high pressure through a conventional purified water regulator. As a result, the purified water pump 141 may make high pressure water to increase the carbon dioxide solubility such that an efficiency with which the sparkling water is made may be increased. For example, the purified water pump 141 may increase a pressure of water to 5 to 9 bars. The water with the increased pressure in the purified water pump 141 may flow into the mixing tube 160a through a purified water inlet tube 160a_1.

Also, the carbon dioxide stored in the carbon dioxide cylinder 142 may be delivered to the carbon dioxide regulator 153 through the carbon dioxide supply passage 150, and the carbon dioxide regulator 153 may reduce a pressure of the carbon dioxide. Since solubility in the mixing tube 160a is increased when the purified water and the carbon dioxide have the same pressure, the carbon dioxide regulator 153 may reduce the pressure of the carbon dioxide to be identical to that of the purified water increased in the purified water pump 141. For example, the carbon dioxide regulator 153 may reduce a pressure of the carbon dioxide to 6 to 9 bars. By detecting the pressure of carbon dioxide being reduced through the carbon dioxide pressure sensor 155, an operation of the carbon dioxide regulator 153 may be controlled and adjusted. The carbon dioxide having the pressure reduced in the carbon dioxide regulator 153 may flow into the mixing tube 160a through a carbon dioxide inlet tube 160a_2.

The sparkling water may be made in the mixing tube 160a by mixing the high pressure purified water flowing into the mixing tube 160a through the purified water inlet tube 160a_1 with the high pressure carbon dioxide flowing into the mixing tube 160a through the carbon dioxide inlet tube 160a_2.

The sparkling water made in the mixing tube 160a passes the common discharge valve 221. The common discharge valve 221 may connect the mixing tube 160a to the common discharge passage 220, and isolate the mixing tube 160a from the purified water discharge passage 116 to discharge the sparkling water into the dispenser discharger 210.

Figure 24D:
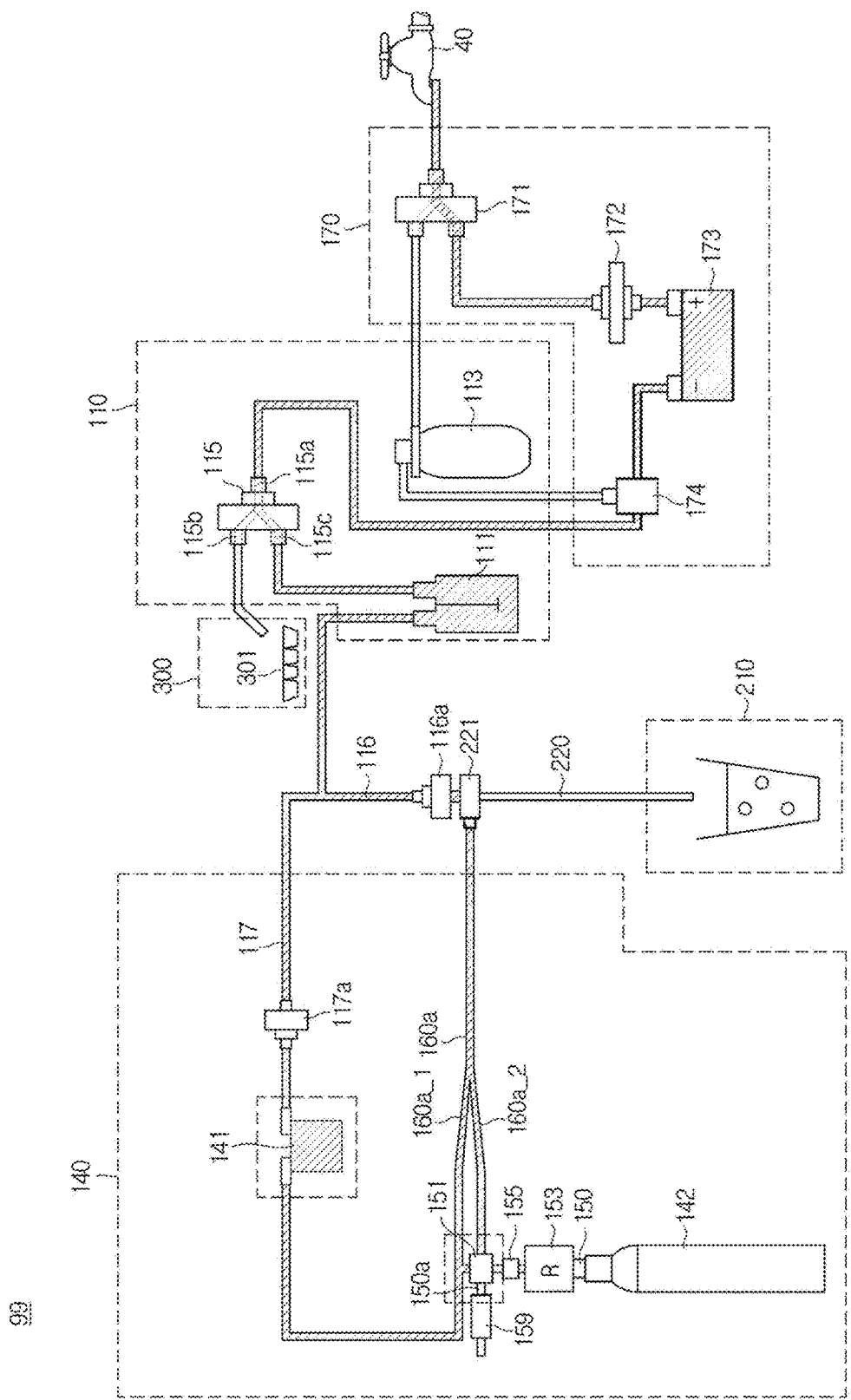
FIG. 24D is a view illustrating a concept of supplying and keeping sterilizing water according to the third embodiment of the present invention.

FIG. 24D shows a concept of supplying and keeping the sterilizing water according to the third embodiment.

When the user inputs a dispenser cleaning signal through the user interface 500, the controller 700 may control the second passage change-over valve 171 to connect to the external water source 40 and the sterilizing water generation-side inlet valve 172, and to isolate the water purification filter 113 from the external water source 40.

The water supplied from the external water source 40 may be converted into sterilizing water in the sterilizing water generator 173, and the third passage change-over valve 174 may be controlled to connect the sterilizing water generator 173 to the first passage change-over valve 115 and to isolate the first passage change-over valve 115 from the water purification filter 113. In addition, the first passage change-over valve 115 may block the sterilizing water from flowing into the ice-making machine 300.

Therefore, after being supplied to a dispenser passage 99, the sterilizing water may be supplied to the first passage change-over valve 115, the water chamber 111, the purified water discharge passage 116, and the sparkling water supplier 140. Further, the sterilizing water is kept in the dispenser passage 99 by closing the common discharge valve 221, such that foreign materials or germs that have accumulated in the dispenser passage 99 may be eliminated.

Figure 24E:
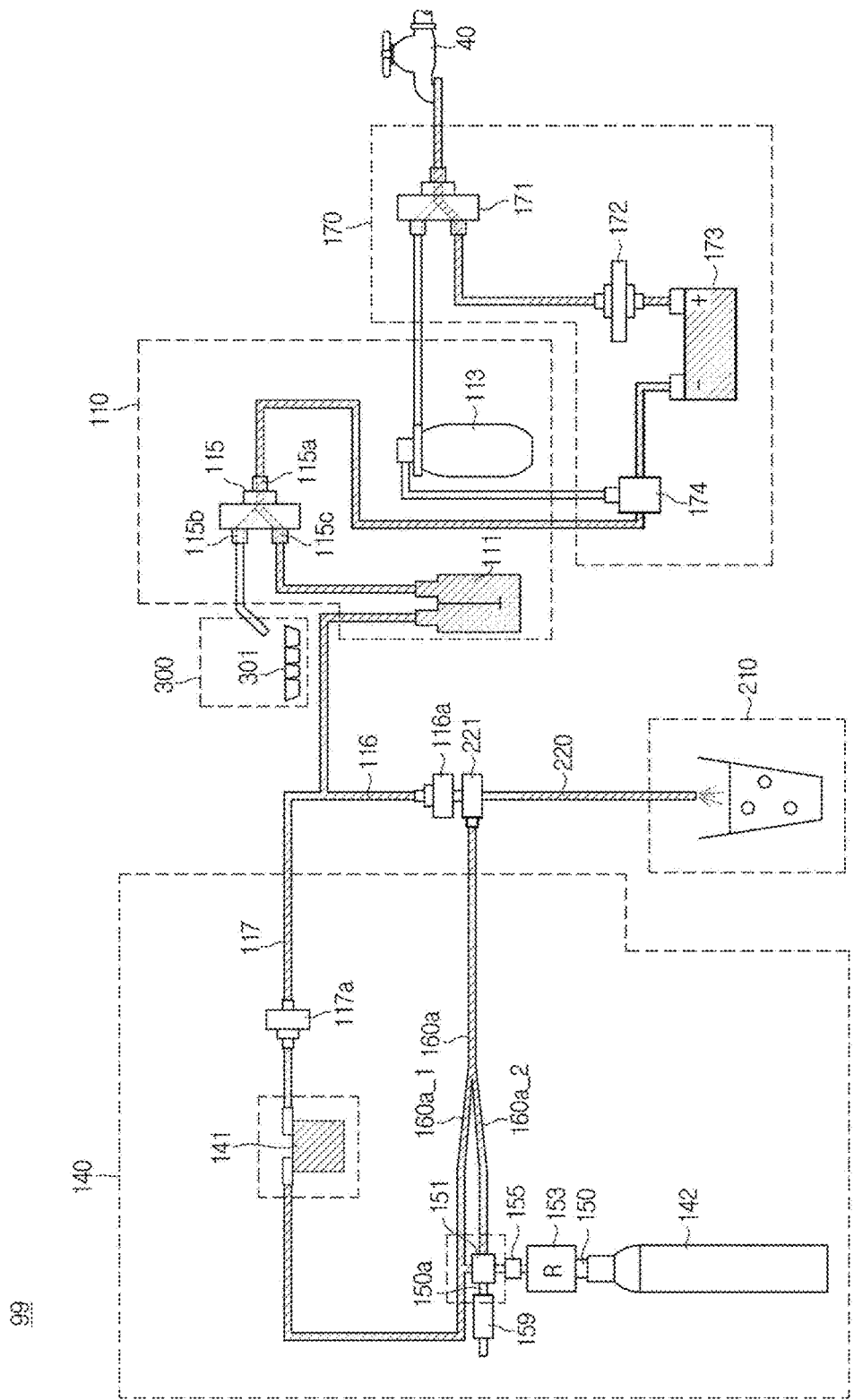
FIG. 24E is a view illustrating a concept of draining the sterilizing water according to the third embodiment of the present invention.

FIG. 24E shows a concept of draining the sterilizing water according to the third embodiment.

Once the foreign materials or germs that have accumulated in the dispenser passage 99 have been eliminated by keeping the sterilizing water in the dispenser passage 99 during a predetermined time period, the sterilizing water should be drained. Here, the predetermined time period for sterilization may be a value preset in the controller 700 at the time of design or manufacture, or a value set by the user through the user interface 500.

The controller 700 may open the common discharge valve 221 to drain the sterilizing water kept in the dispenser passage 99 into the dispenser discharger 210 through the common discharge passage 220.

Figure 24F:
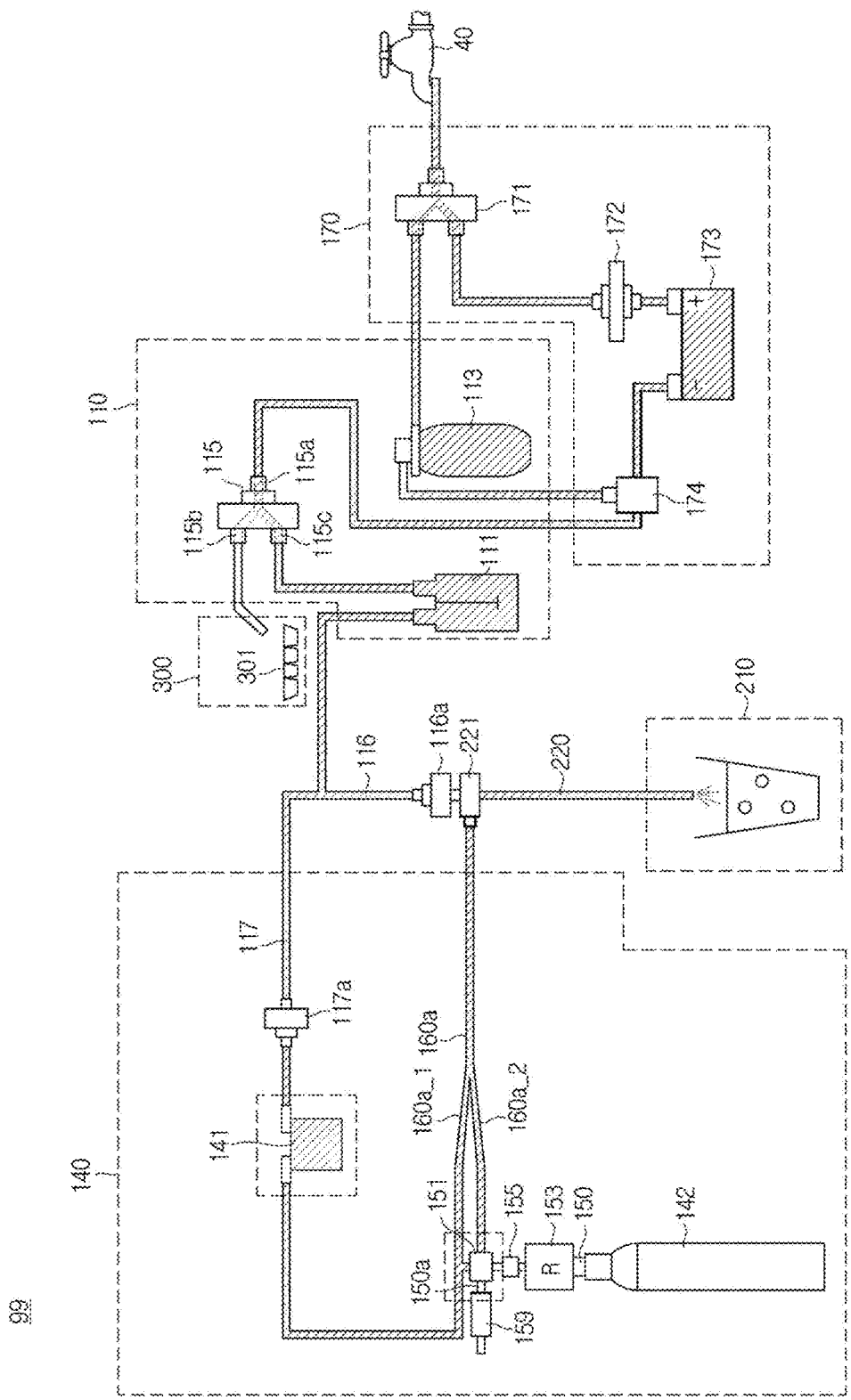
FIG. 24F is a view illustrating a concept of supplying and draining rinsing water according to the third embodiment of the present invention.

FIG. 24F shows a concept of supplying and draining the rinsing water according to the third embodiment.

After draining the sterilizing water into the dispenser discharger 210, the refrigerator 1 may rinse the dispenser passage 99 to sweep out any sterilizing water remaining in the dispenser passage 99.

In particular, by opening all valves except the first passage change-over valve 115, the purified water generated in the water purification filter 113 may flow throughout the dispenser passage 99 except the ice-making machine 300 to be drained into the dispenser discharger 210. With such an operation, the dispenser passage 99 may be rinsed to sweep out any sterilizing water remaining therein.

Figure 25:
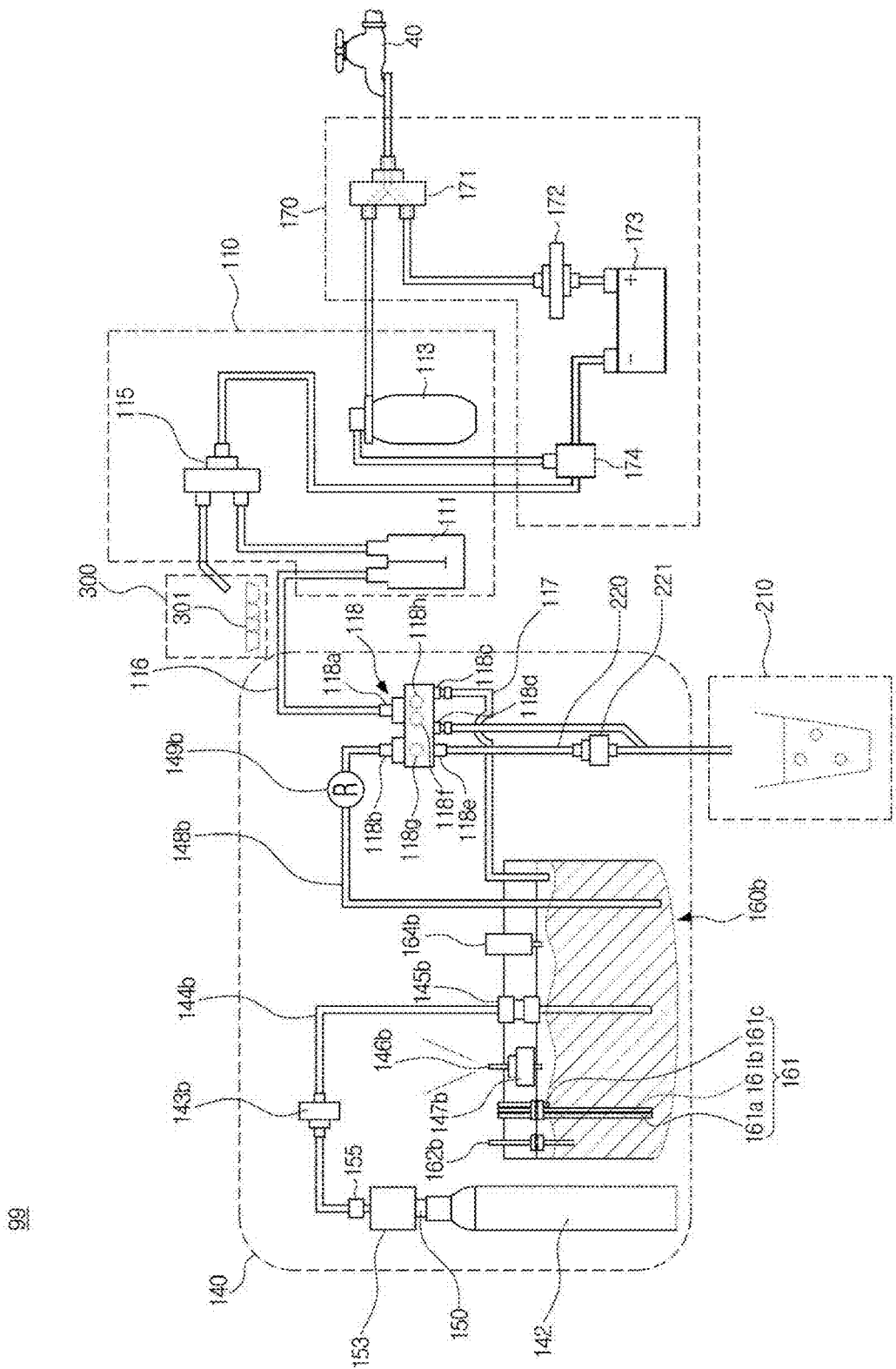
FIG. 25 is a view illustrating a passage of a dispenser according to a fourth embodiment of the present invention.

FIG. 25 shows a dispenser passage according to a fourth embodiment.

Carbon dioxide inside a carbon dioxide cylinder 142 may be supplied to a sparkling water chamber 160b through a carbon dioxide supply passage 144b connecting the carbon dioxide cylinder 142 to the sparkling water chamber 160b.

A carbon dioxide regulator 153 for regulating a pressure of the carbon dioxide, a carbon dioxide pressure sensor 155 for detecting a discharge pressure of the carbon dioxide, a carbon dioxide supply valve 143b for opening and closing the carbon dioxide supply passage 144b, and a carbon dioxide backflow prevention valve 145b for preventing the carbon dioxide from flowing backward may be provided at the carbon dioxide supply passage 144b.

The carbon dioxide regulator 153 may be provided at an outlet of the carbon dioxide cylinder 142 to regulate a pressure of the carbon dioxide discharged therefrom. In particular, the carbon dioxide regulator 153 may reduce a pressure of the carbon dioxide supplied to the sparkling water chamber 160b to approximately 8.5 bars.

The carbon dioxide pressure sensor 155 may be provided at an outlet of the carbon dioxide regulator 153 to detect a pressure of the carbon dioxide reduced by the carbon dioxide regulator 153.

A pressure switch which outputs a low pressure detect signal corresponding to a state in which the pressure of the carbon dioxide reduced by the carbon dioxide regulator 153 is equal to or less than a predetermined reference supply pressure may be adopted as such a carbon dioxide pressure sensor 155.

The sparkling water chamber 160b may mix the carbon dioxide supplied from the carbon dioxide cylinder 142 with purified water supplied from a water chamber 111 to make sparkling water and store it therein.

Besides the carbon dioxide supply passage 144b described above, a purified water discharge passage 116 receiving the purified water from the water chamber 111, a sparkling water discharge passage 148b for discharging the sparkling water into a dispenser discharger 210, and a carbon dioxide discharge passage 146b for ventilating the carbon dioxide remaining in the sparkling water chamber 160b to supply the purified water to the sparkling water chamber 160b may be connected to the sparkling water chamber 160b.

On the purified water supply passage 116, a purified water supply valve 118h may be provided to open and close the purified water supply passage 116.

A sparkling water discharge valve 118g for opening and closing the sparkling water discharge passage 148b, and a sparkling water regulator 149b for regulating a pressure of the sparkling water being discharged may be provided at the sparkling water discharge passage 148b. On the carbon dioxide discharge passage 146b, a carbon dioxide discharge valve 147b may be provided to open and close the carbon dioxide discharge passage 146b. Here, the purified water supply valve 118h and the sparkling water discharge valve 118g may both be solenoid valves.

Meanwhile, a water level sensor 161 may be provided at the sparkling water chamber 160b to measure an amount of the purified water being supplied thereto.

The water level sensor 161 may include a first electrode 161a and a second electrode 161b, which have the same length, and a third electrode 161c having a different length from the first and second electrodes 161a and 161b.

For example, distal ends of the first electrode 161a and the second electrode 161b may be provided at positions corresponding to a minimum water level of the sparkling water, and a distal end of the third electrode 161c may be provided at a position corresponding to a maximum water level of the sparkling water. In this case, if a current flows between one of the first and second electrodes 161a and 161b and the third electrode 161c, the refrigerator 1 may determine that a water level of the sparkling water is equal to or greater than the maximum water level. Also, if no current flows between the first electrode 161a and the second electrode 161b, the refrigerator 1 may determine that the water level of the sparkling water is less than the minimum water level.

In brief, the water level sensor 161 includes the three electrodes 161a, 161b, and 161c, and determines whether the water level of the sparkling water stored in the sparkling water chamber 160b is the maximum water level or the minimum water level.

However, the water level sensor 161 is not limited thereto. For example, the water level sensor 161 may include two electrodes and detect a water level of the sparkling water as one of a maximum water level and a minimum water level. As another example, the water level sensor 161 may include four or more electrodes, and detect three or more water levels according to a number of electrodes.

For the convenience of understanding, hereinafter, it will be assumed that the water level sensor 161 includes the three electrodes 161a, 161b, and 161c, and detects whether the water level of the sparkling water is the maximum water level or the minimum water level.

Also, a safety valve 164b may be provided at the sparkling water chamber 160b to ventilate carbon dioxide when high-pressure carbon dioxide exceeding a predetermined pressure is supplied to the sparkling water chamber 160b due to a malfunction of the carbon dioxide regulator 153 and the like.

Such a sparkling water chamber 160b may be formed in a predetermined size to accommodate approximately one liter (l) of purified water. Additionally, the sparkling water chamber 160b may be made of a stainless material so that its size is minimized and it can endure high pressures and resist corrosion.

In isolation from the sparkling water discharge passage 148b, a purified water discharge passage 220 may be provided to discharge the purified water stored in the water chamber 111 into a withdrawal space 210a. Also, on the purified water discharge passage 220, a purified water discharge valve 221 may be provided to open and close the purified water discharge passage 220, and may be provided as a solenoid valve like the purified water supply valve 118h and the sparkling water discharge valve 118g.

The purified water supply valve 118h, the sparkling water discharge valve 118g, and the purified water discharge valve 221 may form a valve assembly 118. In other words, the purified water supply valve 118h, the sparkling water discharge valve 118g, and the purified water discharge valve 221 may be integrally formed.

The valve assembly 118 may include a first inlet port 118a connected to the water chamber 111, a second inlet port 118b connected to the sparkling water chamber 160b, a first outlet port 118c connected to the sparkling water chamber 160b, and a second outlet port 118d and a third outlet port 118e connected to dispenser discharger 210.

The purified water supply passage 116 and the purified water discharge passage 220 may pass through the first inlet port 118a, and the sparkling water discharge passage 148b may pass through the second inlet port 118b. The purified water supply passage 116 may pass through the first outlet port 118c, the purified water discharge passage 220 may pass through the second outlet port 118d, and the sparkling water discharge passage 148b may pass through the third outlet port 118e.

However, the purified water supply valve 118h, the purified water discharge valve 221, and the sparkling water discharge valve 118g are independently opened and closed.

Also, the valve assembly 118 includes the three independent valves as described above, and the valve assembly 118 may include one 3-way change-over valve for selectively directing the purified water from the water chamber 111 to the sparkling water chamber 160b or the withdrawal space 210a, and another 3-way passage change-over valve for providing the purified water from the water chamber 111 to the withdrawal space 210a or the sparkling water from the sparkling water chamber 160b to the withdrawal space 210a.

Meanwhile, the purified water discharge passage 220 for directly discharging the purified water from the water chamber 111 to the withdrawal space 210a, and the sparkling water discharge passage 148b for discharging the sparkling water in the sparkling water chamber 160b to the withdrawal space 210a may be joined at one position to form a common discharge passage.

The purified water discharge passage 220 and the sparkling water discharge passage 148b may be joined at an external side of the valve assembly 118. Therefore, the dispenser discharger 210 may be provided to connect to both the purified water discharge passage 220 and the sparkling water discharge passage 148b which are not separately provided. Of course, without being joined to each other, the purified water discharge passage 220 and the sparkling water discharge passage 148b may separately extend to the dispenser discharger 210.

A residual water discharge prevention valve 221 may be provided at the common discharge passage 220 for opening and closing the common discharge passage so that the purified water or the sparkling water remaining in the common discharge passage is not discharged into the withdrawal space 210a in a state in which the purified water discharge valve 221 and the sparkling water discharge valve 118g are closed. It may be preferable to provide the residual water discharge prevention valve 221 as close to an end of the common discharge passage 220 as possible.

Figure 26A:
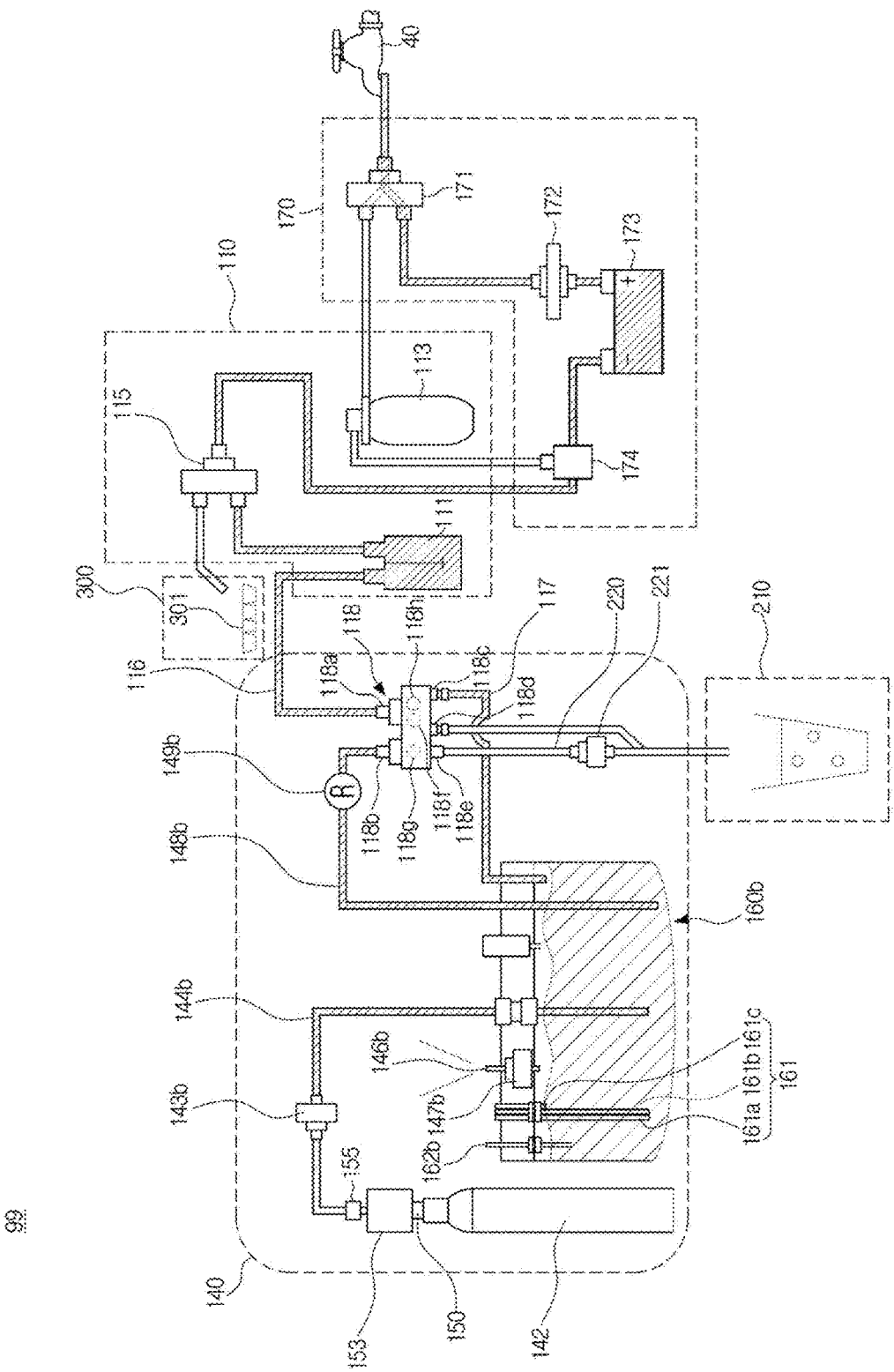
FIG. 26A is a view illustrating a concept of supplying sterilizing water to a purified water supplier and a sparkling water supplier and keeping the sterilizing water therein according to the fourth embodiment of the present invention.

FIG. 26A shows a concept of supplying the sterilizing water to the purified water supplier and the sparkling water supplier and keeping the sterilizing water therein according to the fourth embodiment.

When the user inputs a dispenser cleaning signal through a user interface 500, a controller 700 may control a second passage change-over valve 171 to connect to an external water source 40 and a sterilizing water generation-side inlet valve 172, and to isolate a water purification filter 113 from the external water source 40.

The water supplied from the external water source 40 may be converted into sterilizing water in a sterilizing water generator 173, and a third passage change-over valve 174 may be controlled to connect the sterilizing water generator 173 to a first passage change-over valve 115 and to isolate the first passage change-over valve 115 from the water purification filter 113. In addition, the first passage change-over valve 115 may block the sterilizing water from flowing into the ice-making machine 300.

Additionally, the valve assembly 118 may be controlled to open a sparkling water supplier 140 to flow the sterilizing water thereinto.

Therefore, after being supplied to a dispenser passage 99, the sterilizing water may be supplied to the first passage change-over valve 115, the water chamber 111, and the purified water discharge passage 116. Further, the sterilizing water is kept in the dispenser passage 99 by closing the purified water supply valve 116a, such that foreign materials or germs that have accumulated in the dispenser passage 99 may be eliminated.

Figure 26B:
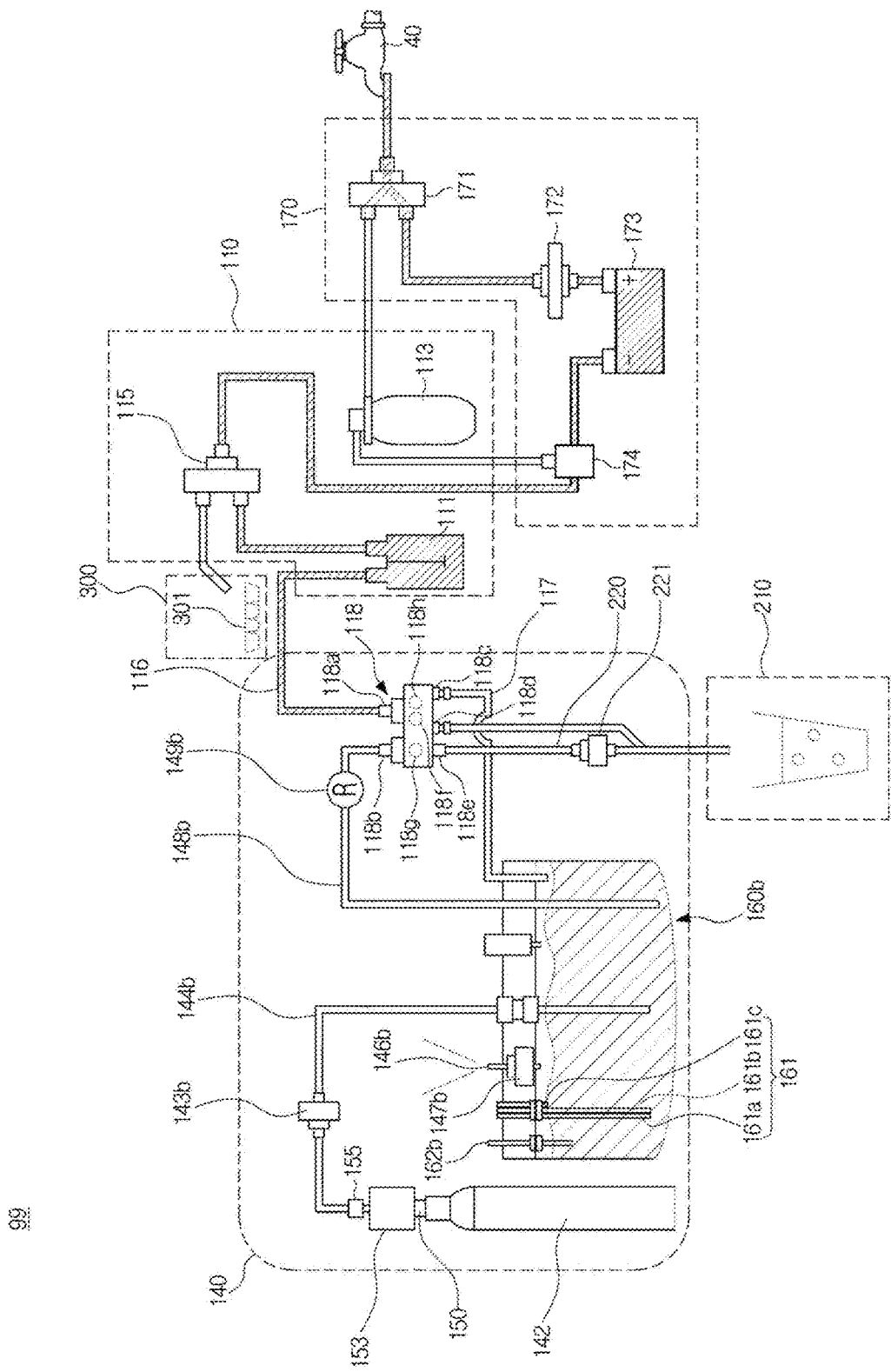
FIG. 26B is a view illustrating a concept of supplying the sterilizing water to the purified water supplier and keeping the sterilizing water therein according to the fourth embodiment of the present invention.

FIG. 26B shows a concept of supplying the sterilizing water only to the purified water supplier and keeping the sterilizing water therein according to the fourth embodiment.

When the user inputs a dispenser cleaning signal through the user interface 500, the controller 700 may control the second passage change-over valve 171 to connect to the external water source 40 and the sterilizing water generation-side inlet valve 172, and to isolate the water purification filter 113 from the external water source 40.

The water supplied from the external water source 40 may be converted into sterilizing water in the sterilizing water generator 173, and the third passage change-over valve 174 may be controlled to connect the sterilizing water generator 173 to the first passage change-over valve 115 and to isolate the first passage change-over valve 115 from the water purification filter 113. In addition, the first passage change-over valve 115 may block the sterilizing water from flowing into the ice-making machine 300.

Additionally, the valve assembly 118 may be controlled to close the sparkling water supplier 140 so that the sterilizing water does not flow thereinto.

Therefore, after being supplied to the dispenser passage 99, the sterilizing water may be supplied to the first passage change-over valve 115, the water chamber 111, and the purified water discharge passage 116. Further, the sterilizing water is kept in the dispenser passage 99 by closing the purified water supply valve 116a, such that foreign materials or germs that have accumulated in the dispenser passage 99 may be eliminated.

Figure 26C:
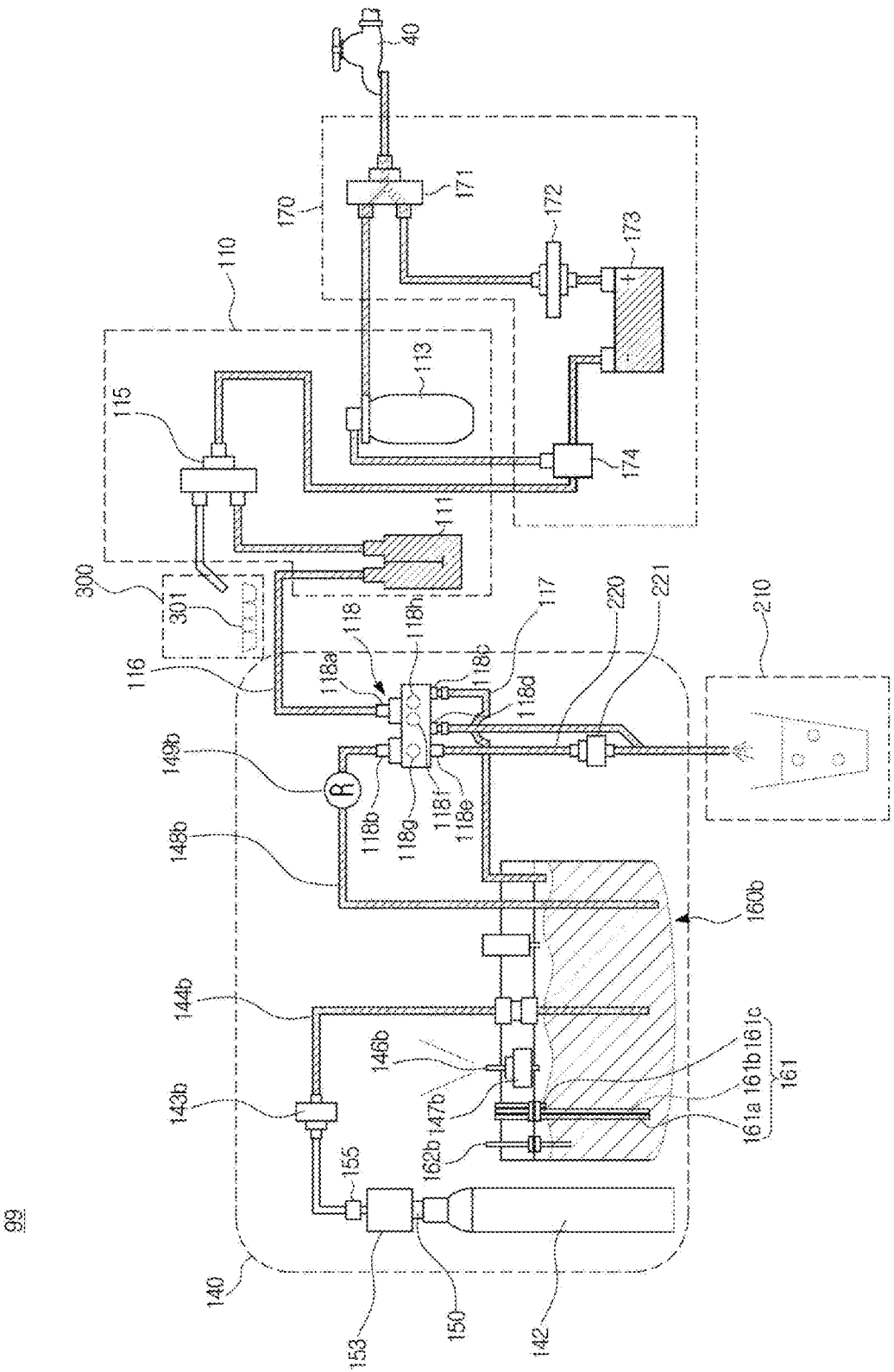
FIG. 26C is a view illustrating a concept of draining the sterilizing water according to the fourth embodiment of the present invention.

FIG. 26C shows a concept of draining the sterilizing water according to the fourth embodiment.

After draining the sterilizing water into the dispenser discharger 210, the refrigerator 1 may rinse the dispenser passage 99 to sweep out any sterilizing water remaining in the dispenser passage 99.

In particular, by opening all valves except the first passage change-over valve 115, the purified water generated in the water purification filter 113 may flow throughout the dispenser passage 99 except the ice-making machine 300 to be drained into the dispenser discharger 210. With such an operation, the dispenser passage 99 may be rinsed to sweep out any sterilizing water remaining therein.

Figure 27:
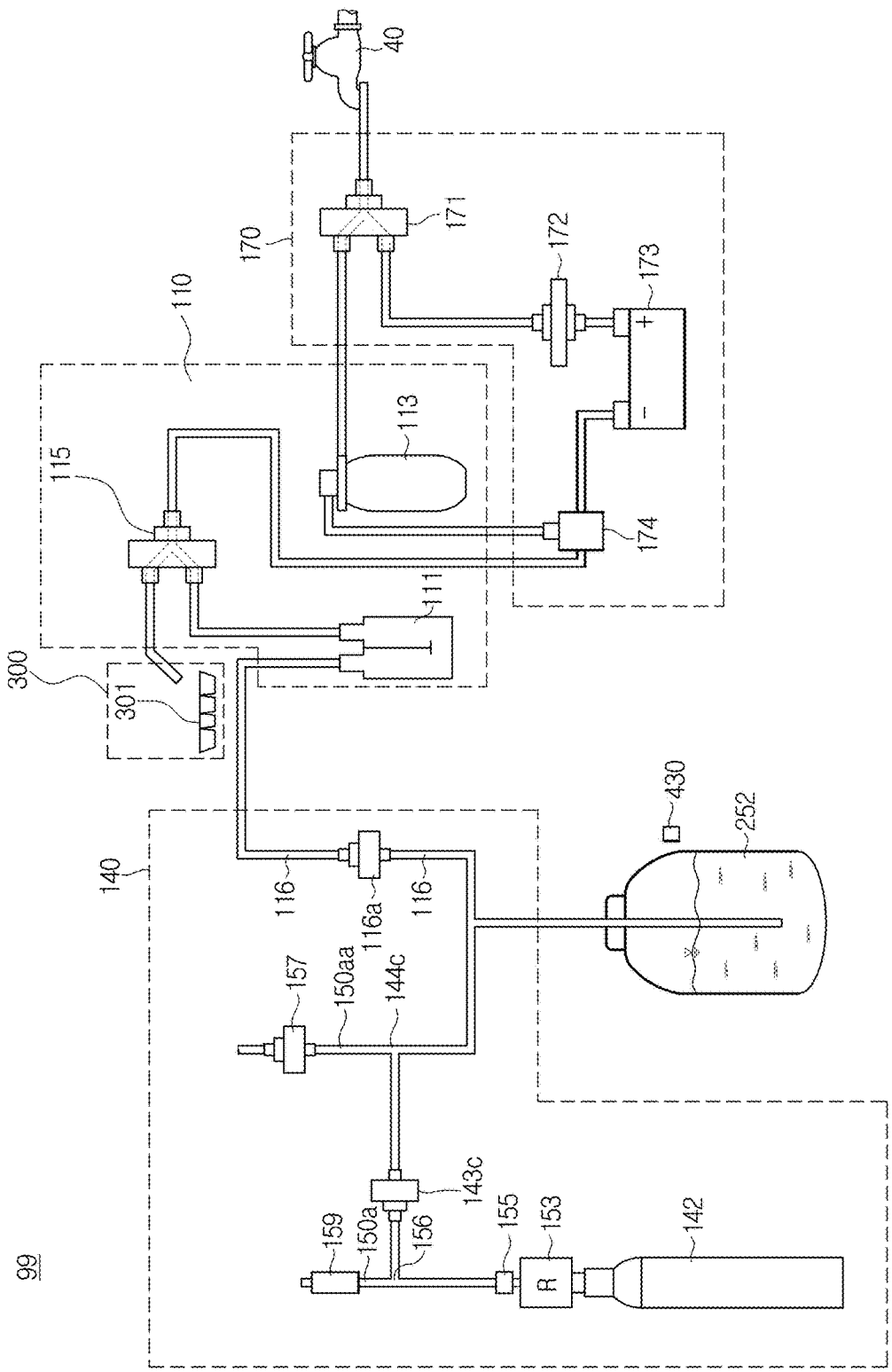
FIG. 27 is a view illustrating a passage of a dispenser according to a fifth embodiment of the present invention.

FIG. 27 shows a dispenser passage according to a fifth embodiment.

The fifth embodiment is an embodiment in which sparkling water is made in a water receiver.

Upon receiving a sparkling water making signal, a controller 700 may open a purified water supply valve 116a to supply purified water from a purified water supplier 110 to the water receiver through a purified water supply passage 116. Also, the controller 700 may open a carbon dioxide supply valve 143c and the purified water discharge valve 116a to deliver the carbon dioxide from a carbon dioxide cylinder 142 to the water receiver through a carbon dioxide supply passage 144c, so that sparkling water can be made in the water receiver.

In this case, the water receiver may be made of a hard material so that it can endure a high pressure of the carbon dioxide supplied for making the sparkling water.

Figure 28A:
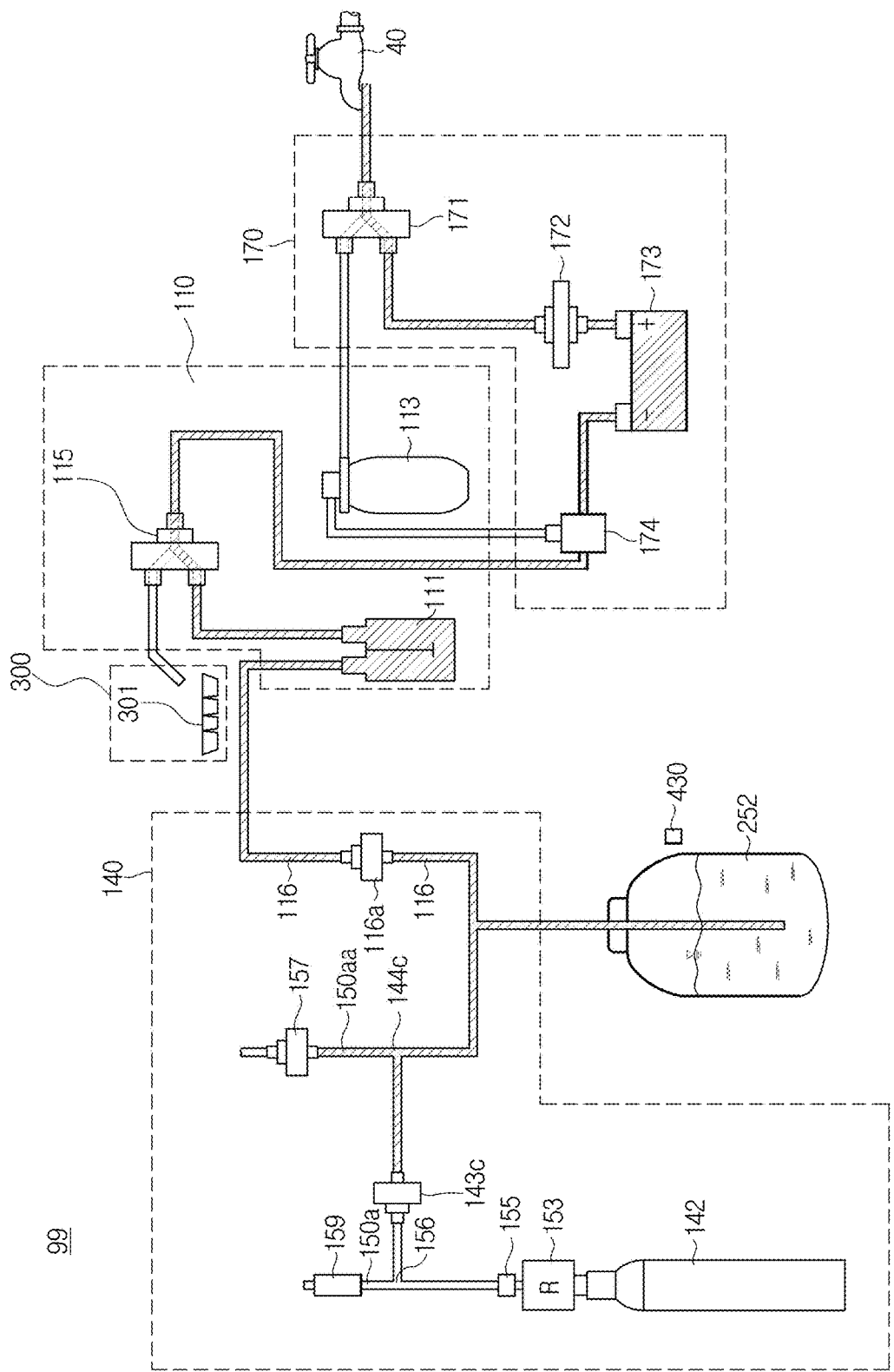
FIG. 28A is a view illustrating a concept of supplying and keeping sterilizing water according to the fifth embodiment of the present invention.

FIG. 28A shows a concept of supplying and keeping sterilizing water according to the fifth embodiment.

When the user inputs a dispenser cleaning signal through a user interface 500, the controller 700 may control a second passage change-over valve 171 to connect to an external water source 40 and a sterilizing water generation-side inlet valve 172, and to isolate a water purification filter 113 from the external water source 40.

The water supplied from the external water source 40 may be converted into sterilizing water in a sterilizing water generator 173, and a third passage change-over valve 174 may be controlled to connect the sterilizing water generator 173 to a first passage change-over valve 115 and to isolate the first passage change-over valve 115 from the water purification filter 113. In addition, the first passage change-over valve 115 may block the sterilizing water from flowing into an ice-making machine 300.

Also, the controller 700 may control the carbon dioxide supply valve 143c to close so that flow of the sterilizing water into the carbon dioxide cylinder 142 is blocked.

Therefore, after being supplied to a dispenser passage 99, the sterilizing water may be supplied up to the first passage change-over valve 115, a water chamber 111, and the purified water discharge passage 116. Further, the sterilizing water is kept in the dispenser passage 99 by closing the purified water supply valve 116a, such that foreign materials or germs that have accumulated in the dispenser passage 99 may be eliminated.

Figure 28B:
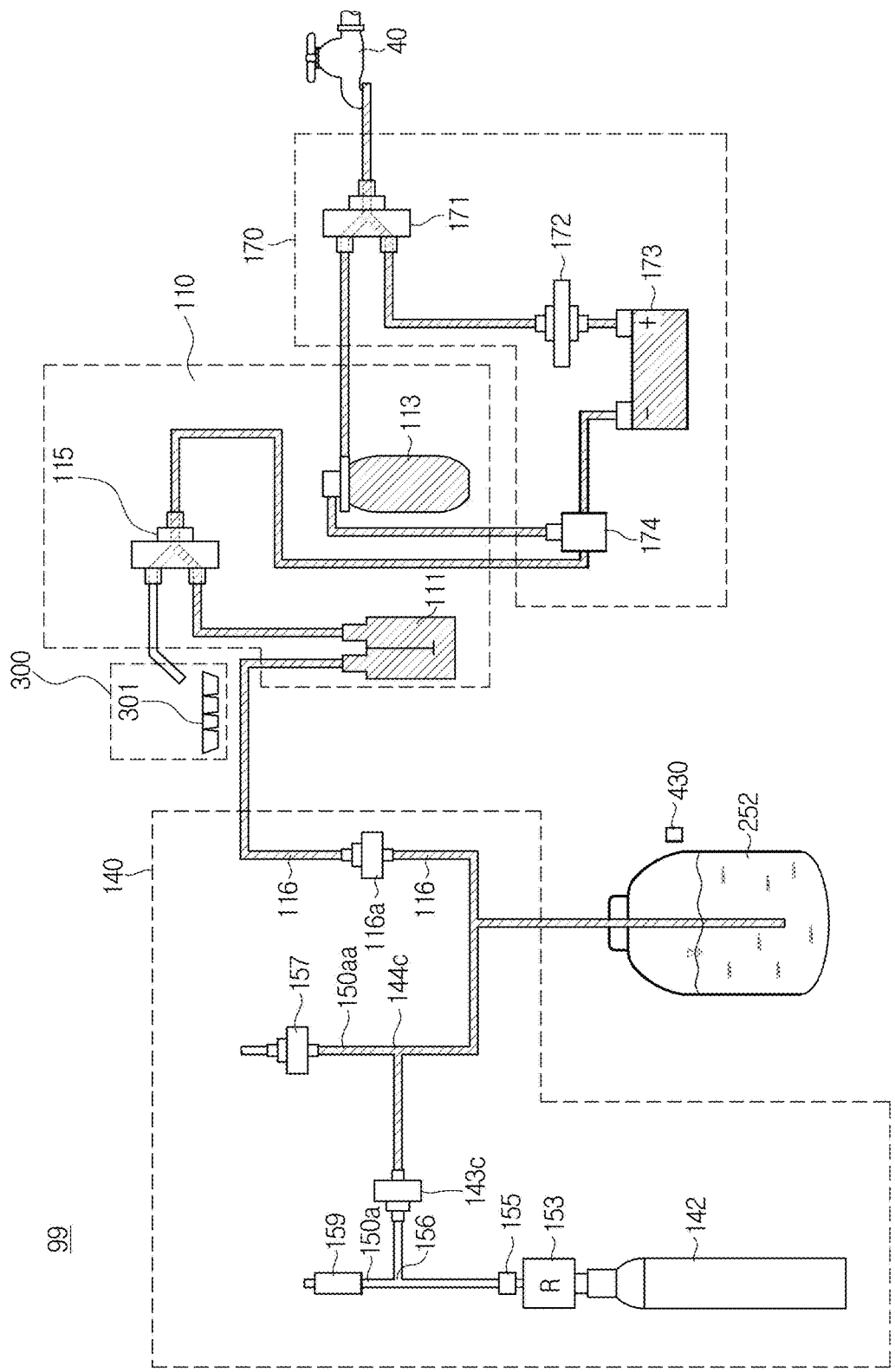
FIG. 28B is a view illustrating a concept of supplying and draining rinsing water according to the fifth embodiment of the present invention.

FIG. 28B shows a concept of supplying and draining rinsing water according to the fifth embodiment.

After draining the sterilizing water into a dispenser discharger 210, a refrigerator 1 may rinse the dispenser passage 99 to sweep out any sterilizing water remaining in the dispenser passage 99.

In particular, by opening all valves except the first passage change-over valve 115, the purified water generated in the water purification filter 113 may flow throughout the dispenser passage 99 except the ice-making machine 300 to be drained into the dispenser discharger 210. With such an operation, the dispenser passage 99 may be rinsed to sweep out any sterilizing water remaining therein.

Figure 29:
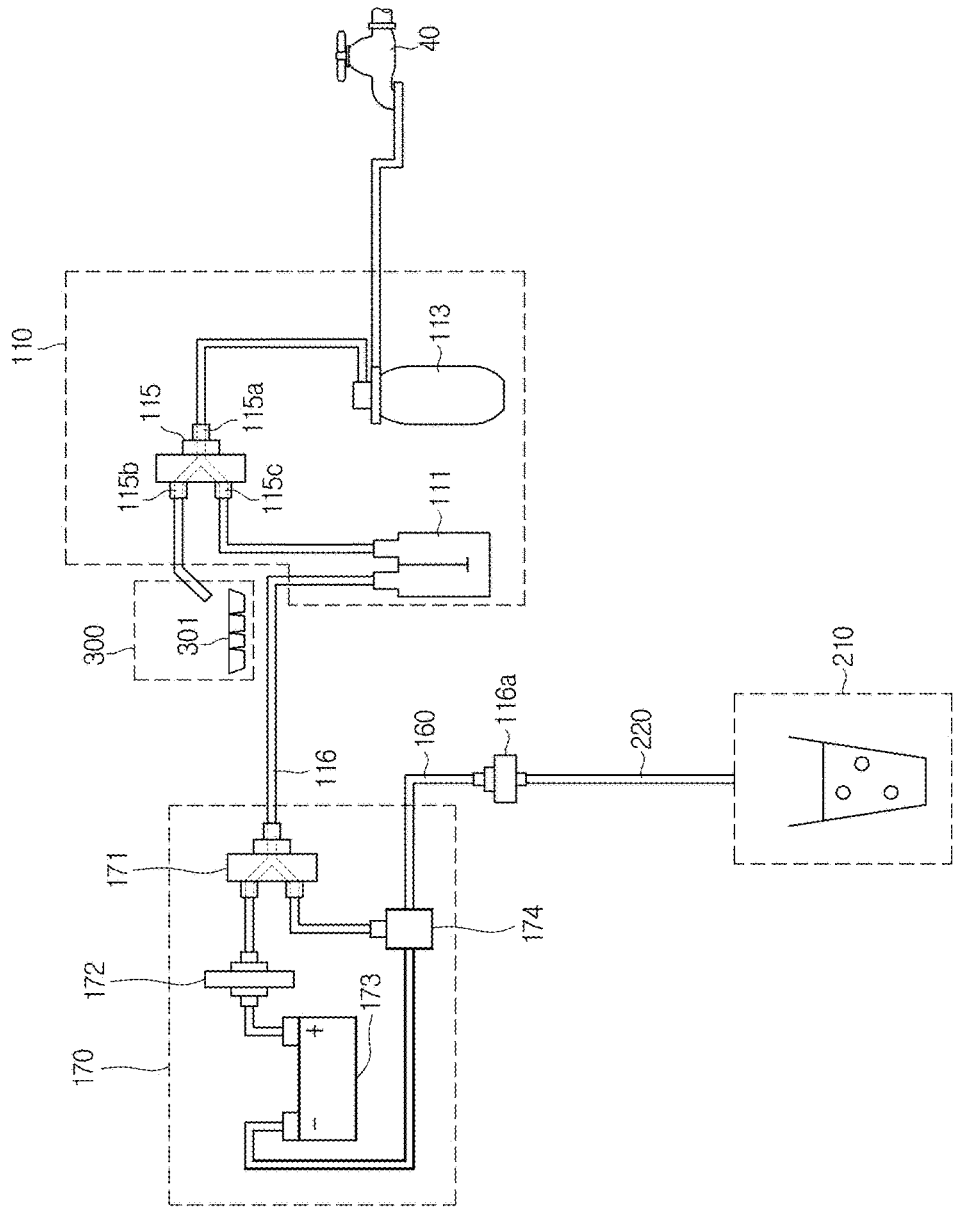
FIG. 29 is a view illustrating a passage of a dispenser according to a sixth embodiment of the present invention.

FIG. 29 shows a dispenser passage according to a sixth embodiment.

The sixth embodiment is an embodiment for supplying purified water and ionic water.

Unlike the first embodiment, a sterilizing water supplier 170 may be connected to an outlet end of a purified water supplier 110 and a sterilizing water generator 173 may include an ionic membrane for making the ionic water.

Therefore, the user may use the provided ionic water without a separate ionic water making device.

Figure 30A:
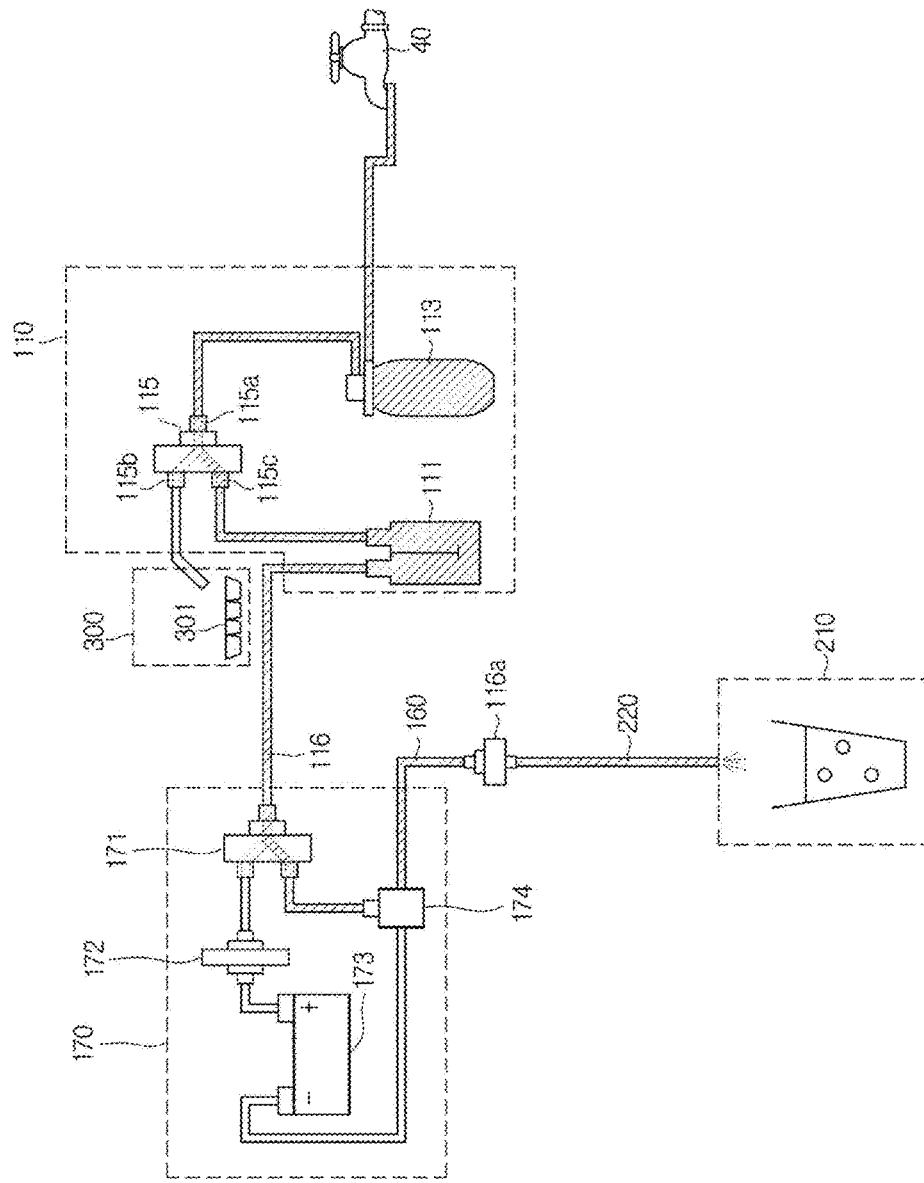
FIG. 30A is a view illustrating a concept of supplying purified water according to the sixth embodiment of the present invention.

FIG. 30A shows a concept of supplying the purified water according to the sixth embodiment.

When a dispenser discharger 210 receives an instruction for a water purification operation from a user, a controller 700 may control a refrigerator 1 to discharge the purified water into a common discharge passage 220.

In particular, water supplied from a water source 40 may be purified by eliminating pollutants through a water purification filter 113 to create purified water and then the purified water may flow into a first passage change-over valve 115.

The first passage change-over valve 115 may close a first outlet 115b to block a flow of the purified water into an ice-making machine 300 and open a second outlet 115c to allow the purified water to flow into a water chamber 111 based on a determined operation in the controller 700.

Also, a temperature of the purified water flowing into the water chamber 111 may be adjusted according to a target temperature input by the user through a user interface 500.

The purified water having the temperature adjusted to the target temperature in the water chamber 111 may be discharged to one side of the water chamber 111 connected to the second outlet 115c and the other side. At this point, the controller 700 may control a second passage change-over valve 171 and a third passage change-over valve 174 to connect to a purified water discharge valve 116a and a purified water supply passage 116, and control the purified water discharge valve 116a to open, thereby allowing the purified water departing from the water chamber 111 to flow into the common discharge passage 220.

Additionally, the controller 700 may control the purified water supply valve 116a to open and close so that the purified water discharged from the water chamber 111 flows into a vessel placed below the dispenser discharger 210 through the common discharge passage 220.

With such an operation, the user may obtain the purified water of the target temperature.

Figure 30B:
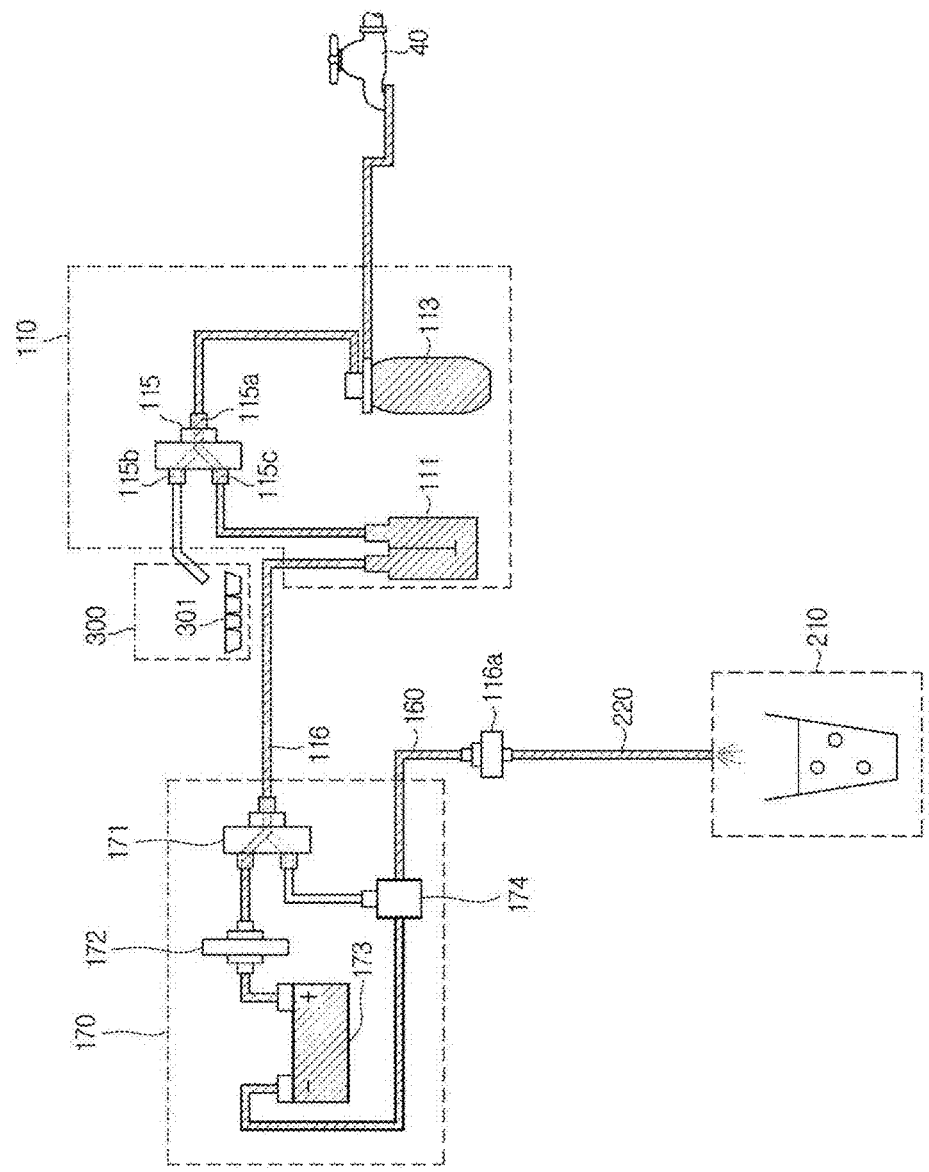
FIG. 30B is a view illustrating a concept of supplying and keeping sterilizing water according to the sixth embodiment of the present invention.

FIG. 30B shows a concept of supplying and keeping sterilizing water according to the sixth embodiment.

When the user inputs an ionic water supply signal through the user interface 500, the controller 700 may open and close the second passage change-over valve 171 to connect the purified water discharge passage 116, a sterilizing water generation-side inlet valve 172, and the third passage change-over valve 174 to each other.

The purified water supplied from the purified water supplier 110 may be converted into the ionic water in the sterilizing water generator 173, and the third passage change-over valve 174 may be controlled to connect the sterilizing water generator 173 to the purified water discharge valve 116a. Also, the first passage change-over valve 115 may block the sterilizing water from flowing into the ice-making machine 300.

Therefore, the ionic water may be provided to the user through the common discharge passage 220.

Figure 30C:
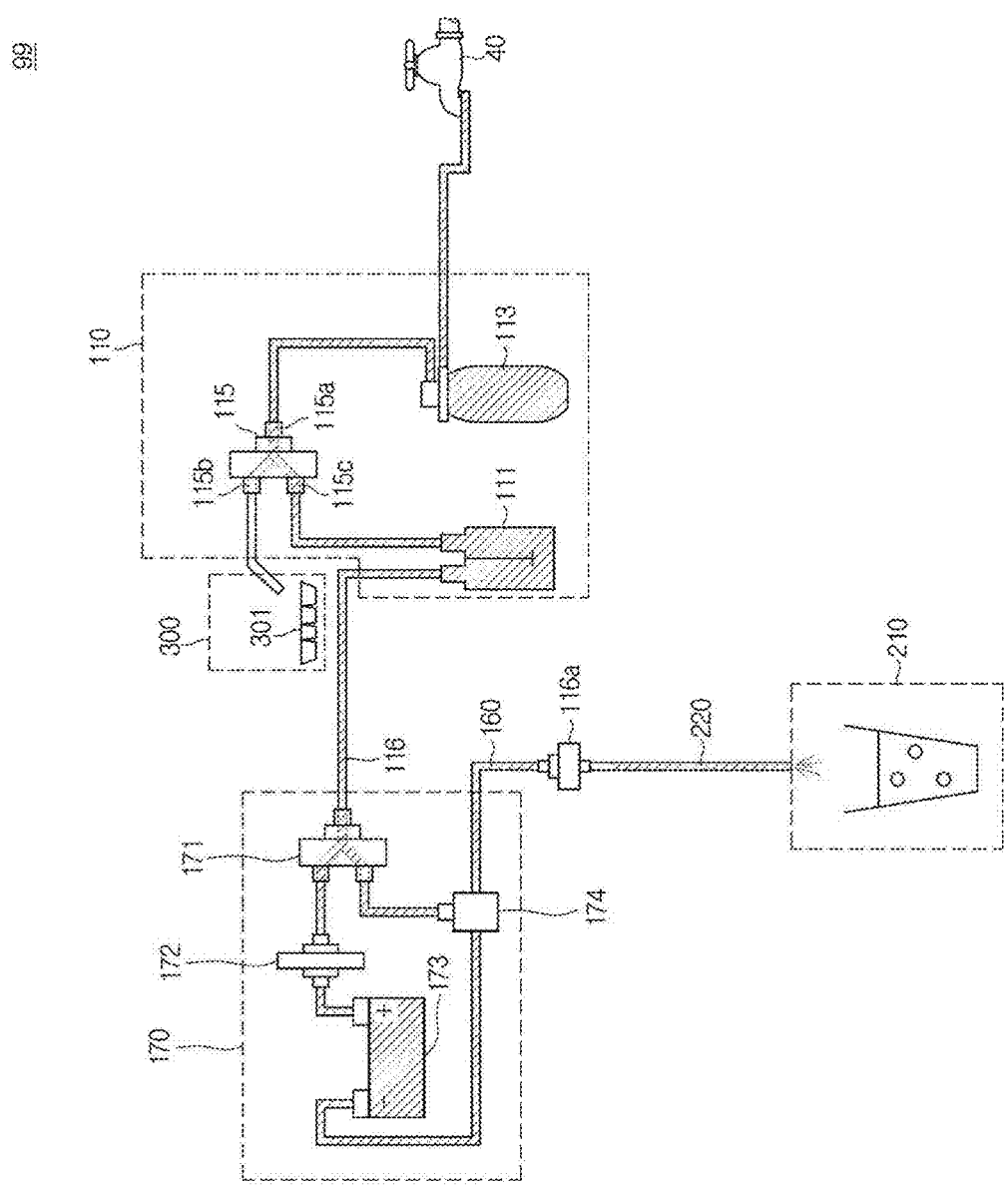
FIG. 30C is a view illustrating a concept of draining the sterilizing water according to the sixth embodiment of the present invention.

FIG. 30C shows a concept of draining the sterilizing water according to the sixth embodiment.

When an ionic water generation operation is performed, foreign materials and the like that have accumulated in a dispenser passage 99 should be eliminated.

Therefore, the controller 700 may rinse the dispenser passage 99 to eliminate the foreign materials and the like.

In particular, by opening all valves except the first passage change-over valve 115, the purified water generated in the water purification filter 113 may flow throughout the dispenser passage 99 except the ice-making machine 300 to be drained into the dispenser discharger 210. With such an operation, the dispenser passage 99 may be rinsed to sweep out any foreign materials remaining therein.

Figure 31:
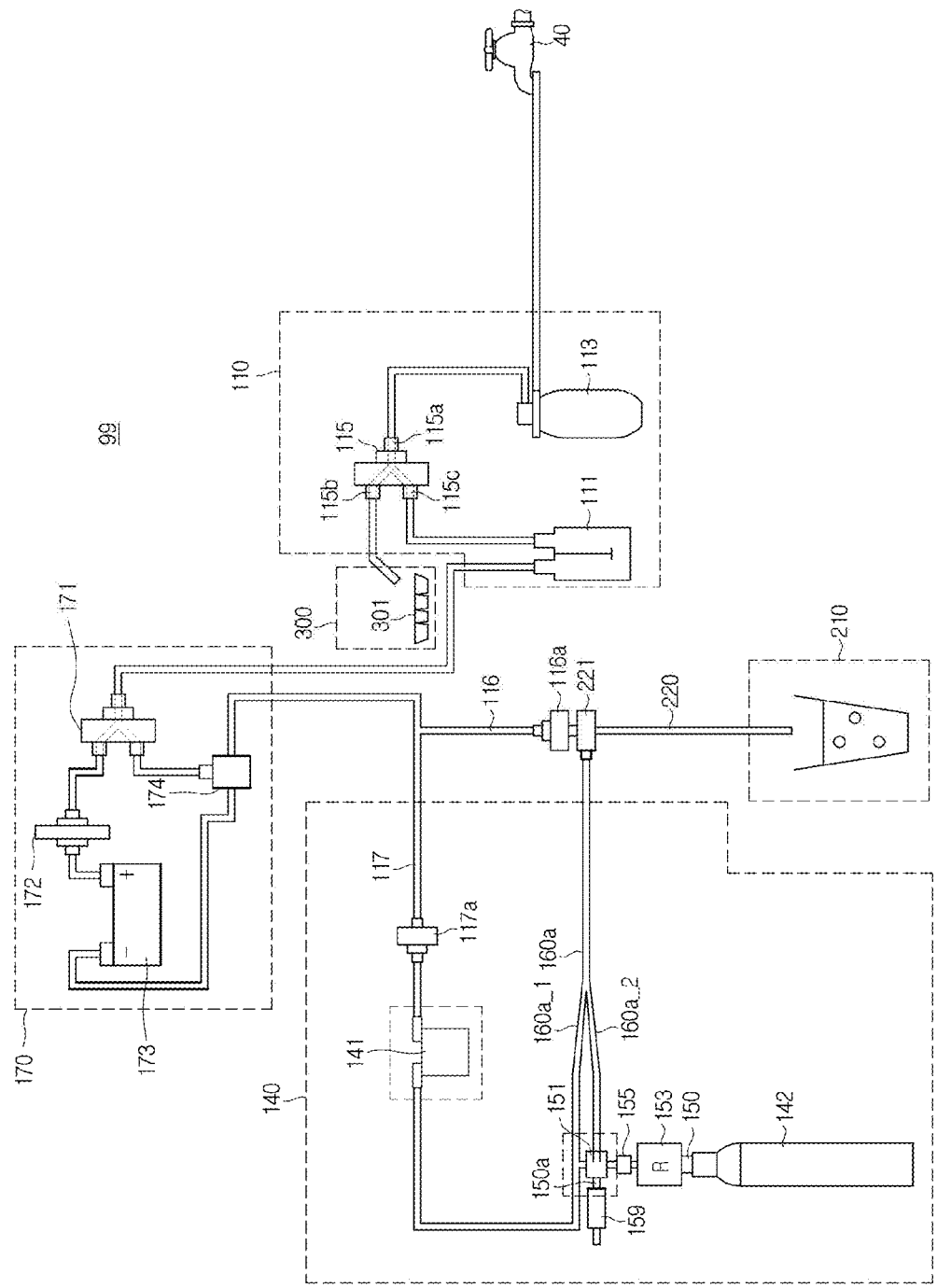
FIG. 31 is a view illustrating a passage of a dispenser according to a seventh embodiment of the present invention.
Figure 32A:
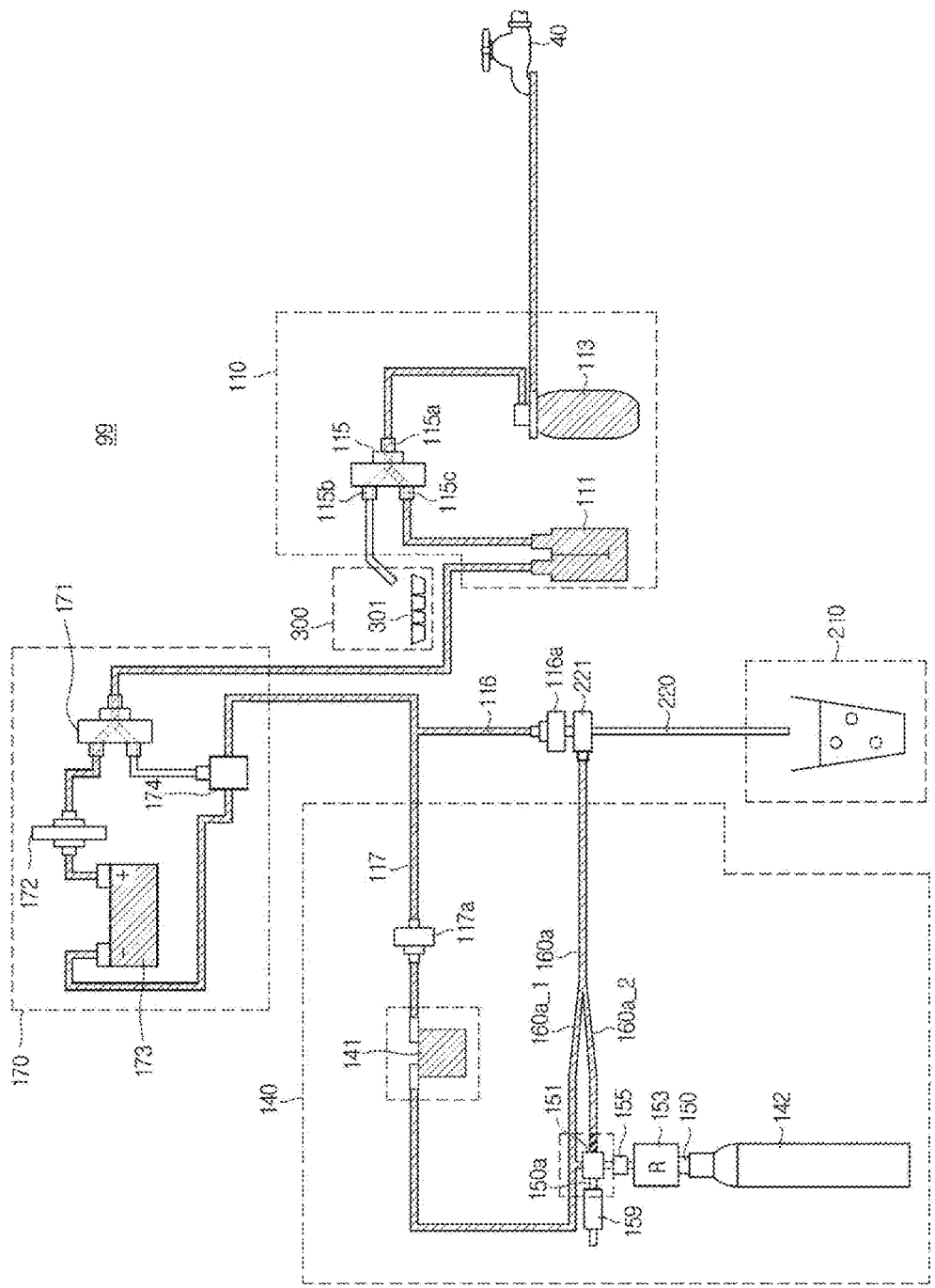
FIG. 32A is a view illustrating a concept of supplying and keeping sterilizing water according to the seventh embodiment of the present invention.
Figure 32B:
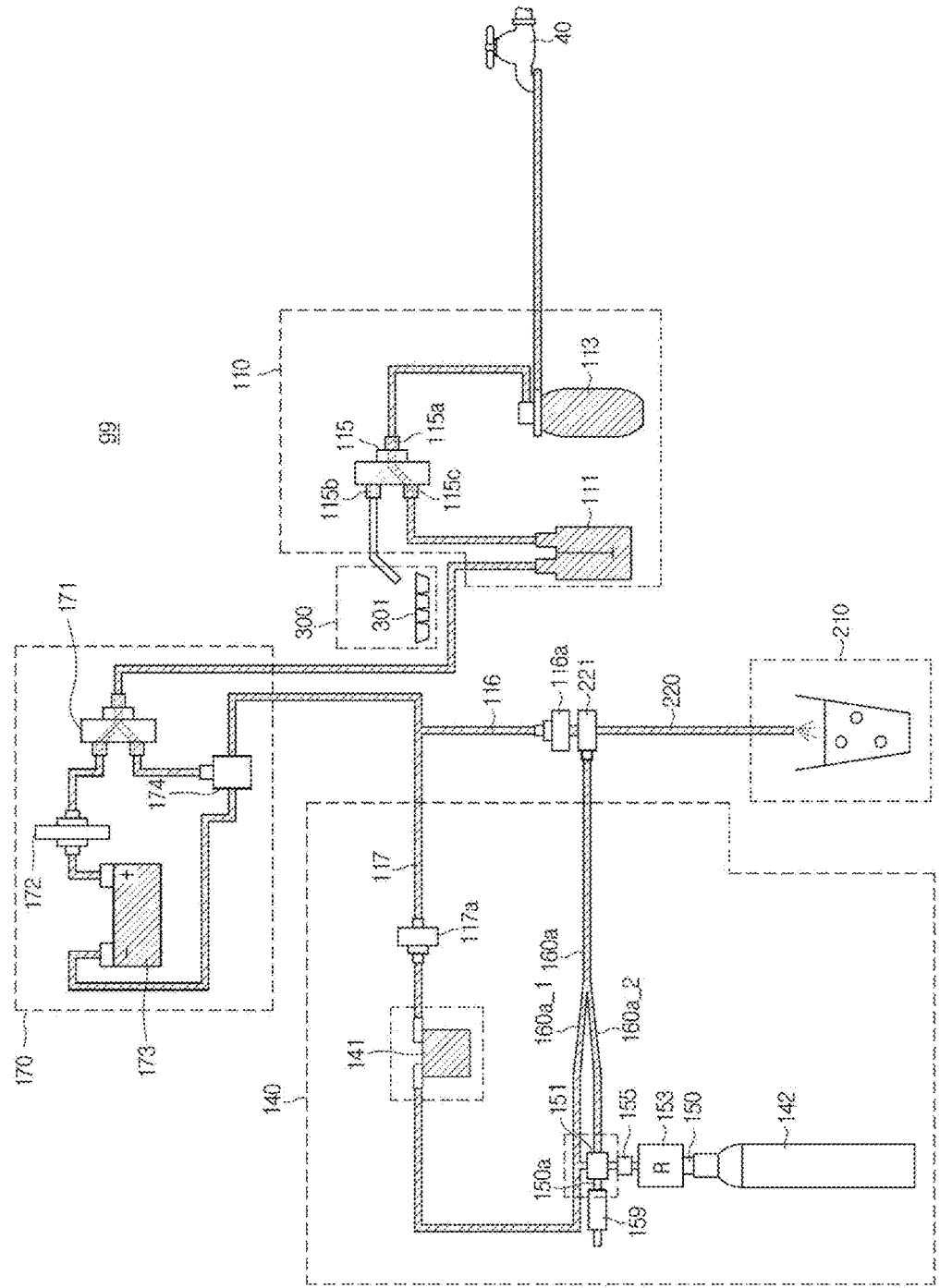
FIG. 32B is a view illustrating a concept of supplying and draining rinsing water according to the seventh embodiment of the present invention.

FIG. 31 shows a dispenser passage 99 according to a seventh embodiment, FIG. 32A shows a concept of supplying and keeping sterilizing water according to the seventh embodiment, and FIG. 32B shows a concept of supplying and draining rinsing water according to the seventh embodiment.

The seventh embodiment is an embodiment adopting a sterilizing water supplier 170 provided between a purified water supplier 110 and a sparkling water supplier 140, and the detailed configuration and operation thereof may be identical to or different from those of the third and sixth embodiments described above.

Hereinafter, embodiments of a user interface provided for a user to perform dispenser cleaning will be described with reference to FIGS. 33 and 41.

Figure 33:
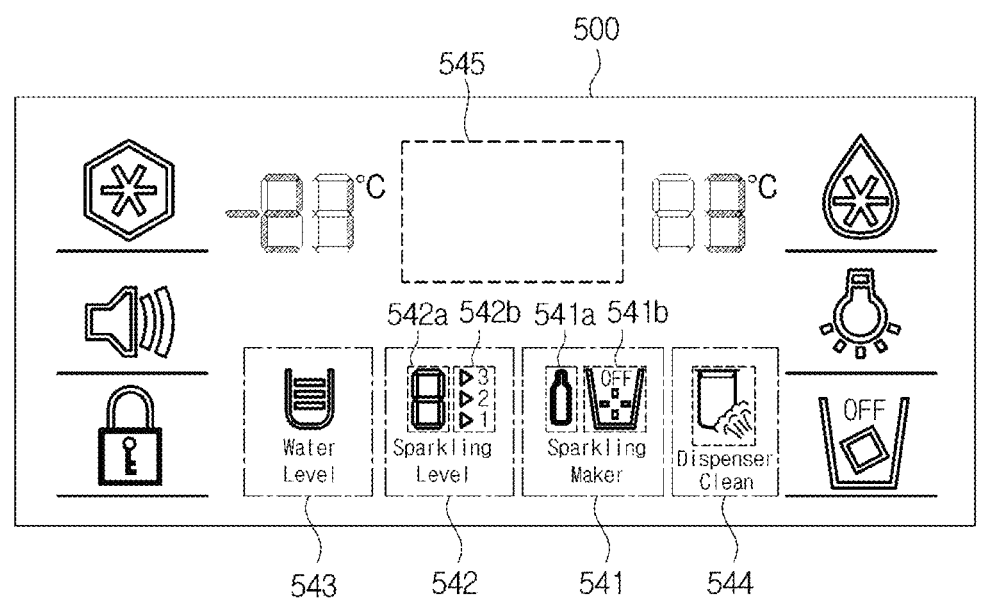
FIG. 33 is a view illustrating a user interface included in a refrigerator according to one embodiment of the present invention.

FIG. 33 shows a user interface included in a refrigerator according to one embodiment.

The user interface 500 may display a temperature, a humidity, a target concentration of sparkling water, a concentration and a capacity of the sparkling water, and the like of the refrigerator 1 to a user, and may receive inputs of a target temperature, a target concentration of the sparkling water, and the like of the refrigerator 1 from the user.

In particular, as shown in FIG. 33, the user interface 500 may include a sparkling water making instruction region 541 for receiving a sparkling water making instruction from the user and displaying sparkling water making information, a sparkling water concentration setting region 542 for receiving a concentration setting instruction of the sparkling water from the user and displaying a sparkling concentration setting instruction, a water level display region 543 for displaying an amount or a water level of the purified water, a dispenser cleaning instruction region 544 for receiving a dispenser cleaning signal, and a message display region 545 for displaying various messages.

Each region 541, 542, 543, 544, and 545 included in the user interface 500 may include the input component 530 for detecting a touch or a press of the user, and the display 510 for displaying an image for the user.

A push switch or a membrane switch for detecting the press of the user, or a touch pad for detecting the touch of the user may be adopted as the input component 530. Also, a liquid crystal display (LCD) panel, a light emitting diode (LED) panel, or an organic light emitting diode (OLED) may be adopted as the display 510.

A touch screen made by integrating the input component 530 and the display 510, receiving a control instruction according to a touch by the user, and displaying operation information corresponding to the control instruction may be adopted as each region 541, 542, 543, 544, and 545 included in the user interface 500.

The sparkling water making instruction region 541 may receive a sparkling water making instruction from the user.

In particular, the sparkling water making instruction region 541 may include a low pressure display region 541a for warning that a pressure of carbon dioxide discharged from a carbon dioxide cylinder 142 is less than a reference pressure, and a sparkling water making display region 541b for receiving a sparkling water making instruction and displaying a state in the course of making the sparkling water.

For example, if a pressure of the carbon dioxide discharged from the carbon dioxide cylinder 142 is less than a reference pressure, the refrigerator 1 may display a low pressure display image on the low pressure display region 541a to warn of the low pressure of the carbon dioxide. Also, in the course of making the sparkling water, the refrigerator 1 may display a sparkling water making image on the sparkling water making display region 541b to indicate to the user that the sparkling water is being made.

Additionally, when the user touches or presses the sparkling water making instruction region 541, the refrigerator 1 may begin making the sparkling water and display the sparkling water making display image on the sparkling water making display region 541b.

The sparkling water concentration setting region 542 may receive the concentration setting instruction for the sparkling water.

The sparkling water concentration setting region 542 may include a current concentration display region 542a for displaying a concentration of the sparkling water accommodated in a mixing tube 160a or a sparkling water chamber 160b in the course of making the sparkling water, and a target concentration display region 542b for displaying a target concentration of the sparkling water input by the user.

For example, as shown in FIG. 33, the current concentration display region 542a may display a concentration of the sparkling water accommodated in the mixing tube 160a or the sparkling water chamber 160b in the course of making the sparkling water in 7 segments, and the target concentration display region 542b may display an image corresponding to a target concentration input by the user.

Also, when the user touches or presses the sparkling water concentration setting region 542, the refrigerator 1 changes the target concentration of the sparkling water to change the target concentration displayed on the target concentration display region 542b.

The water level display region 543 may display an amount of the supplied purified water or a water level of the purified water.

For example, the refrigerator 1 may classify a water level of the supplied purified water into three levels between a minimum water level and a maximum water level, and the water level display region 543 may display a different number of indicators according to a water level of the sparkling water.

In particular, one indicator may be displayed when a water level of the purified water supplied to the sparkling water chamber 160b corresponds to $1/3$ a maximum water level, two indicators may be displayed when the water level of the purified water corresponds to $2/3$ of the maximum water level, and three indicators may displayed when the water level of the purified water corresponds to the maximum water level.

The dispenser cleaning instruction region 544 may provide a dispenser cleaning required message when a predetermined time interval set by the user or at the time of manufacture or design has passed. Also, the dispenser cleaning instruction region 544 may receive a dispenser cleaning signal from the user when the user wants to clean the dispenser.

The message display region 545 may display various messages for the user to interact with the refrigerator 1.

For example, a sparkling water making start message when the sparkling water starts to be made, a sparkling water making completion message when the making of the sparkling water is complete, dispenser cleaning performance, and the like may be displayed.

Figure 34:
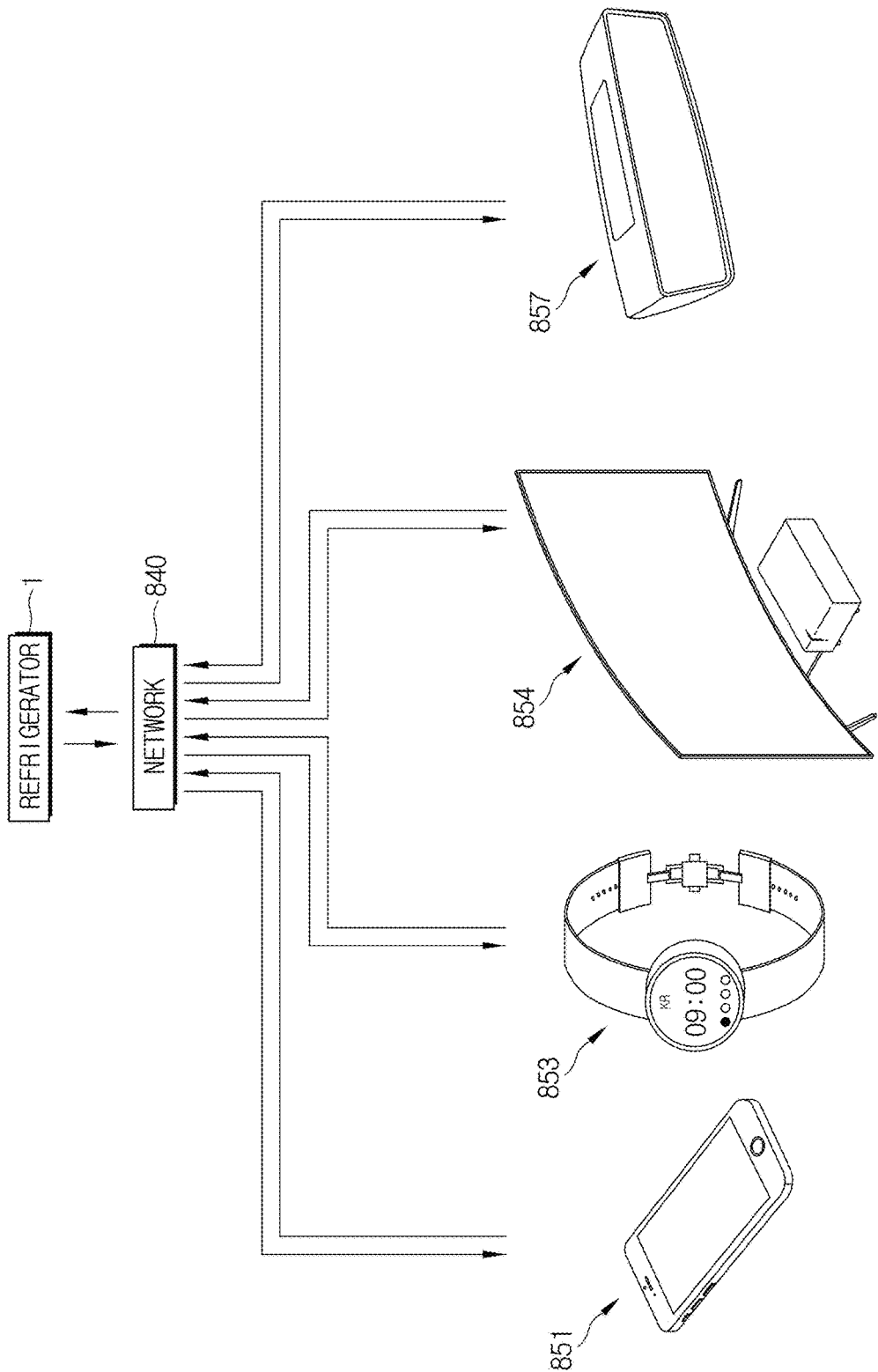
FIG. 34 is a view illustrating a communication example between a refrigerator and other electronic devices according to one embodiment of the present invention.

FIG. 34 shows communication between a refrigerator and other electronic devices according to one embodiment.

In order to clean a dispenser passage 99 in the refrigerator 1, a user may input an instruction through a user interface 500 provided at a front surface of a door of the refrigerator 1 and receive messages regarding a status and an operation thereof, or the user may input the instruction or receive the messages regarding the status and the operation using other electronic devices.

As shown in FIG. 34, the refrigerator 1 may be connected to a network 840, and a mobile terminal 852, and a wearable device 853, a television 854, and a speaker 857, which are examples of the other electronic devices, may be connected to the network 840. Therefore, the refrigerator 1 and the examples of the other electronic devices such as the mobile terminal 852, the wearable device 853, the television 854, and the speaker 857 may be connected to each other through the network 840.

In this case, a communication session is established between the refrigerator 1 and the other electronic devices, such that the user may input and transmit a desired operation of the refrigerator 1 and receive messages regarding the status and operation of the refrigerator 1 therefrom using the other electronic devices.

Detailed embodiments related to the aforementioned description will be described below with reference to FIGS. 35 to 41.

Figure 35:
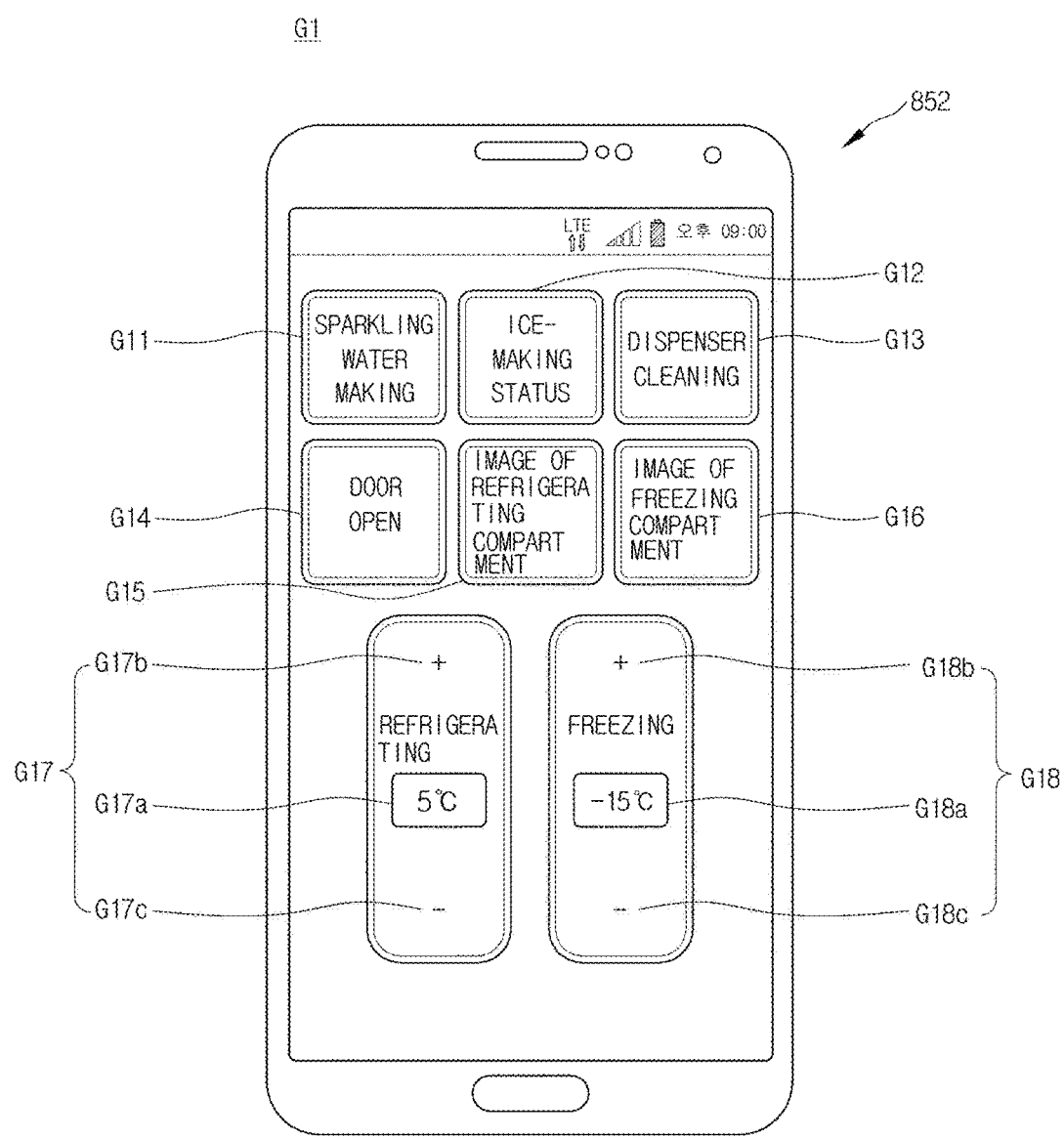
FIG. 35 is a view illustrating a main screen image of a graphic user interface of a mobile terminal according to one embodiment of the present invention.

FIG. 35 shows a main screen image of a graphic user interface of a mobile terminal according to one embodiment.

A graphic user interface G1 of a mobile terminal may include a 1st function key G11 for receiving a sparkling water making instruction, a 2nd function key G12 for displaying a status of ice-making currently being performed in an ice-making machine of a refrigerator, a 3rd function key G13 for receiving a dispenser cleaning signal, a 4th function key G14 for informing of whether a door of the refrigerator is currently opened or closed, a 5th function key G15 for displaying a current internal image of a refrigerating compartment, a 6th function key G16 for displaying a current internal image of a freezing compartment, a 7th function key G17 for setting a temperature of the refrigerating compartment, and an 8th function key G18 for setting a temperature of the freezing compartment.

Also, the 7th function key G17 may include a 7_a function key G17a for displaying a current temperature and a desired temperature of the refrigerating compartment, a 7_b function key for increasing the desired temperature of the refrigerating compartment, and a 7_c function key for decreasing the desired temperature of the refrigerating compartment.

In addition, the 8th function key G18 may include an 8_a function key G18a for displaying a current temperature and a desired temperature of the freezing compartment, an 8_b function key G18b for increasing the desired temperature of the freezing compartment, and an 8_c function key G18c for decreasing the desired temperature of the freezing compartment.

In this case, when the user presses the 3rd function key G13, a dispenser cleaning setting screen image to be described below with reference to FIG. 36 may be displayed. Also, when the user presses the 3rd function key G13 in the course of performing dispenser cleaning, a dispenser cleaning performance screen image to be described below with reference to FIG. 37 may be displayed.

Figure 36:
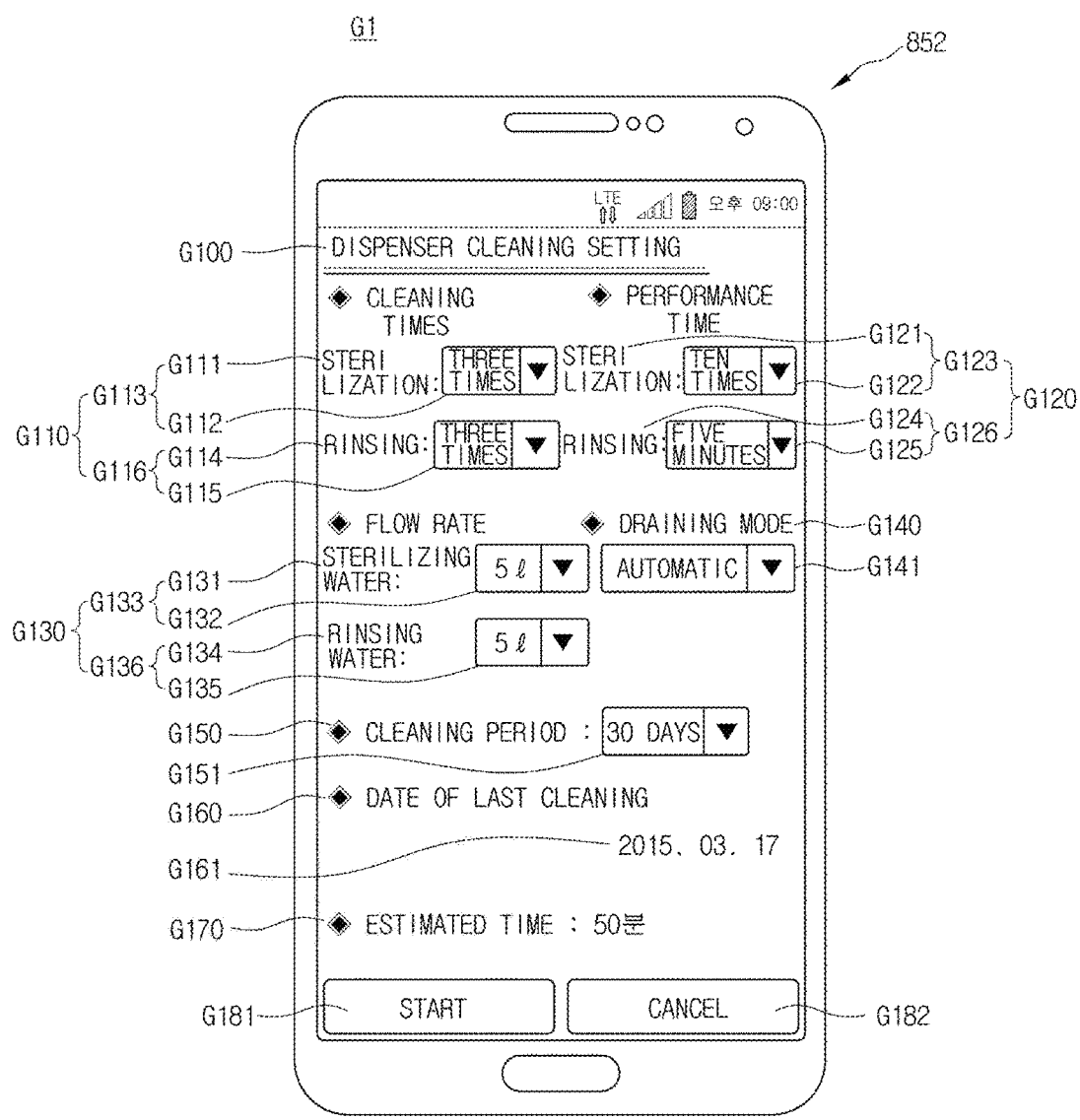
FIG. 36 is a view illustrating a dispenser cleaning setting screen image of a graphic user interface of a mobile terminal according to one embodiment of the present invention.

FIG. 36 shows a dispenser cleaning setting screen image of a graphic user interface of the mobile terminal according to one embodiment.

When the user presses a 3rd function key G13 while the dispenser cleaning is not currently being performed, a dispenser cleaning setting screen image may be displayed.

The dispenser cleaning setting screen image may include a dispenser cleaning setting title G100 for displaying a type of a current screen image, a 9th function key G110 for displaying and setting a number of cleanings, a 10th function key G120 for displaying and setting a desired run-time of performing the dispenser cleaning, an 11th function key G130 for displaying and setting desired flow rates of sterilizing water and rinsing water, a 12th function key for receiving a drain selection using one of the dispenser discharger and the drain, a 13th function key for displaying and setting a dispenser cleaning period, a 14th function key for displaying a last day on which the dispenser cleaning was performed, a 15th function key G170 for displaying an estimated time required for performing dispenser cleaning under a current set condition, a 16th function key G181 for receiving a dispenser cleaning start input, and a 17th function key G182 for cancelling the dispenser cleaning setting.

In addition, the 9th function key G110 may include a number of sterilizations function key G113 for displaying and setting a number of sterilization cycles, and a number of rinses function key G116 for displaying and setting a number of rinsing cycles. The number of sterilizations function key G113 may include a number of sterilizations title G111 for informing of a function of the current function key, and a number of sterilization cycles setting key G112 for setting the number of sterilization cycles. The number of rinses function key G116 may include a number of rinses title G114 for informing of a function of the current function key, and a number of rinsing cycles setting key G115 for setting the number of rinsing cycles.

Also, the 10th function key G120 may include a sterilization time function key G123 for displaying and setting a desired time of the sterilization cycle, and a rinse time function key G126 for displaying and setting a desired time of the rinsing cycle. The sterilization time function key G123 may include a sterilization time title G121 for informing of a function of the current function key, and a sterilization time setting key G122 for setting the sterilization time. The rinse time function key G126 may include a rinse time title G124 for informing of a function of the current function key, and a rinse time setting key G125 for setting the rinse time.

Moreover, the 11th function key G130 may include a desired sterilizing water flow rate function key G133 for displaying and setting a desired flow rate of the sterilizing water, and a desired rinsing water flow rate function key G136 for displaying and setting a desired flow rate of the rinsing water. The desired sterilizing water flow rate function key G133 may include a desired sterilizing water flow rate title G131 for informing of a function of the current function key, and a desired sterilizing water flow rate setting key G132 for setting the desired flow rate of the sterilizing water. The desired rinsing water flow rate function key G136 may include a desired rinsing water flow rate title G134 for informing of a function of the current function key, and a desired rinsing water flow rate setting key G135 for setting the desired flow rate of the rinsing water.

Further, the 12th function key may include a drainage mode title G140 for informing of a function of the current function key, and a drainage mode setting key G141 for setting a drainage mode. Here, the drainage mode may be a mode corresponding to a component for draining the sterilizing water or the rinsing water, which is set through the 12th function key. In other words, in an automatic mode the drainage may be performed through a drain, and in a manual mode, the drainage may be performed through a dispenser discharge.

Additionally, the 13th function key may include a cleaning period title G150 for informing of a function of the current function key, and a cleaning period setting key G151 for setting a period at which to automatically perform the dispenser cleaning by the refrigerator, or a period at which provide the user with a message for requesting dispenser cleaning.

Figure 37:
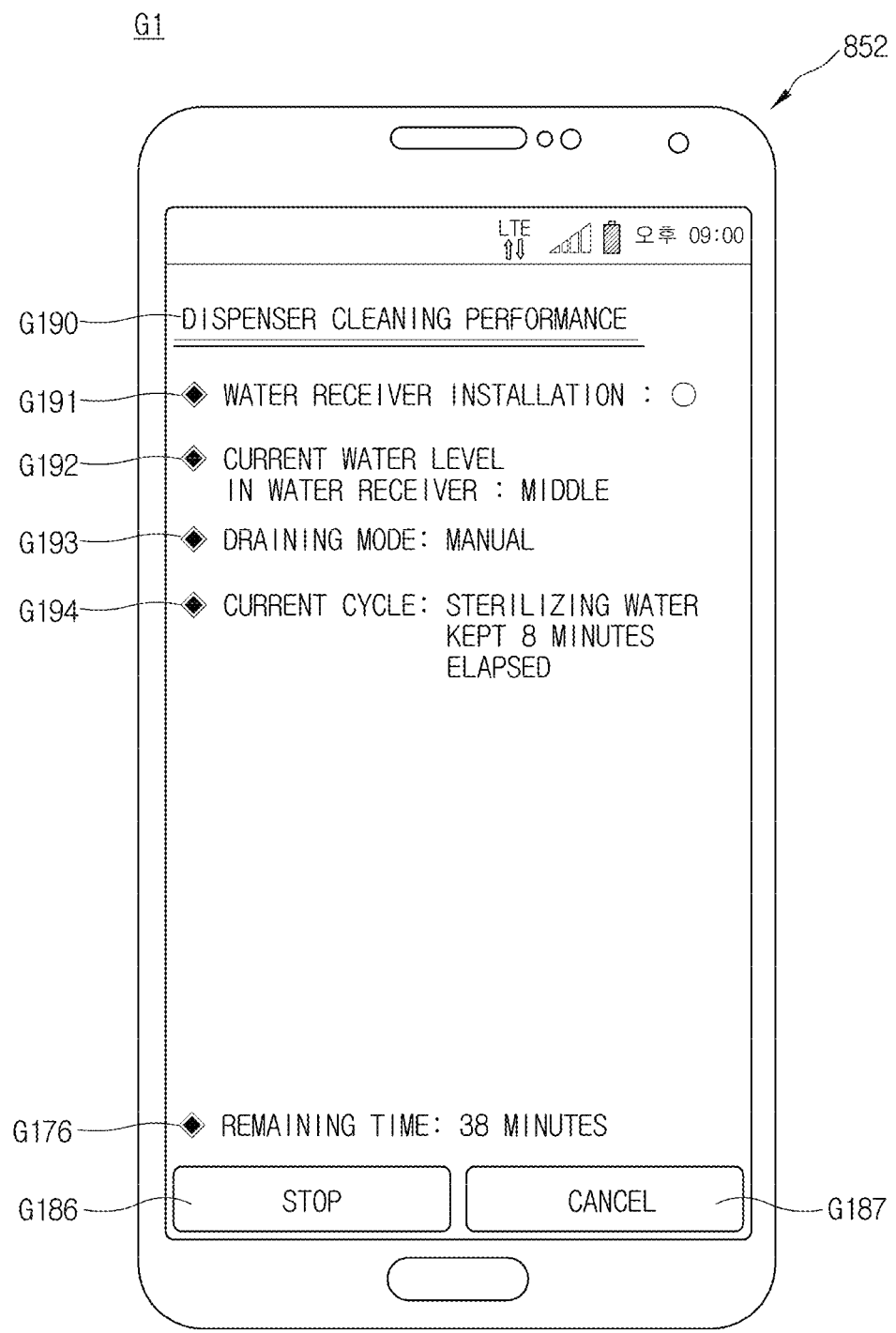
FIG. 37 is a view illustrating a dispenser cleaning performance screen image of a graphic user interface of a mobile terminal according to one embodiment of the present invention.

FIG. 37 shows a dispenser cleaning performance screen image of a graphic user interface of a mobile terminal according to one embodiment.

When a user presses a 3rd function key G13 while dispenser cleaning is currently being performed, a dispenser cleaning performance screen image may be displayed. Alternatively, when the user presses a 16th function key G181 on the dispenser cleaning setting screen image to start dispenser cleaning, the dispenser cleaning performance screen image may be displayed.

The dispenser cleaning performance screen image may include a dispenser cleaning performance title G190 for displaying a type of a current screen image, an 18th function key G191 for displaying whether or not a water receiver is installed below a dispenser discharger according to a water receiver detector, a 19th function key G192 for displaying a water level of water stored in the water receiver, a 20th function key G193 for displaying a currently set drainage mode, a 21st function key G194 for displaying a dispenser cleaning cycle currently being performed by a refrigerator and an elapsed time, a 22nd function key G176 for displaying a remaining time until the dispenser cleaning is completed, a 23rd function key G186 for receiving an instruction of stopping the dispenser cleaning currently being performed, and a 24th function key for receiving an instruction of cancelling the dispenser cleaning currently being performed.

Figure 38:
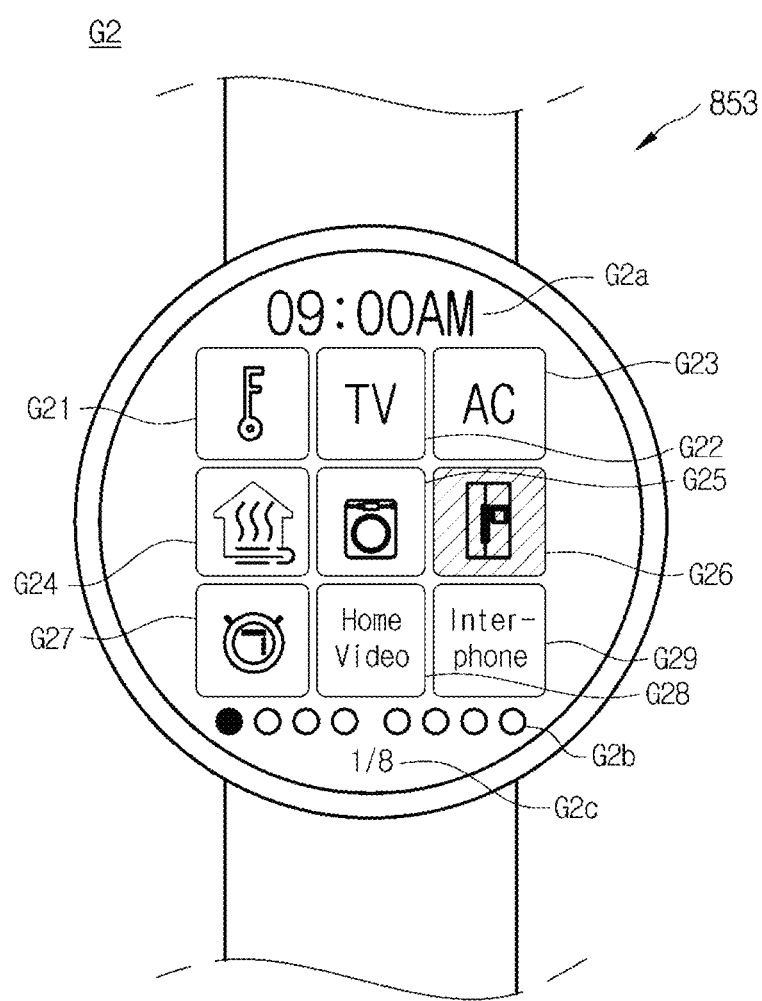
FIG. 38 is a view illustrating a main screen image for home electronic appliances of a graphic user interface of a wearable device according to one embodiment of the present invention.

FIG. 38 shows a main screen image for a home electric appliance of a graphic user interface of a wearable device according to one embodiment.

In the main screen image, the graphic user interface G2 of the wearable device may include a simplified time image G2a, a window position image G2b, a window page image G2c, a 25th function key G21, a 26th function key G22, a 27th function key G23, a 28th function key G24, a 29th function key G25, a 30th function key G26, a 31st function key G27, a 32nd function key G28, and a 33rd function key G29.

The simplified time image G2a may be an image displaying time information of an area in which the wearable device is currently located, the window position image G2b may be an image representing a position of a window currently being displayed by filling a color in one image corresponding to the window among circular images, and the window page image G2c may be an image representing digits of a total window page number and a page number of the window currently being displayed.

The 25th function key G21 may be a function key for opening and closing an entrance door, the 26th function key G22 may be a function key for controlling a television and monitoring a state thereof, the 27th function key G23 may be a function key for controlling an air conditioner and monitoring a state thereof, the 28th function key G24 may be a function key for controlling a boiler and monitoring a state thereof, the 29th function key G25 may be a function key for controlling a washing machine and monitoring a state thereof, the 30th function key G26 may be a function key for controlling a refrigerator and monitoring a state thereof, the 31st function key G27 may be a function key for controlling a robot cleaner and monitoring a state thereof, the 32nd function key G28 may be a function key for watching an internal image of a home, and the 33rd function key G29 may be a function key for communicating with a visitor.

Also, the graphic user interface G2 shown in FIG. 38 may move to a next page according to a finger motion of a user from right to left, and may move to a previous page according to a finger motion of the user from left to right.

Figure 39:
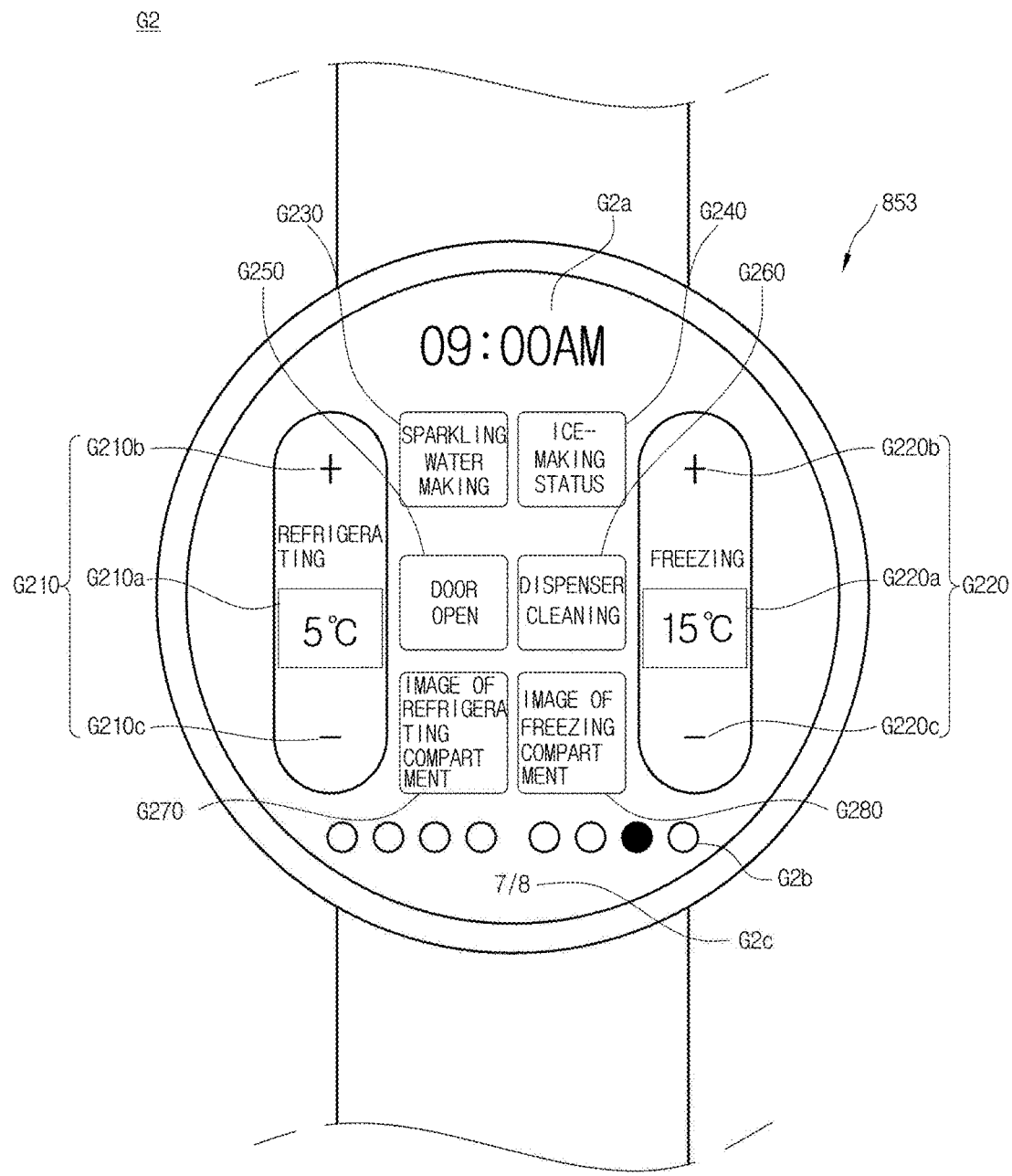
FIG. 39 is a view illustrating a main screen image of a graphic user interface of a wearable device with respect to a refrigerator according to one embodiment of the present invention.

FIG. 39 shows a main screen image for a refrigerator of a graphic user interface of a wearable device according to one embodiment.

When a user presses a 30th function key G26, the graphic user interface may be changed to a main screen image for the refrigerator.

The main screen image for the refrigerator may include a simplified time image G2a, a window position image G2b, a window page image G2c, a 34th function key G210 enabling setting of a temperature of a refrigerating compartment, a 35th function key G220 enabling setting of a temperature of a freezing compartment, a 36th function key G230 for receiving a sparkling water making instruction, a 37th function key G240 enabling display of a status of ice-making currently being performed by an ice-making machine of the refrigerator, a 38th function key G250 for informing of whether a door of the refrigerator is currently opened or closed, a 39th function key G260 for receiving a dispenser cleaning signal, a 40th function key G270 for displaying a current internal image of the refrigerating compartment, and a 41st function key G280 for displaying a current internal image of the freezing compartment.

Also, the 34th function key G210 may include a 34_a function key G210a for displaying a current temperature and a desired temperature of the refrigerating compartment, a 34_b function key G210b for increasing the desired temperature of the refrigerating compartment, and a 34_c function key G210c for decreasing the desired temperature of the freezing compartment.

Moreover, the 35th function key G220 may include a 35_a function key G220a for displaying a current temperature and a desired temperature of the freezing compartment, a 35_b function key G220b for increasing the desired temperature of the freezing compartment, and a 35_c G220c for decreasing the desired temperature of the freezing compartment.

Figure 40:
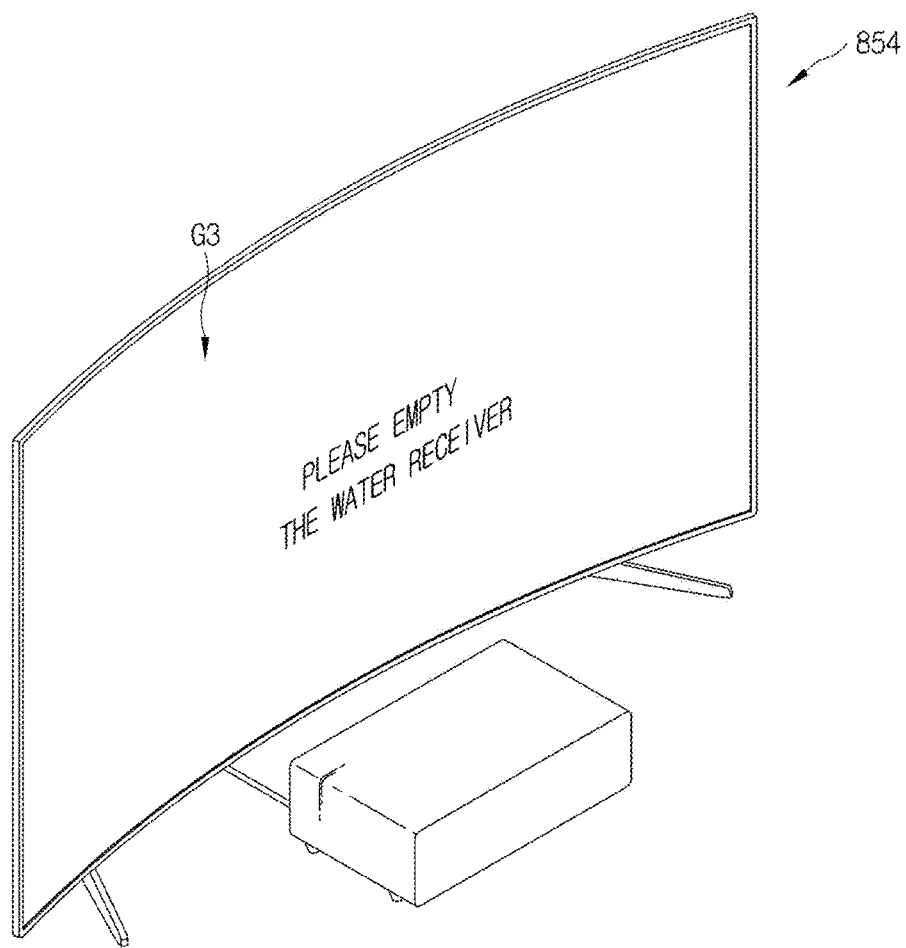
FIG. 40 is a view illustrating a graphic user interface of a television according to one embodiment of the present invention.

FIG. 40 shows a graphic user interface of a television according to one embodiment.

When a refrigerator is performing dispenser cleaning according to a dispenser cleaning signal input by a user, for example, if the user is watching television for another reason, as shown in FIG. 40, a graphic user interface G3 may provide a message instructing to empty a water receiver storing water by displaying the text "Please empty the water receiver."

Figure 41:
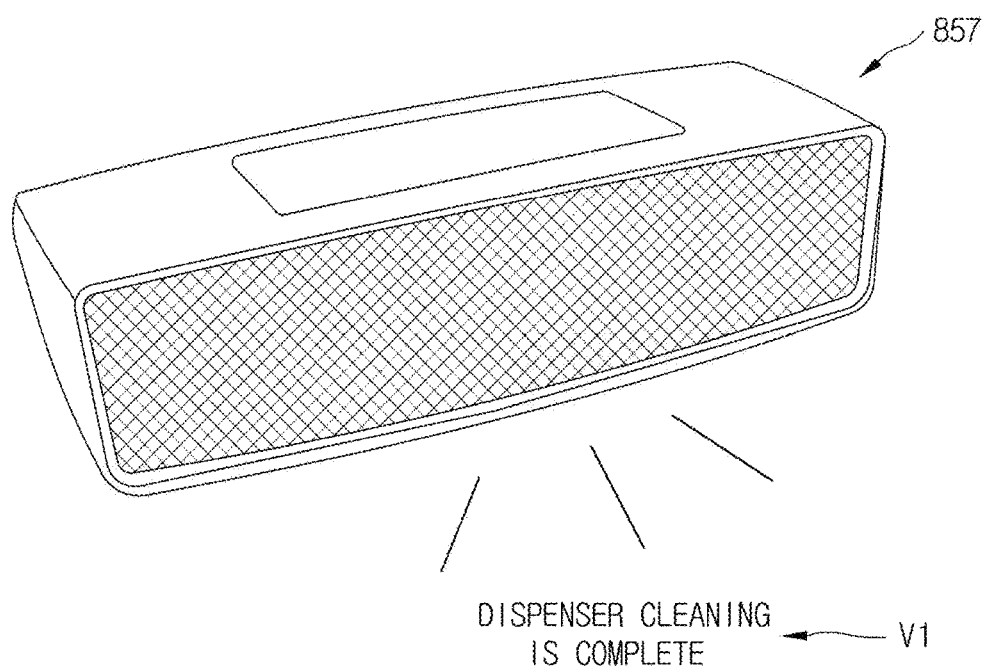
FIG. 41 is a view illustrating a voice user interface of a speaker according to one embodiment of the present invention.

FIG. 41 shows a voice user interface of a speaker according to one embodiment.

As shown in FIG. 41, when a refrigerator is performing dispenser cleaning according to a dispenser cleaning signal input by a user, for example, if the user is away from the refrigerator for another reason, a voice user interface V1 may provide a message regarding completion of the dispenser cleaning by voicing the text "Dispenser cleaning is complete."

The refrigerator performing the dispenser cleaning has been described above. Hereinafter, a method for controlling the refrigerator performing the dispenser cleaning will be described with reference to FIGS. 42 and 43.

Figure 42:
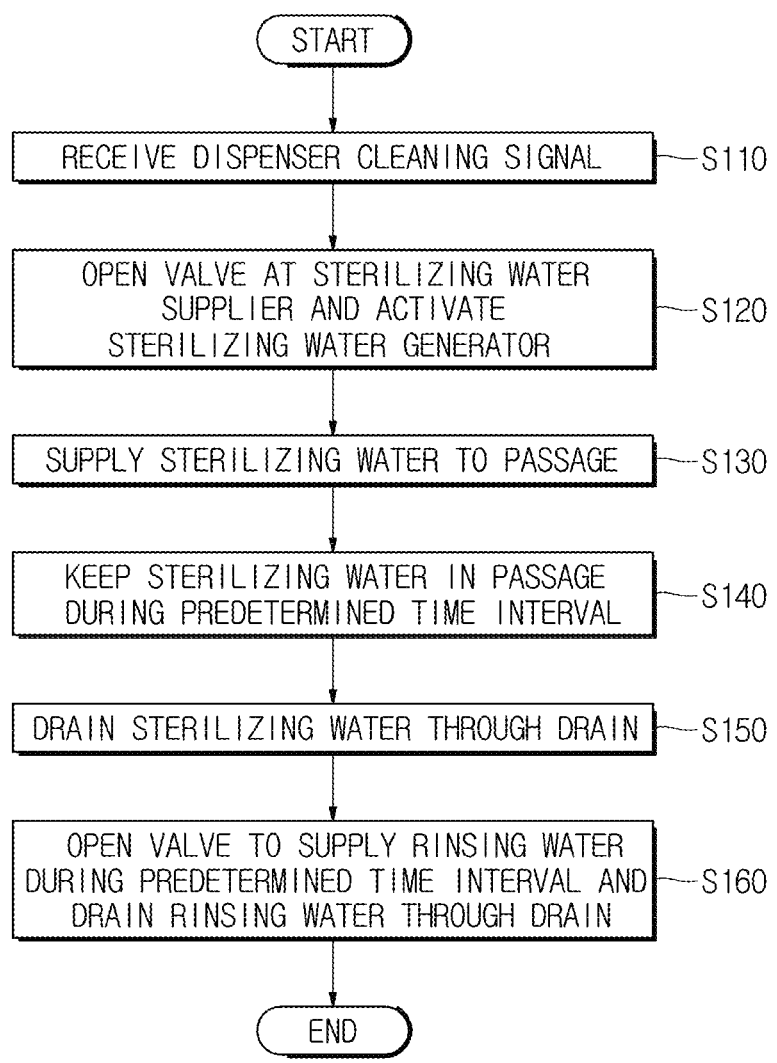
FIG. 42 is a flowchart of a method of draining sterilizing water and rinsing water into a drain according to one embodiment of the present invention.

FIG. 42 is a flow chart of a method for draining sterilizing water and rinsing water through a drain according to one embodiment.

This operation may be performed in a draining mode set to an automatic mode to perform drainage through the drain.

Firstly, when a user interface receives a dispenser cleaning signal from a user in Operation S110, a water supplier may open a valve at a sterilizing water supplier to provide a sterilizing water generator with water from an external water source, and the sterilizing water generator may be activated to generate the sterilizing water in Operation S120.

The sterilizing water supplier may supply the generated sterilizing water to a dispenser passage in Operation S130, and a controller may keep the sterilizing water in the dispenser passage during a predetermined time interval by closing the valve to prevent the sterilizing water from draining during the predetermined time interval in Operation S140.

After the predetermined time interval passes, the controller may open the valve to drain the sterilizing water through the drain in Operation S150.

Lastly, the controller may supply the rinsing water during a predetermined time interval and then drain the rinsing water through the drain to eliminate the sterilizing water remaining in the dispenser passage in Operation S160.

Figure 43:
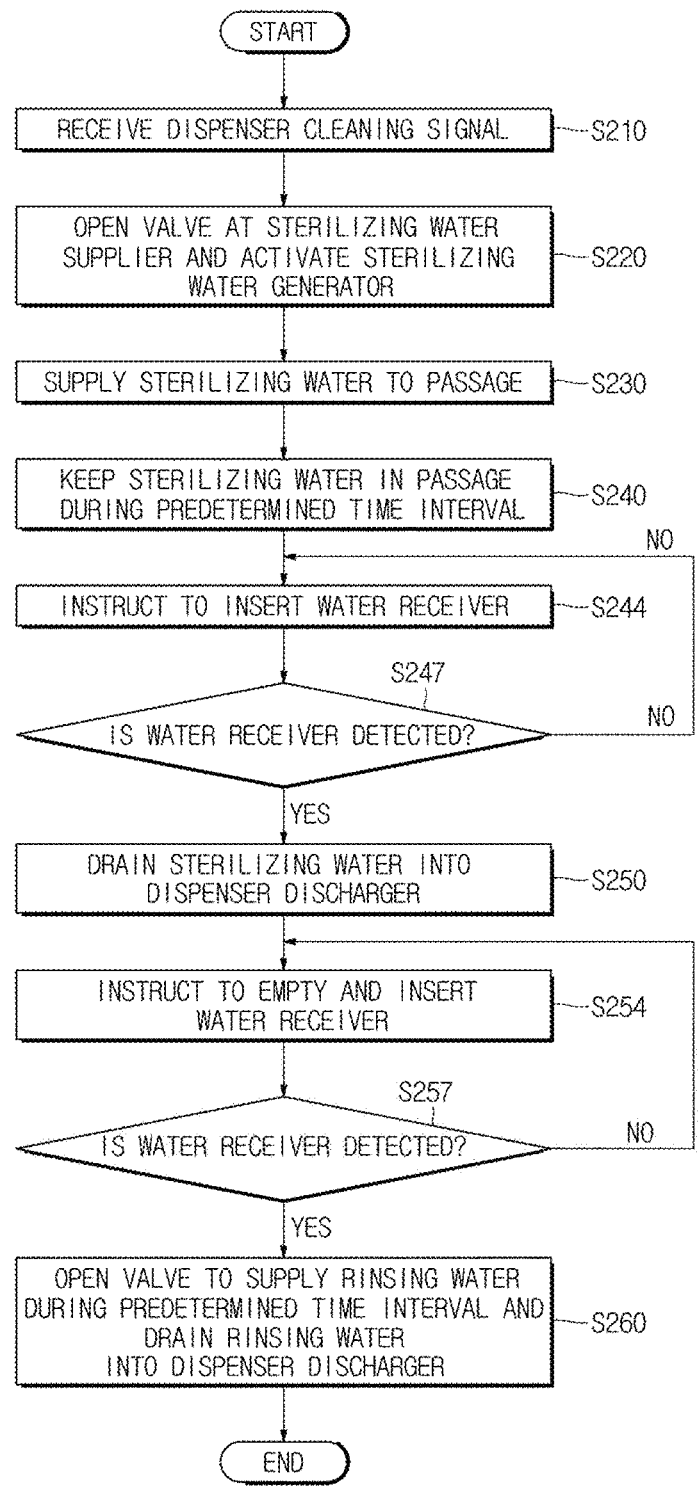
FIG. 43 is a flowchart of a method of draining sterilizing water and rinsing water into a discharger of the dispenser according to another embodiment of the present invention.

FIG. 43 is a flow chart of a method for draining sterilizing water and rinsing water into a dispenser discharger according to another embodiment.

This operation may be performed in a draining mode set to a manual mode to perform a draining through the dispenser discharge.

Firstly, when a user interface receives a dispenser cleaning signal from a user in Operation S210, a water supplier may open a valve at a sterilizing water supplier to provide a sterilizing water generator with water from an external water source, and the sterilizing water generator may be activated to generate the sterilizing water in Operation S220.

The sterilizing water supplier may supply the generated sterilizing water to a dispenser passage in Operation S230, and a controller may keep the sterilizing water in the dispenser passage during a predetermined time interval by closing the valve to prevent the sterilizing water from draining during the predetermined time interval in Operation S240.

Thereafter, the user interface may provide the user with a notice to insert a water receiver in Operation S244, and a water receiver detector may detect whether or not the water receiver is placed below the dispenser discharger. The controller may determine whether or not the water receiver is placed below the dispenser discharger based on a detection signal from the water receiver detector in Operation S247.

If the water receiver is not detected, the controller may control the user interface to repeat Operation S244. On the other hand, when the water receiver is detected, the controller may open the valve to drain the sterilizing water into the dispenser discharger in Operation S250.

The user interface may provide the user with another notice to insert the water receiver in Operation S254, and the water receiver detector may detect whether or not the water receiver is placed below the dispenser discharger. Thereafter, the controller may determine whether or not the water receiver is placed below the dispenser discharger based on the detection signal from the water receiver detector in Operation S257.

If the water receiver is not detected, the controller may control the user interface to repeat Operation S244. On the other hand, when the water receiver is detected, the controller may open the valve to drain the sterilizing water into the dispenser discharger in Operation S260.

Although embodiments have been described with reference to a number of illustrative embodiments thereof, it should be understood that numerous other modifications and embodiments can be devised by those skilled in the art that will fall within the spirit and scope of the principles of this disclosure. The embodiments disclosed herein, therefore, are not to be construed as limiting the technical concept of the present invention but are merely for explanation thereof, and the range of the technical concept is not limited to these embodiments. The scope of the present invention should be construed by the appended claims, along with the full range of equivalents to which such claims are entitled.

What is claimed is:

1. A refrigerator comprising:
a dispenser passage;
a water supplier configured to supply sterilizing water or rinsing water to the dispenser passage;
a drain configured to drain the sterilizing water or the rinsing water that is supplied to the dispenser passage;
a user interface configured to receive a dispenser cleaning signal; and
a controller configured to perform a sterilization cycle and to control the water supplier and the drain to perform a rinsing cycle after completing the sterilization cycle,
wherein the sterilization cycle is a cycle of keeping the sterilizing water in the dispenser passage and then draining the sterilizing water, and the rinsing cycle is a cycle of supplying the rinsing water to the dispenser passage and draining the rinsing water therefrom,
wherein, when the dispenser cleaning signal is input, the controller is configured to control the water supplier to supply the sterilizing water to the dispenser passage, control the drain to drain the sterilizing water after the sterilizing water is kept in the dispenser passage during a predetermined time interval, and block a passage to an ice-making machine until the rinsing water is drained after the sterilizing water is supplied.

2. The refrigerator of claim 1, further comprising:
a flow rate detector configured to detect a flow rate of the sterilizing water being supplied,
wherein the controller is configured to control the water supplier to supply the sterilizing water during a predetermined time interval, and to stop the supplying of the sterilizing water when the flow rate detected by the flow rate detector is equal to or greater than a predetermined flow rate.

3. The refrigerator of claim 1, further comprising:
a flow rate detector configured to detect a flow rate of the rinsing water being supplied,
wherein the controller is configured to control the water supplier to supply the rinsing water during a predetermined time interval, and to stop the supplying of the rinsing water when the flow rate detected by the flow rate detector is equal to or greater than a predetermined flow rate.

4. The refrigerator of claim 1, wherein the water supplier includes a sparkling water supplier configured to make sparkling water, and the controller is configured to control the water supplier to supply the sterilizing water or the rinsing water to the sparkling water supplier.

5. The refrigerator of claim 1, further comprising:
a dispenser discharger configured to drain the sterilizing water or the rinsing water that is supplied to the dispenser passage to store the drained water in a water receiver; and
a water receiver detector configured to detect whether or not the water receiver is placed below the dispenser discharger,
wherein the controller is configured to control the dispenser discharger to store the sterilizing water or the rinsing water in the water receiver when the water receiver placed below the dispenser discharger is detected.

6. The refrigerator of claim 5, further comprising:
a user interface configured to provide a message instructing a user to place the water receiver at the dispenser discharger,
wherein the controller is configured to control the dispenser discharger to store the sterilizing water or the rinsing water in the water receiver when a drain start signal is input by the user through the user interface.

7. The refrigerator of claim 5, wherein the water receiver detector is configured to detect that the water receiver is placed below the dispenser discharger when a dispenser lever is pressed.

8. The refrigerator of claim 6, wherein the user interface is configured to provide a message instructing the user to place the water receiver below the dispenser discharger when the water receiver is not detected as being placed below the dispenser discharger, and is configured to provide a message instructing the user to attach the water receiver to the dispenser discharger when the water receiver is not detected as being attached to the dispenser discharger.

9. The refrigerator of claim 8, further comprising:
a water level detector configured to detect a water level in the water receiver,
wherein the controller is configured to control the dispenser discharger to stop draining when the detected water level exceeds a predetermined water level.

10. A refrigerator comprising:
a dispenser passage;
a water supplier configured to supply sterilizing water or rinsing water to the dispenser passage;

a draining device configured to drain the sterilizing water or the rinsing water that is supplied to the dispenser passage, and including a dispenser discharger and a drain;

a user interface configured to receive an input regarding a draining mode regarding a draining performance component of the dispenser discharger and the drain; and a controller configured to control the user interface to provide a message instructing a user to place a water receiver capable of storing water below the dispenser discharger when an instruction to drain at the dispenser discharger is input, and configured to, when an instruction to drain through the drain is input, control the water supplier and the drain to perform a sterilization cycle and to perform a rinsing cycle when the sterilization cycle is completed, wherein the sterilization cycle is a cycle of keeping the sterilizing water in the dispenser passage and then draining the sterilizing water, and the rinsing cycle is a cycle of supplying the rinsing water to the dispenser passage and draining the rinsing water therefrom.

11. The refrigerator of claim 10, further comprising:
a user interface configured to receive at least one among a number of times the sterilizing water and the rinsing water are supplied, a flow rate at which the sterilizing water and the rinsing water are to be supplied, a supply time of the sterilizing water, a supply time of the rinsing water, or a period of dispenser cleaning.

12. The refrigerator of claim 11, wherein the user interface is configured to provide messages regarding the number of times the sterilizing water and the rinsing water are supplied, the flow rate at which the sterilizing water and the rinsing water are to be supplied, and an estimated dispenser cleaning time corresponding to at least one of the supply time of the sterilizing water or the supply time of the rinsing water.

13. The refrigerator of claim 10, further comprising:
a user interface configured to provide at least one message among a message regarding a remaining dispenser cleaning time when dispenser cleaning is performed, a message regarding a current cycle when the dispenser cleaning is performed, a message regarding detection of a water receiver when a water receiver detector that detects whether or not the water receiver is placed below the dispenser discharger, a message regarding detection of attachment of the water receiver when the water receiver detector that detects whether or not the water receiver is attached to the dispenser discharger, or a message regarding a last dispenser cleaning date.

14. The refrigerator of claim 10, further comprising:
a communication device configured to communicate with another electronic device,
wherein the controller is configured to control the water supplier to supply the sterilizing water to the dispenser passage when a dispenser cleaning signal is transmitted from the other electronic device.

15. A method of controlling a refrigerator, comprising:
receiving a dispenser cleaning signal;
providing a message instructing a user to place a water receiver capable of storing water at a dispenser discharger when the dispenser cleaning signal is input;
detecting whether or not the water receiver is placed below the dispenser discharger;
draining and storing sterilizing water, which is supplied to a dispenser passage and then kept therein, when the water receiver is detected;

providing another message instructing the user to place the water receiver below the dispenser discharger when the draining of the sterilizing water is completed;
detecting again whether or not the water receiver is placed below the dispenser discharger; and
supplying rinsing water to the dispenser passage when the water receiver is detected, and draining and storing the supplied rinsing water.

16. The method of claim 15, further comprising at least one of:
detecting a level of water stored in the water receiver;
stopping the draining when the detected level of water is equal to or greater than a predetermined water level;
providing a message instructing the user to empty the water receiver when the detected level of water is equal to or greater than the predetermined water level; or
performing the draining when the detected level of water is less than the predetermined water level.

17. The method of claim 15, further comprising at least one of:
receiving an input regarding a draining mode with respect to a draining device;
receiving a number of times the sterilizing water and the rinsing water are supplied;
receiving the dispenser cleaning signal;
supplying and draining the sterilizing water and the rinsing water according to the received number of times the sterilizing water and the rinsing water are supplied and the draining mode when the dispenser cleaning signal is input;
receiving at least one of flow rates of the sterilizing water and the rinsing water, a supply time of the sterilizing water, and a supply time of the rinsing water; or
receiving a cleaning period.

18. The method of claim 17, further comprising:
providing at least one of a message regarding an estimated dispenser cleaning time according to the received number of times the sterilizing water and the rinsing water are supplied and the draining mode, a message regarding a remaining dispenser cleaning time when the sterilizing water and the rinsing water are supplied and drained, a message regarding a current cycle when the sterilizing water and the rinsing water are supplied and drained, or a message regarding a last dispenser cleaning date.

19. The method of claim 15, further comprising:
receiving a draining mode with respect to a draining device from another electronic device;
receiving a number of times the sterilizing water and the rinsing water are supplied from the other electronic device;
receiving the dispenser cleaning signal from the other electronic device;
supplying and draining the sterilizing water and the rinsing water according to the received number of times the sterilizing water and the rinsing water are supplied and the draining mode when the dispenser cleaning signal is input; and
transmitting data related to an estimated dispenser cleaning time according to the received number of times the sterilizing water and the rinsing water are supplied and the draining mode to display the estimated dispenser cleaning time on the other electronic device.

* * * * *